(12) United States Patent
Omori et al.

(10) Patent No.: US 7,342,849 B2
(45) Date of Patent: Mar. 11, 2008

(54) RECORDING AND/OR PLAYBACK DEVICE

(75) Inventors: Kiyoshi Omori, Tokyo (JP); Hidehiko Yamamoto, Kanagawa (JP); Masazumi Shiozawa, Tokyo (JP); Hitoshi Taniguchi, Kanagawa (JP); Kazuya Sunami, Kanagawa (JP); Hiroshi Kawashima, Chiba (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 10/761,366

(22) Filed: Jan. 22, 2004

(65) Prior Publication Data

US 2004/0208093 A1    Oct. 21, 2004

(30) Foreign Application Priority Data

Jan. 31, 2003 (JP) .............................. 2003-025239
Dec. 12, 2003 (JP) .............................. 2003-415741

(51) Int. Cl.
*G11B 7/00* (2006.01)

(52) U.S. Cl. ............................... 369/44.14; 369/44.32; 369/44.11

(58) Field of Classification Search ...................... None
See application file for complete search history.

(56) References Cited

U.S. PATENT DOCUMENTS

| | | | |
|---|---|---|---|
| 5,982,735 | A | 11/1999 | Tsai |
| 6,137,765 | A * | 10/2000 | Saito et al. .................. 720/691 |
| 6,449,230 | B1 * | 9/2002 | Seto ........................ 369/53.19 |
| 6,744,716 | B1 * | 6/2004 | Takemoto ................. 369/53.19 |
| 6,971,115 | B2 * | 11/2005 | Kojima et al. ............. 720/675 |
| 2002/0075787 | A1 | 6/2002 | Inoue et al. |
| 2002/0172137 | A1 | 11/2002 | Min |

FOREIGN PATENT DOCUMENTS

| | | |
|---|---|---|
| EP | 0 978 825 A1 | 2/2000 |
| EP | 1 189 214 A2 | 3/2002 |
| JP | 59-33180 | 3/1984 |
| JP | 6-338185 | 12/1994 |
| JP | 7-45016 | 2/1995 |
| JP | 7-332470 | 12/1995 |
| JP | 8-14364 | 1/1996 |

(Continued)

*Primary Examiner*—Muhammad Edun
(74) *Attorney, Agent, or Firm*—Oblon, Spivak, McClelland, Maier & Neustadt, P.C.

(57) ABSTRACT

A disk recorder/player (1) including a skew adjusting means of a thin design is provided which includes a base (101), a disk rotation driving mechanism (102) for an optical disk (4), an optical pickup (103), first and second guide shafts (105, 106) to support the optical pickup (103) at opposite ends of the latter, an optical pickup moving means (104) guided by the first and second guide shafts (105, 106) in moving the optical pickup (103) radially of the optical disk (4), an elastic member (126) put in contact with the first and second guide shafts (105, 106) to force the first and second guide shafts (105, 106) in a direction generally perpendicular to the main side of the optical disk (4), an adjusting screw (127) put into contact with the first and second guide shafts (105, 106) from the opposite side of the elastic member (126) to move the first and second guide shafts (105, 106) in a direction opposite to the direction of forcing by the elastic member (126), and a skew adjusting means (109) which adjusts a skew, if any, by adjusting the inclination of the first and second guide shafts (105, 106) by the adjusting screw (127).

10 Claims, 28 Drawing Sheets

FOREIGN PATENT DOCUMENTS

| | | |
|---|---|---|
| JP | 08-102153 | 4/1996 |
| JP | 9-45067 | 2/1997 |
| JP | 10-283756 | 10/1998 |
| JP | 11-144403 | 5/1999 |
| JP | 11-149724 | 6/1999 |
| JP | 11-203801 | 7/1999 |
| JP | 2000-137937 | 5/2000 |
| JP | 2000-339947 | 12/2000 |
| JP | 2001-307405 | 11/2001 |
| JP | 2002-15434 | 1/2002 |
| JP | 2002-015434 | 1/2002 |
| JP | 2002-50101 | 2/2002 |
| JP | 2002-230959 | 8/2002 |
| JP | 2002-269935 | 9/2002 |
| JP | 2002-313005 | 10/2002 |
| JP | 2002-342389 | 11/2002 |
| WO | WO 01/97222 A1 | 12/2001 |

\* cited by examiner

RECORDING AND/OR PLAYBACK DEVICE

BACKGROUND OF THE INVENTION

1. Field of the Invention

The present invention generally relates to a device for recording and/or playback of information signal to and/or from a disk-shaped recording medium, and more particularly to a pickup moving mechanism which moves an optical pickup unit.

This application claims the priority of the Japanese Patent Application No. P2003-025239 filed on Jan. 31, 2003 and No. P2003-415741 filed on Dec. 12, 2003, the entirety of which is incorporated by reference herein.

2. Description of the Related Art

Some of the recent functionally improved portable electronics such as a notebook computer or the like have a CD-R/RW or DVD-ROM drive installed therein. With such a functional improvement of the portable electronics, it is demanded for these CR-R/RW and DVD-ROM drives to be able to write or read data at an improved speed or for the DVD-ROM drive to rewrite data to a DVD.

The notebook computer of a small size (B-5 size, for example) can be carried more easily and conveniently than a larger-size one (A-4 size, for example). Therefore, the notebook computer is of smaller thickness and weight while it is functionally improved. It is also demanded that the CD-R/RW or DVD-ROM drive used in the notebook computer should be designed as thin as possible.

An example of the conventional disk drives for recording or playing back data to or from CD-R/RW and DVD-ROM is schematically illustrated in FIG. 1. As shown, a disk drive of this type, generally indicated with a reference number 300, includes a body 301, a disk tray 303 provided movably between two positions, outer and inner, and having a concavity in which an optical disk 302 such as DVD or the like is to be received, and an optical pickup unit 304 housed from the rear side of the disk tray 303 and which reads information signals from the optical disk 302 set on the disk tray 303.

FIG. 2 shows the body 301 of the disk drive 300, not showing the upper half of the device body 301. The device body 301 is composed of a pair of halves, upper and lower, which are butt-joined to each other. The lower half indicated with a reference number 307 is open at the front end 307a thereof for movement of the disk tray 303, and a guide member 308 provided along each of mutually opposed lateral edges 307b and 307c thereof to guide the movement of the disk tray 303. The lower half 307 has disposed at the rear end 307d thereof a printed wiring board 309 formed from a so-called rigid substrate having formed thereon various circuit patterns on which there are electronic parts such as a connector for connection to a host apparatus and the like. The printed wiring board 309 has connected thereto an FPC (flexible printed circuit) 310 for connection to the optical pickup unit 304 housed in the disk tray 303.

As shown in FIGS. 3 and 4, the optical pickup unit 304 includes an iron-made base chassis 315 as a body of thereof and having a disk table assembly 313 provided thereon, a pair of guide rails 316 installed to the base chassis 315, a pickup base 317 having provided thereon an objective lens 312 whose movement is guided by the guide shafts 316, and a pickup moving mechanism 318 which moves the pickup base 317 on and along the guide shafts 316.

A cover member 320 is fixed with a binding screw or the like at a side the optical pickup unit 304 where the optical disk 302 is to be placed. The cover member 320 has formed therein an opening 321 through which the objective lens 312 and disk table 313 included in the optical pickup unit 304 are exposed. The cover member 320 is formed from aluminum (Al), for example. It should be noted that the optical pickup unit 304 has a metallic bottom plate 322 provided on the bottom thereof. The bottom plate 322 is fixed with a binding screw to a compartment 325 of the disk tray 303. The optical pickup unit 304 is held between the bottom plate 322 and disk tray 303.

The above base chassis 315 includes an iron-made frame 327. The frame 327 is shaped to have a generally rectangular form. It has formed therein an opening 328 through which the objective lens 312 on the pickup base 317 faces directly the signal recording surface of the optical disk 302. The opening 328 is shaped to have a generally rectangular form in which the pickup moving mechanism 318 to move the pickup base 317, pair of guide shafts 316 and the pickup base 317 supported on the guide shafts 316 are disposed. Also, the opening 328 is extended at one longitudinal end thereof a generally circular cut 329 in which there are disposed the circular disk table 313 on which the optical disc 302 is placed and a spindle motor (not shown) which rotates the disk table 313. It should be noted that the base chassis 315 has fixed thereto a rigid substrate (not shown) having a connector 354 for connection of one end of the FPC 310 for connection of the printed wiring board 309 disposed in the body 301 of the disk drive 300 and the optical pickup unit 304 to each other.

The pickup base 317 to write or read information signals to or from an optical disk placed on the disk table 313 has installed thereon at least a light source (not shown) such as a semiconductor laser, objective lens 312 to focus a light beams emitted from the light source onto the signal recording surface of the optical disk 302, a photodetector (not shown) to detect a return light from the recording surface of the optical disk 302, and a drive system which moves the objective lens 312 toward and away from the optical disk 302 (in the focusing direction) and across the optical disk 302 (in the tracking direction). Also, the pickup base 317 has an insertion hole 317b formed in one longitudinal end portion 317a thereof and through which the guide shaft 316 is passed, and an engagement piece 330 formed at the other end 317c thereof opposite to the end portion 317a and which is engaged on the guide shaft 316.

As shown in FIG. 5, the pickup base 317 includes also an engagement member 332 adjacent to the guide shaft 316 and which engages with a lead screw 331 included in the pickup moving mechanism 318 to move the pickup base 317. The engagement member 332 is projected to under the lead screw 331 from the end portion 317a through which the insertion hole 317b is formed, and has a transmission member 333 which engages with the lead screw 331. The transmission member 333 has provided at an end thereof an engagement projection 334 engaged in threads on the lead screw 331. The transmission member 333 is formed from an elastic material such as a leaf spring, so that the engagement projection 334 is kept always in mesh with the threads on the lead screw 331. Having fixed thereto the transmission member 333 which converts the rotation of the lead screw 331 into a linear movement, the pickup base 317 is moved radially of the optical disk 302 as the lead screw 331 is rotated.

Supported on the pair of guide shafts 316 disposed long the mutually opposed lateral edges of the opening 328 in the base chassis 315, the pickup base 317 is guided by the guide shafts 316 in moving between the inner and outer circumferences of the optical disk and the objective lens 312 is kept exposed to the signal recording surface of the optical disk 302 through the opening 328.

As shown in FIG. 6, the pickup moving mechanism 318 includes the lead screw 331 provided adjacent to the pair of guide shafts 316 an extending radially of the optical disk, and a DC motor 335 connected to a base end 331a of the lead screw 331 to rotate the lead screw 331.

The lead screw 331 is borne at the end 331b thereof in a frame 337 by means of the base end 331a and bearing 336. With the frame 337 fixed with a binding screw or the like to the base chassis 315 of the optical pickup unit 304, the pickup moving mechanism 318 is provided adjacent to one of the guide shafts 316. The lead screw 331 is threaded, and the engagement member 332 of the pickup base 317 is slidably engaged in with the threads on the lead screw 331. Therefore, when the lead screw 331 is rotated by the DC motor 335, it can move the pickup base 317 radially of the optical disk 302.

As mentioned above, the lead screw 331 is rotated by the DC motor 335 and the DC motor 335 will not provide any torque unless it runs at a high speed. Therefore, various points of contact of the pickup moving mechanism 318 will be abraded heavily. In case the DC motor 335 is connected to the lead screw 331 via a gear mechanism to move the pickup base 317, the operating noise will be increased.

On this account, a step motor is used as the DC motor 335 in the present invention and the pickup base 317 is moved radially of the optical disk 302 by supplying the DC motor 335 with a rectangular wave for stepwise run.

The disk tray 303 having the above optical pickup unit 304 housed therein has formed at a main side 340a of a generally rectangular tray body 340 thereof a concavity 341 in which the optical disk 302 is to be received, and at the rear side of the tray body 340 a compartment 325 in which the optical pickup unit 304 is housed. The optical pickup unit 304 housed in the compartment 325 has the cover member 343 fixed thereto. The concavity 341 has formed in the bottom thereof an opening 344 through which the cover member 343 is exposed. Thus, the cover member 343 forms a part of the concavity 341. Also, the disk table 313 supporting the objective lens 312 included in the optical pickup unit 304 and the optical disk 302 to be rotatable is exposed through the opening 344 in the cover member 343.

The concavity 341 of the disk tray 303 is generally circular, and it is defined by first to fourth walls 345 to 348 formed generally circular as shown in FIG. 3.

Of the above walls, the first wall 345 is formed at the side of the rear end 303a of the disk tray 303 to extend over the opening 344 formed in the bottom of the concavity 341. The first wall 345 has a constant clearance C between the lower edge 345a thereof opposite to the concavity 341 and the cover member 343 exposed through the opening 344 in the concavity 341.

Note that the second to fourth walls 346 to 348 are generally circular and rise from the concavity 341.

The disk tray 303 is formed by injection molding of a synthetic resin having a high rigidity such as PPE (polyphenylene ether), for example.

As shown in FIG. 7, a holding mechanism 360 for holding the disk tray 303 inside the device body 301 is formed in the compartment 325 formed the rear side of the disk tray 303 for housing the optical pickup unit 304. The holding mechanism 360 includes a forcing mechanism 361 to force the disk tray 303 to outside the device body 301, and an engagement mechanism 362 which is engaged on an engagement projection 326 provided upright on the lower half 307 of the device body 301 to achieve an engagement between the disk tray 303 and device body 301.

The forcing mechanism 361 includes an ejection member 365 to force the disk tray 303 to outside the device body 301 when pressed to a rear wall 301a of the device body 301, and a coil spring 366 which forces the ejection member 365 toward the rear wall 301a.

The ejection member 365 is shaped to have a generally stick-like shape and has a flange 365a formed nearly at the longitudinal middle thereof. Also, the ejection member 365 is disposed in a compartment 368 defined in the disk tray 303. The compartment 368 is formed near one side of the disk tray 303 to extend in the direction of inserting or ejecting the disk tray 303. The compartment 368 has a through-hole 368a formed therein at the rear end 303a of the disk tray 303 and a retention step 368b formed nearly in the middle thereof to retain the flange 365a of the ejection member 365. Also, the compartment 368 has a retention wall 369 formed in a position inner than the retention wall 368b and correspondingly near the front end 303b of the disk tray 303 to retain one end of the coil spring 366. The retention wall 369 has formed therein an insertion hole for the ejection member 365 and also an insertion space 370 for reception of the ejection member 365. The insertion hole 370 is formed in a portion inner than the retention wall 369 and further near the front end 303b of the disk tray 303.

The coil spring 366 is disposed between the retention step 368a and retention wall 369 of the compartment 368. It has the ejection member 365 inserted in the hollow space thereof, and is retained at one end thereof on the flange 365a of the ejection member 365 and at the other end on the retention wall 369.

In the forcing mechanism 361 constructed as above, the coil spring 366 forces the flange 365a of the ejection member 365 to the rear end 303a of the disk tray 303, and thus the ejection member 365 is projected from the rear end 303a as shown in FIG. 7. In this condition, the flange 365a of the ejection member 365 is retained on the retention step 368b of the compartment 368.

Next, when the disk tray 303 is housed in the device body 301, the ejection member 365 projecting from the disk tray 303 is butted to the rear wall 301a of the device body 301 and pressed back to the front end 303b of the disk tray 303 against the force of the coil spring 366. Thus, the coil spring 366 is pressed to the flange 365a of the ejection member 365 and compressed to the front end 303b. When the disk tray 303 is engaged on the device body 301 by an engagement mechanism 362 which will be described in detail later, the coil spring 366 will keep a force which forces the ejection member 365 toward the rear end 303a as shown in FIG. 8. It should be noted that at this time, the ejection member 365 is passed through the insertion hole formed in the retention wall 369 into the insertion space 370.

Then, the disk tray 303 and device body 301 are disengaged by the engagement mechanism 362 from each other, the coil spring 366 forces the flange 365a of the ejection member 365 to the rear end 303a. The ejection member 365 will be projected from the rear end 303a of the disk tray 303 through the through-hole 368a, and butted to the rear wall 301a of the device body 301. As the ejection member 365 is further forced, the coil spring 366 extends to the front end 303b of the disk tray 303 from the flange 365a of the ejection member 365 butted to the rear wall 301a of the device body 301. Therefore, as the retention wall 369 is forced to the front end 303b, the coil spring 366 will eject the disk tray 303 to outside the device body 301.

Next, there will be explained the engagement mechanism 362 which engages with the disk tray 5 and device body 7 when the disk tray 5 is inserted into the device body 7.

As shown in FIG. 9, the engagement mechanism 362 includes an engagement projection 326 provided on the lower half 307 of the device body 301 for engagement with the disk tray 303 to retain the disk tray 303 engaged in the device body 301, and an engagement piece 371 provided on the disk tray 303 and pivoted in a direction for engagement on the engagement projection 326.

The engagement projection 326 is provided near one end of the lower half 307 of the device body 301 as will be seen in FIG. 1. The engagement projection 326 is formed to be generally cylindrical. When the disk tray 303 is inserted into the device body 301, the engagement projection 326 will be engaged on the engagement piece 371 formed at the disk tray 303 to hold the latter inside the device body 301.

As shown in FIG. 9, the engagement piece 371 engaged on the engagement projection 326 includes a retaining portion 372 formed like a hook to catch the engagement projection 326, a body 373 having the retaining portion 372 formed at the end thereof, a stud 374 provided at the side of the base end of the body 373 and about which the engagement piece 371 is pivoted, and an abutting portion 376 to be put into contact with an eject button 375 which will be described in detail later. The engagement piece 371 is pivotable about the stud 374 in the direction of arrow D in FIG. 9 or in a direction opposite to the direction of arrow D. A torsion coil spring 377 is wound on the stud 374 to always force the engagement piece 371 for pivoting in the direction of arrow D in FIG. 9. With the engagement piece 371 pivoted in the direction of arrow D in FIG. 9, the retaining portion 372 is positioned on the moving orbit of the engagement projection 326 provided on the device body 301.

Note that the eject button 375 put in contact with the abutting portion 376 is provided on a control panel (not shown) formed at the front end 301b of the device body 301. When the user presses the eject button 375 for drawing out the disk tray 303, it presses the abutting portion 376 to pivot the engagement piece 371 in the direction opposite to the direction of arrow D in FIG. 9.

The engagement piece 371 has a bevel 373a formed thereon to extend from the end of the body 373 in the moving direction of the engagement projection 326 and protrude in the direction of arrow D. The hook-shaped retaining portion 372 is formed at the protruding end of the bevel 373a. Also, the engagement piece 371 has the abutting portion 376 formed at the side thereof opposite to the side where the bevel 373a is formed. Namely, the stud 374 is located between the abutting portion 376 and bevel 373a. Therefore, when the abutting portion 376 is pressed by the eject button 375, the engagement piece 371 is pivoted in the direction opposite to the direction of arrow D in FIG. 9. As the retaining portion 372 is thus pivoted in the direction of arrow D, it catches the engagement projection 326 and holds the disk tray 303 inside the device body 301. When the retaining portion 372 is pivoted in the direction opposite to the direction of arrow D to release the engagement projection 326, thus allowing the disk tray 303 to be ejected from inside the device body 301 by the aforementioned coil spring 366 and ejection member 365.

More specifically, as the disk tray 303 is inserted into the device body 301, the engagement projection 326 provided on the lower half of the device body 301 moves in the direction of arrow H in FIG. 9, abuts the bevel 373a, and thus pivots the engagement piece 371 in a direction opposite to the direction of arrow D. When the engagement projection 326 has moved over the end of the bevel 373a, the engagement piece 371 is pivoted in the direction of arrow D under the force of the torsion coil spring 377 and the retaining portion 372 is positioned again on the moving orbit of the engagement projection 326. Thus, the engagement piece 371 has the retaining portion 372 thereof engaged on the engagement projection 326 and the disk tray 303 engages with the device body 301.

For ejection of the disk tray 303 to outside the device body 301, the user operates the eject button 375 which will press the abutting portion 376. When the abutting portion 376 is pressed by the eject button 375, the engagement piece 371 is pivoted in the direction opposite to the direction of arrow D in FIG. 9. When the engagement piece 371 is thus pivoted in the direction of arrow D, the retaining portion 372 is retracted from the moving orbit of the engagement projection 326 and thus released from the engagement projection 326. Thus, the disk tray 303 and device body 301 are disengaged from each other, and the disk tray 303 is forced out of the device body 301 by the aforementioned forcing mechanism 361.

The disk tray 303 constructed as above has also an engagement portion 349 formed on each of the opposite lateral sides of the tray body 340 and which engages with the guide member 308 formed on the lower half 307. Since the engagement portion 349 is slidably engaged on the guide member 308, the disk tray 303 is guided in moving into, or to outside, the device body 301, and thus carried along with the optical pickup unit 304 into, or to outside, the device body 301.

As shown in FIG. 10, the FPC (flexible printed circuit) 310 connecting the optical pickup unit 304 housed in the disk tray 303 and the printed wiring board 309 provided on the lower half 307 of the device body 301 to each other is shaped to have a generally U-shaped form, and includes first and second linear arm portion portions 350 and 351 adjacent to each other and extending in parallel, and a circular portion 352 joining the first and second arm portion portions 350 and 351 to each other.

The first arm portion 350 is directed at the end thereof toward the rear end 307d of the lower half 307 and connected to a connector (not shown) provided at the bottom of the printed wiring board 309. Also, the first arm portion 350 is fixed to the bottom of the lower half 307. The second arm portion 351 contiguously joined to the first arm portion 350 via the circular portion 352 has the end portion 351a folded back toward the front end 307a of the lower half 307 and connected to the connector 354 provided on the optical pickup unit 304 housed in the disk tray 303. The second arm portion 351 is not fixed to the device body 301 and disk tray 303, but as the disk tray 303 is moved, the second arm portion 351 is moved into, or to outside, the device body 301 with the circular portion 352 being taken as a reference position.

More particularly, as the disk tray 303 is moved into, or to outside, the device body 301, the FPC 310 has also the second arm portion 351 thereof moved into the device body 301 as shown in FIGS. 11A to 11C. At this time, the second arm portion 351 is folded back toward the front end 307a of the lower half 307, resulting in a bending 355. As the disk tray 303 is moved, the bending 355 shifts in the moving direction of the disk tray 303. Namely, when the disk tray 303 is ejected to outside the device body 301, the second arm portion 351 of the FPC 310 is also folded back in a position near the circular portion 352 and has the end portion 351a thereof ejected to outside the device body 301 as shown in FIG. 11A. Thus, the bending 355 is formed in a position near the circular portion 352. Then, as the disk tray 303 is moved into the device body 301, the bending 355 of the second arm portion 351 of the FPC 310 shifts toward the end portion 351a correspondingly as shown in FIG. 11B. When the disk tray 303 is fully housed in the device body 301, the bending 355 of the second arm portion 351 of the FPC 310 is formed in a position near the connection with the connector 354 provided on the optical pickup unit 304 as shown in FIG. 11C.

For accurate writing or reading data to or from an optical disk used in the CD-R/RW or DVD-ROM, a light beam emitted from the optical pickup should be incident perpendicularly upon the signal recording surface of the optical disk. For such an optical disk drive, the relevant Standard permits a fixed range of the angle formed between the signal recording surface of the optical disk and the optical axis of the objective lens which focuses the light beam onto the optical disk.

Also, in such an optical disk drive, in case a light beam is not incident perpendicularly upon the signal recording surface of the optical disk, the angle of the light beam in relation to the signal recording surface is detected, and the relation in angle between the objective lens which focuses the light beam and the signal recording surface of the optical disk is adjusted by a skew adjusting mechanism.

As shown in FIG. 4, the skew adjusting mechanism 400 is provided inside the base chassis 315 in which the pickup base 317 is provided. It is provided at each of the opposite ends of each of the guide rails 316 in pair which guide the pickup base 317 in moving radially of the optical disk 302. As shown in FIG. 12, the skew mechanism 400 includes a spring 402 disposed in a holder 401 fitted on one end of the guide rail 316 and which supports the upper portion of the guide rail 316, and an adjusting screw 403 provided to abut the lower side of the guide rail 316 and which presses the guide rail 316 vertically to adjust the height of the guide rail 316.

The above holder 401 is installed to a rear side 405a of a main plate 405 included in the base chassis 315, and has formed therein an insertion opening 406 in which the end portion of the guide rail 316 is inserted. The holder 401 has the end portion of the guide rail 316 inserted therein through the insertion opening 406, and the spring 402 provided therein as shown in FIG. 12. The holder 401 has also formed in the bottom of the insertion opening 406 a screw hole 407 in which there is inserted an adjusting screw 403.

The spring 402 is a cylindrical coil spring and forces the guide rail 316 downward. The adjusting screw 403 is inserted in the screw hole 407 formed in the bottom of the holder 401 and abuts, at the top thereof, the lower side of the guide rail 316.

The above skew adjusting mechanism 400 adjusts the height of the guide rail 316 by adjusting the length, projected into the holder 401, of the adjusting screw 403. Thus, the relation in angle between the objective lens 312 which focuses the light beam and the signal recording surface of the optical disk 302 can be adjusted so that the light beam can be incident perpendicularly upon the signal recording surface.

However, the thickness of the skew adjusting mechanism 400 is a problem in implementing a demanded thinner and more compact design of the optical disk drive. That is, in case the thickness of the VDV-ROM drive casing, for example, is adapted to that of a hard disk drive having a thickness of 9.5 mm in order to reduce the thickness of the disk drive itself, no other than the adjusting margin for the height of the guide rail 316 can be reduced since the parts of the disk drive are fixed in height. Therefore, it is almost difficult to reduce the thickness of the disk drive.

Note here that the DC motor 335 included in the pickup moving mechanism 318 includes a generally rectangular housing 338 which covers the base chassis 315 as a whole including the width, as shown in FIG. 6A. Therefore, the housing 338 has a width (6 mm, for example) equivalent to the thickness of the base chassis 315 as shown in FIG. 6B.

Also, the thickness of the pickup moving mechanism 318 is a problem in implementing the above demanded thinner and more compact design of the optical disk drive. Namely, in case the thickness of the VDV-ROM drive casing, for example, is adapted to that of the hard disk drive having a thickness of 9.5 mm in order to reduce the thickness of the disk drive itself, covering the entire housing 338 of the DC motor 335 with a metallic plate will make it difficult to reduce the thickness of the disk drive to 9.5 mm since the parts of the disk drive are fixed in height.

Note that in the aforementioned optical pickup unit 304, the transmission member 333 is formed from an elastic material such as a leaf spring or the like and the engagement projection 334 is forced by the leaf spring to always be in mesh with the threads on the lead screw 331. Therefore, to move the pickup base 317 stepwise to a desired position by the DC motor 335 supplied with a predetermined rectangular-wave pulse, the engagement projection 334 has to be movable without being disengaged from the threads on the lead screw 331. On this account, the transmission member 333 should has the engagement projection 334 thereof engaged in the threads on the lead screw 331 under a strong force.

Since the DC motor 335 as a step motor provides only a weak torque, however, if the transmission member 333 is engaged in the threads on the lead screw 331 under an excessively strong force, the lead screw 331 cannot be rotated and thus the pickup base 317 cannot be moved quickly.

On the other hand, if the force for application to the transmission member 333 is weakened, the engagement projection 334 will be disengaged from the threads on the lead screw 331, supply of the rectangular-wave pulses for a predetermined number of steps to the DC motor 335 cannot move the pickup base 317 to a predetermined position and thus positioning of the pickup base 317 is inconveniently impossible.

Note here that in the disk drive 300, since the disk tray 303 formed from PPE, optical pickup unit 304 formed from iron and cover member 343 formed from aluminum are joined to each other, their differences in coefficient of linear thermal expansion from one another will cause each of the components to be distorted as the component has a higher temperature. That is, as mentioned above, the disk tray 303 is formed from a rigid material such as PPE (polyphenylene ether), the base chassis 315 of the optical pickup unit 304 housed in the disk tray 303 is formed from iron (Fe), and the cover member 343 installed to the top of the base chassis 315 and exposed through the opening 344 in the disk tray 303 is formed from aluminum (Al). Namely, these disk tray 303, base chassis 315 and cover member 343 are different in linear expansion coefficient from each other. More specifically, the linear expansion coefficient of PPE is $2.8 \times 10^{-5}$/mm° C., while the linear expansion coefficient of aluminum is $2.4 \times 10^{-5}$/mm° C. and that of iron is $1.2 \times 10^{-5}$/mm° C.

Each of the disk tray 303, base chassis 315 and cover member 343 is distorted due to such differences in linear expansion coefficient, namely, due to differences in thermal shrinkage, as they are elevated in temperature when the disk drive 300 is driven. More particularly, the aluminum-made cover member 343 is warped from the lateral edge of the opening 344 toward the optical disk 302 and will have a sliding contact with the signal recording surface of the optical disk 302 received in the concavity 341 in some cases. Particularly, since there is defined a clearance C between the lower edge of the first wall 345 and the cover member 343 (see FIG. 3), the cover member 343 will be bent toward the clearance C. Also, since the first wall 345 is located along the outer circumference of the optical disk 302 and thus incurs a relatively large axial runout, it is likely to have a sliding contact with the cover member 343.

Note here that in the aforementioned disk drive 300, the holding mechanism 360 for holding the disk tray 303 inside the device body 301 is provided to disengage the engagement mechanism 362 from the engagement projection 365 by means of the eject button 375. If the eject button 375 is pushed by mistake while data is being written to or read from the optical disk 302, the disk tray 303 and device body 301 are disengaged from each other, possibly causing a trouble in the data write or read.

Also note here that in order to prevent the FPC 310 from being caught between the device body 301 and the rear side 302a of the disk tray 303 while the disk tray 303 is being housed into the device body 301, the FPC 310 is formed to have the first arm portion 351 changed in rigidity in places.

That is to say, when the disk tray 303 is outside the device body 301, a clearance 356 is defined between the disk tray 303 and device body 301 as shown in FIG. 11A. Therefore, if the end portion 351a of the flexible FPC 310 is bent to below the clearance 356 when the disk tray 303 is housed into the device body 301, the FPC 310 will be caught between the disk tray 303 and device body 301 as shown in FIG. 13.

On this account, the FPC 310 has a cover lay 357 attached on the end portion 351a of the second arm portion 351. The cover lay 357 increases the rigidity of the end portion 351a of the second arm portion 351 in comparison with that of the rear end portion 351b. Therefore, the FPC 310 is prevented from being bent at the higher-rigidity end portion 351a thereof to below the clearance 356 when the disk tray 303 once ejected to outside the device body 301 is housed again into the device body 301, while the lower-rigidity, flexible rear end portion 351b of the second arm portion 351 is bent, so that the disk tray 303 is positively moved into the device body 301.

However, when the disk tray 303 is fully housed in the device body 301, the FPC 310 having the cover lay 357 attached on the end portion of the second arm portion 351 will have the bending 355 of the second arm portion 351 thereof shifted toward the end portion 351a and thus the bending 355 be formed in a position near the connection with the connector 354 provided on the optical pickup unit 304 as shown in FIG. 11C. The nearer to the connection with the connector 354, the larger the load to the bending 355 becomes. For a longer distance between the connection with the connector 354 and the bending 355, however, the FPC 310 should have an extra length, which will add to the cost of manufacture. Also, the cover lay 357 attached on the end portion 351a of the second arm portion 351 increases the rigidity and thus the load to the end portion 351a as well. Further, since the thickness of the device body 301 of the disk drive 300 is minimized to meet the requirement for the thinner design of a host device in which the disk drive 300 is to be used, the curvature of the bending 355 will be larger as the device body 301 is designed thinner and thus the load to the bending 355 be larger.

As the disk tray 303 is repeatedly inserted and ejected with a large load being applied to the second arm portion 351 of the FPC 310 at each time, the end portion 351a of the second arm portion 351 will crack and the circuit pattern formed in the FPC 310 will be broken.

OBJECT AND SUMMARY OF THE INVENTION

It is therefore an object of the present invention to overcome the above-mentioned drawbacks of the related art by providing an improved recording and/or playback apparatus.

The above object can be achieved by providing a recording and/or playback apparatus including, according to the present invention, a base; a disk rotation driving mechanism which supports an optical disk and rotates the optical disk; an optical pickup which focuses a light beam emitted from a light source by an objective lens onto a recording surface of the optical disk and detects a return light from the optical disk; a guide means having a first guide shaft which supports the one end of the optical pickup and a second guide shaft which supports the other end of the optical pickup, the first and second guide shafts being disposed on the base in parallel to each other radially of the optical disk; an optical pickup driving means guided by the first and second guide shafts to move the optical pickup radially of the optical disk; and a skew adjusting means including an elastic member which provides a force to the first and second guide shafts in a direction generally perpendicular to the main side of the optical disk and an adjusting screw which is in contact with the first and second guide shafts from the opposite side of the elastic member, and which adjust a skew by adjusting the inclination of the first and second guide shafts by the adjusting screw.

Also the above object can be achieved by providing a recording and/or playback apparatus including, according to the present invention, a base; a disk rotation driving mechanism which supports an optical disk and rotates the optical disk; an optical pickup which focuses a light beam emitted from a light source by an objective lens onto a recording surface of the optical disk and detects a return light from the optical disk; a guide means having a first guide shaft which supports the one end of the optical pickup and a second guide shaft which supports the other end of the optical pickup, the first and second guide shafts being disposed on the base in parallel to each other radially of the optical disk; an optical pickup driving means guided by the first and second guide shafts to move the optical pickup radially of the optical disk; and a skew adjusting means including an elastic member which provides a force to the first and second guide shafts in a direction generally perpendicular to the main side of the optical disk and an adjusting screw which is in contact with the first and second guide shafts from the opposite side of the elastic member, and which adjust a skew by adjusting the inclination of the first and second guide shafts by the adjusting screw, the adjusting screw being electroconductive or being plated to be electroconductive and having a ground potential.

Also the above object can be achieved by providing a recording and/or playback apparatus including a pickup moving mechanism using a step motor which includes, a lead screw engaged in a pickup chassis and having engaged thereon a feeding member which feeds the pickup chassis radially of a disk-shaped recording medium; a magnet rotated along with the lead screw; a magnetic coil which acts on the magnet to rotates the lead screw; and a housing which houses the magnet and magnetic coil, the housing having an opening formed in each of the upper and lower sides thereof and between a concavity in a disk tray having the pickup chassis installed therein and a bottom plate which supports the bottom of the disk tray.

Also the above object can be achieved by providing a recording and/playback apparatus including an optical pickup unit having an objective lens disposed therein; a pickup moving mechanism to move the optical pickup unit; and an engagement member which engages an pickup base of the optical pickup unit and the pickup moving mechanism with each other, the engagement member including an engagement projection engaged in threads formed on a lead screw; and a compartment provided contiguously to the pickup base to house a clearance definition member which retains the engagement projection at a distance which assures the engagement on the lead screw, the clearance definition member being housed in isolation from the wall of the compartment by a clearance smaller than the depth of engagement of the engagement projection in the threads on the lead screw.

Also the above object can be achieved by providing a recording and/or playback apparatus including, according to the present invention, an optical pickup unit including a pickup base; a pickup moving mechanism including a lead screw which moves the pickup base; and an engagement member including a side wall fixed to the pickup base and having formed outside thereof an engagement projection engaged on the lead screw; a compartment having housed therein a clearance definition member which supports the inner surface of the side wall to maintain a distance that assures the engagement between the engagement projection and lead screw; and a hinge provided on the base end of the side wall and flexible in a direction in which the side wall is moved toward or away from the lead screw, the clearance definition member including a support piece extending along the inner surface of the side wall toward outside the compartment.

Also the above object can be achieved by providing a recording and/or playback apparatus including, according to the present invention, a pickup chassis having provided thereon an optical pickup, pickup moving mechanism and a disk rotation driving mechanism; a cover member having formed therein an opening through which the pickup and disk table face the recording surface of a disk-shaped recording medium and which is connected to the pickup chassis to form a part of a concavity in which the disk-shaped recording medium is to be received; and a disk tray having formed therein the disk-shaped recording medium receiving concavity, generally circular, and having formed therein an opening through which the cover member faces directly the recording surface of the disk-shaped recording medium and which is closed by the cover member when the latter is connected to the pickup chassis, the pickup chassis, cover member and disk tray being formed from materials different in coefficient of thermal expansion from each other; the disk tray having a projection provided on a wall provided at the outer-circumferential side of the concavity and extending to above the opening to maintain a clearance between the outer-circumferential wall and the cover member which closes the opening.

Also the above object can be achieved by providing a recording and/or playback apparatus including, according to the present invention, a device body; a disk tray which is moved into, or to outside, the device body; a disk rotation driving mechanism provided on the disk tray to rotate a disk-shaped recording medium; an optical pickup to write and/or read information signals to and/or from the disk-shaped recording medium; a pickup moving mechanism to move the optical pickup between the inner and outer circumferences of the disk-shaped recording medium; and a disk tray holding mechanism to hold the disk tray inside the device body, the disk tray holding mechanism including a forcing member to force the disk tray to outside the device body; an engagement projection provided at the device body and which engages with the disk tray to keep the disk tray engaged inside the device body; an engagement piece provided on the disk tray and which is pivoted in a direction in which the engagement projection is inserted inside the device body; a pivoting piece which gets into touch with the engagement piece to limit the pivoting range of the engagement piece, to thereby engage the engagement piece onto the engagement projection or disengage the engagement piece from the engagement projection; a plunger which is engaged with the pivoting piece and inserted into a magnetic coil to pivot the pivoting piece; and a pressing piece which is put into contact with the pivoting piece when pressed by the engagement projection and thus presses the pivoting piece in a direction in which the engagement piece is engaged onto the engagement projection, when the disk tray is inserted into the device body against the force of the forcing member, the engagement piece pressing the pressing piece, the pivoting piece thus put into contact with the pressing piece being pivoted in a direction in which the engagement piece is engaged onto the engagement projection and the engagement piece being thus engaged on the engagement projection, whereby the disk tray is held inside the device body; and when the plunger pivots the pivoting piece, the engagement piece being forced in a direction in which it is disengaged from the engagement projection, whereby the disk tray is ejected to outside the device body under the force of the forcing member.

Also the above object can be achieved by providing a recording and/or playback apparatus including, according to the present invention, a chassis; a moving member including a recording medium mount on which a recording medium is to be placed and which is supported by the chassis to be movable and thus movable between a recording medium change position where it is projected forward from the chassis and a recording medium home position inside the chassis; and a flexible cable having first and second arm portions and which is flat and generally U-shaped, the first arm portion being fixed by connection to a connector with the end thereof directed to the back of the chassis, at least a part of the second arm portion of the flexible cable being flexibly bent when the moving member is moved; and the part of the flexible cable, flexibly bent when the moving member is moved between the recording medium change position and recording medium home position, being smaller in thickness than the other part of the flexible cable.

In the above recording and/or playback apparatus including the skew adjusting mechanism according to the present invention, the height of the guide shafts is adjusted by pinching the end portion of the guide shaft included in the guide means supporting the optical pickup unit between the conical elastic member and adjusting screw. Thus, the free end of the elastic member, abutting the guide shaft, is compressed while going into the bore of the base end portion having a larger diameter. Therefore, the elastic member according to the present invention can be smaller in compressed length as compared with a cylindrical elastic member, so that the height of the entire skew adjusting mechanism can be smaller. Thus, the chassis can be designed thinner.

In the recording and/or playback apparatus including the skew adjusting mechanism according to the present invention, the adjusting screw which pinches the guide shaft is electroconductive or plated to be electrically conductive to have a ground potential. Thus, the skew adjusting mechanism can be connected to the ground potential by the guide shafts. Thus, it is possible to suppress the noise taking place due to the electrical charging of the guide shafts.

Also, the step motor according to the present invention is designed thin since the housing is open at both the top and bottom thereof. The housing is held tight between the cover member and bottom plate disposed at the top and bottom, respectively, of the optical pickup unit.

As above, the magnetic field of the magnetic coil placed in the motor housing can be closed, so that the fringe magnetic field from the step motor can be inhibited from adversely affecting write or read of information signals to or from the optical disk. Also, since the step motor housing is open at both the top and bottom thereof, the heat can easily be discharged from inside the housing.

Further, in the recording and/or playback apparatus according to the present invention, the engagement projection, formed in the compartment, of the engagement member connected to the pickup base provided with the objective lens engages with the threads on the lead screw for the depth of the threads, and the elastic member is housed inside the compartment in isolation from the engagement member by a clearance smaller than the depth of engagement of the engagement projection in the threads on the lead screw between the side walls of the compartment.

Therefore, the elastic member is housed with the engagement member thereof formed on the compartment wall not being forced by the lead screw, whereby it is possible to prevent the lead screw from being applied with an excessive force which will dull the rotation of the lead screw and thus block the movement of the pickup base.

Also, even a misalignment between the engagement projection and threads on the lead screw, if any caused due to the dimensional tolerance of the engagement member or the like during movement of the pickup base, can be limited to within the clearance defined between the wall of the compartment and side wall of the elastic member. Thus, the engagement projection of the engagement member will not have any misalignment larger than the depth of engagement thereof in the threads on the lead screw and it is possible to prevent the lead screw and engagement projection from being disengaged from each other in the course of the pickup base being moved.

In the recording and/or playback apparatus according to the present invention, when the clearance definition member is received in the compartment of the engagement member, the support piece can support the side wall of the compartment over the rightward and left widths. Therefore, while the pickup base is being moved or when the recording and/or playback apparatus incorporating the engagement member falls down, the clearance definition member will relieve the load concentrated to the hinge formed on the engagement member installed integrally with the pickup base which supports the side wall having formed thereon the engagement projection which is engaged on the lead screw. Thus, the clearance definition member can prevent the recording and/or playback apparatus from being damaged.

In the above recording and/playback apparatus according to the present invention, the disk tray, base chassis and cover member are formed from materials different in coefficient of linear thermal expansion from each other. Even if each of these components is thermally deformed while data is being written to or read from the optical disk, the cover member abuts the projection formed on the lower edge of the body of the compartment wall of the disk tray and is thus prevented from warping toward the optical disk. Thus, the cover member can be prevented from having a sliding contact with the optical disk.

Also, in the recording and/or playback apparatus including the engagement mechanism according to the present invention, when the disk tray is ejected from inside the device body, the coil on a core is supplied with a current to cancel the magnetic force of the incorporated magnet. The pivoting piece opens the pivoting area so that the engagement portion thereof will retract from on the moving orbit of the engagement projection. Thus, the engagement projection is disengaged from the engagement portion of the pivoting piece and the disk tray is disengaged from the device body.

Therefore, since the magnetic force of the magnet magnetically attracting the plunger is canceled by supplying the current to the on-core coil, it is possible to prevent the disk tray from being drawn out due to an erroneous operation by the user while data is being written to or read from the optical disk. Thus, the disk tray can positively be inserted into place and ejected from there.

Also in the above recording and/or playback apparatus according to the present invention, when the moving member is housed in the chassis, the second arm portion of the flexible cable is bent at a portion thereof near the connection with the connector. Since the portion of the second arm portion near the connection is smaller in rigidity than the other portion, however, the bending-caused load to the second arm portion can be reduced. Therefore, the second arm portion can be prevented from being cracked at the free end thereof, so that the circuit pattern will not be broken.

Also, the flexibly bendable portion of the second arm portion is intended to reduce the bending-caused load when the second arm portion is bent in the portion thereof near the connection with the connector. The distance between the connection and bent portion may not be long to reduce the load applied to the second arm portion when the moving member is housed into the chassis to the second arm portion. Thus, the second arm portion may not excessively be long, which advantageously leads to a reduction of the cost of manufacture.

Further, in the recording and/or playback apparatus of the thinner design, since the height of the flexible cable when the moving member is housed in the chassis is minimized, the curvature of the bent portion of the cable is larger and a larger load will be applied to the bent portion. However, the load to the bent portion of the second arm portion when the moving member is housed into the chassis can be reduced, which also advantageously leads to the thin design of the chassis.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Figure 1:
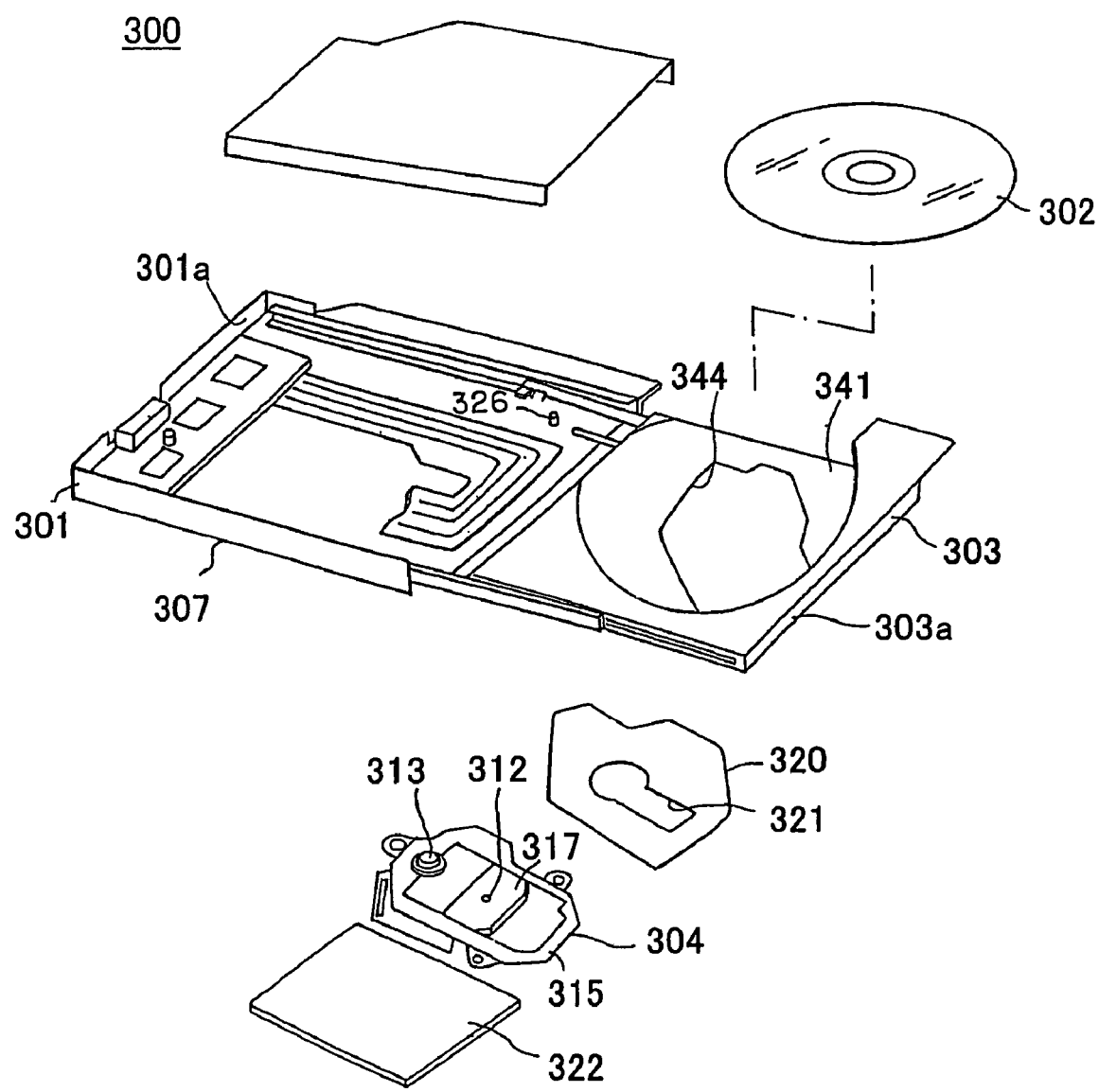
FIG. 1 is an exploded perspective view of the conventional disk drive.
Figure 2:
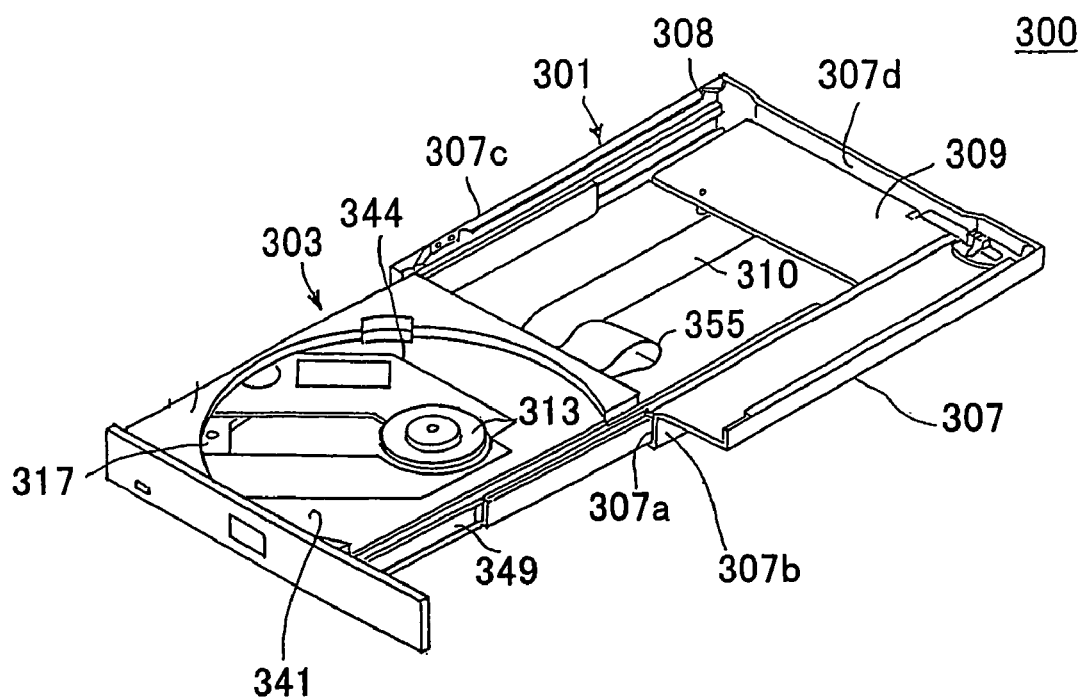
FIG. 2 is a perspective view of the disk drive in FIG. 1.
Figure 10:
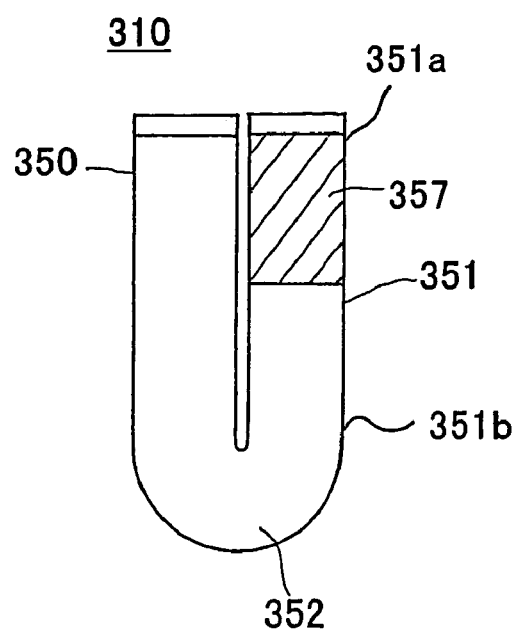
FIG. 10 is a plan view of a flexible printed wiring board used in the disk drive in FIG. 1.
Figure 3:
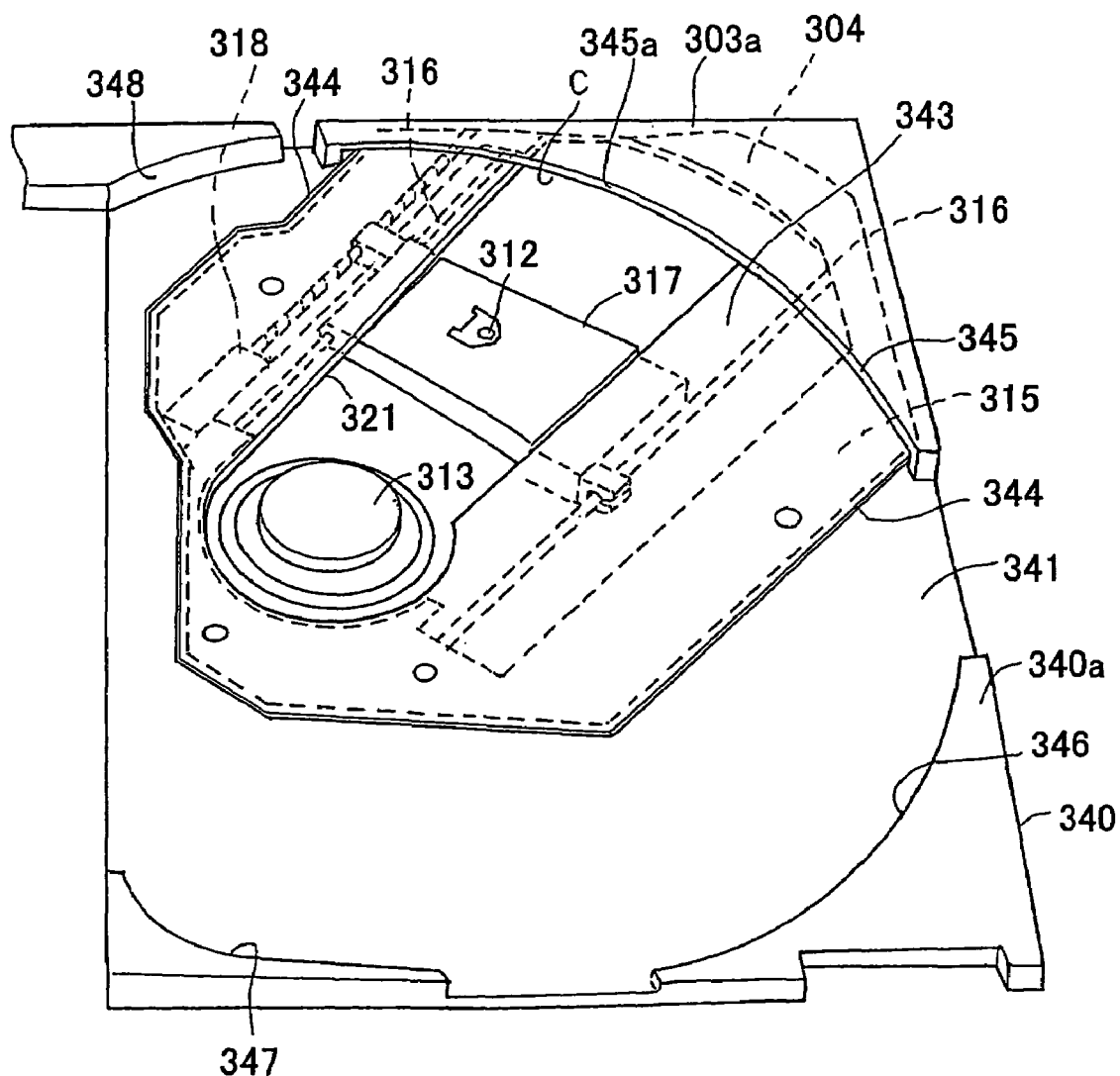
FIG. 3 is a perspective view of a disk tray used in the disk drive in FIG. 1.
Figure 4:
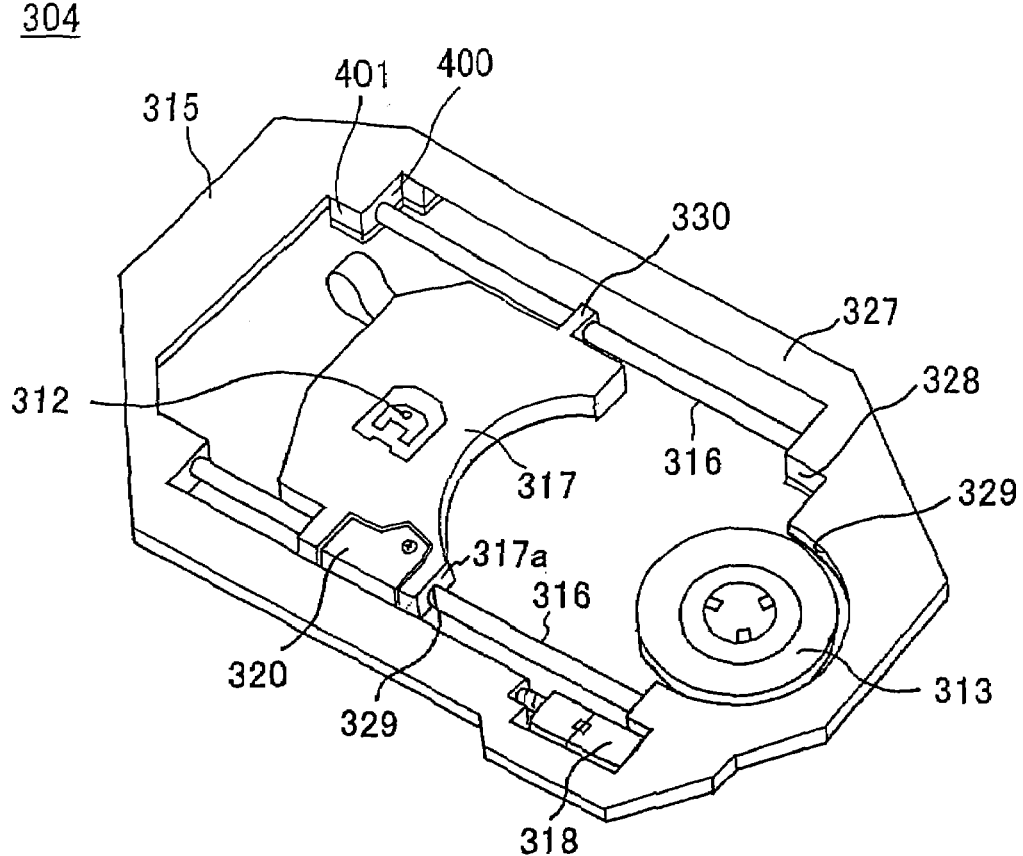
FIG. 4 is a perspective view of an optical pickup unit provided with a conventional skew adjusting mechanism.
Figure 12:
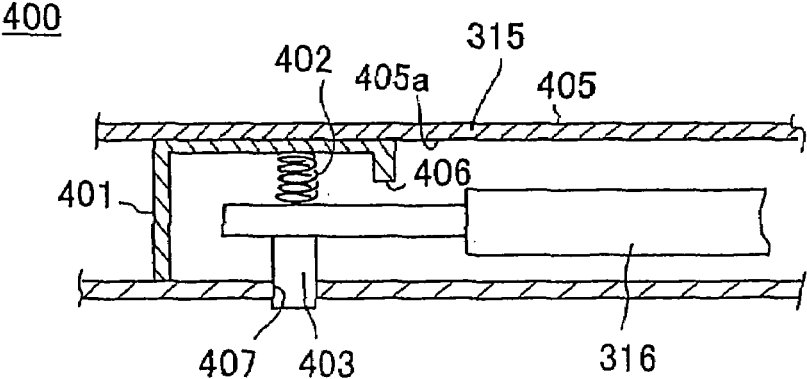
FIG. 12 is a sectional view of the skew adjusting mechanism in FIG. 4.
Figure 5:
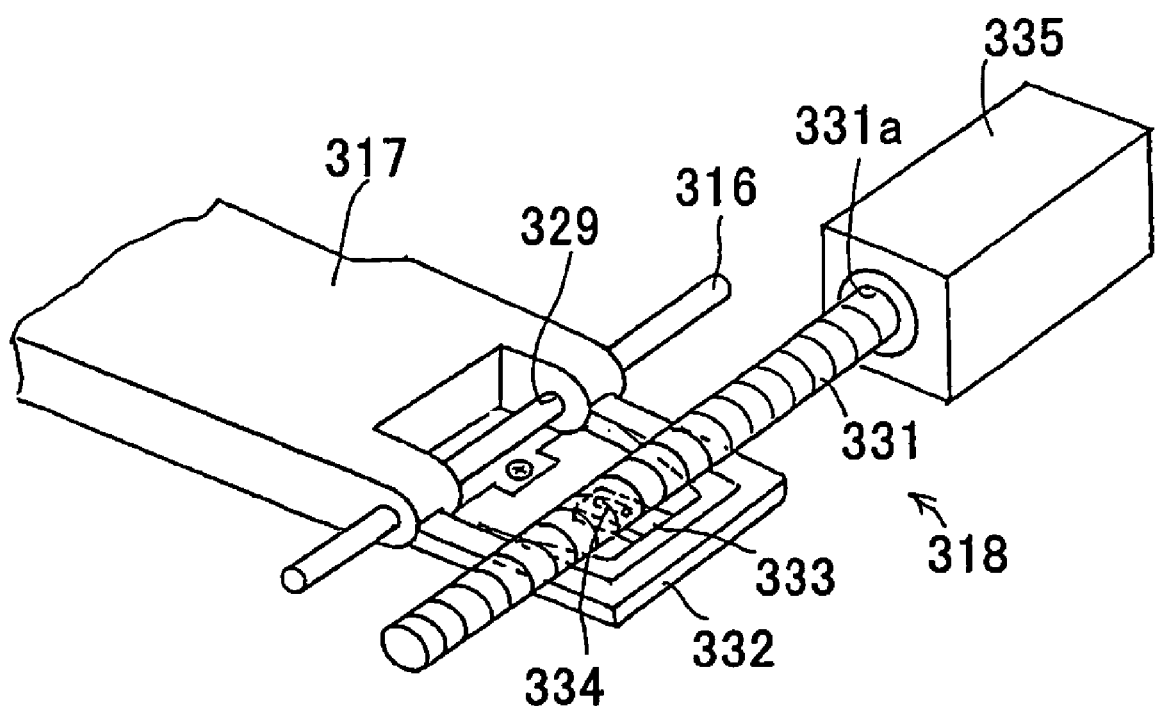
FIG. 5 is a perspective view of a pickup moving mechanism used in the disk drive in FIG. 1.
Figure 6:
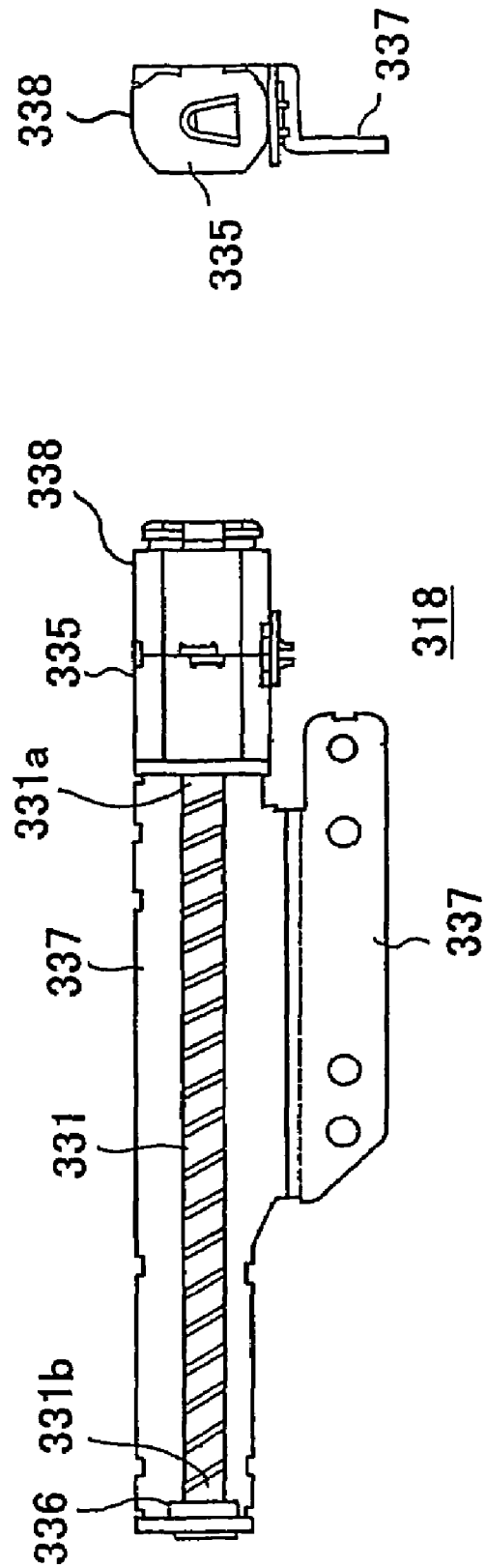
FIG. 6 is also a perspective view of the pickup moving mechanism in FIG. 5.
Figure 7:
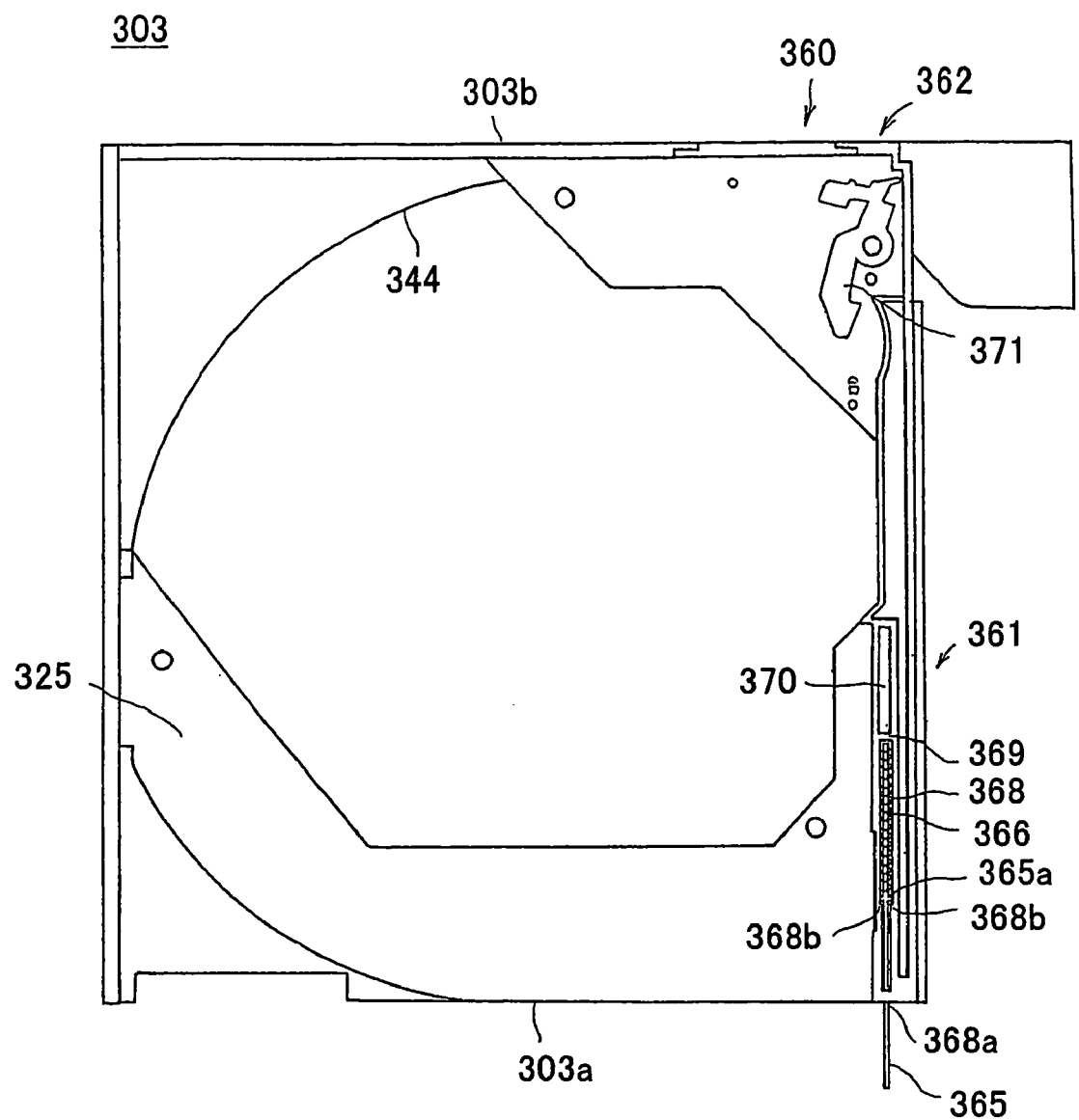
FIG. 7 is a rear view of the disk tray in FIG. 3.
Figure 8:
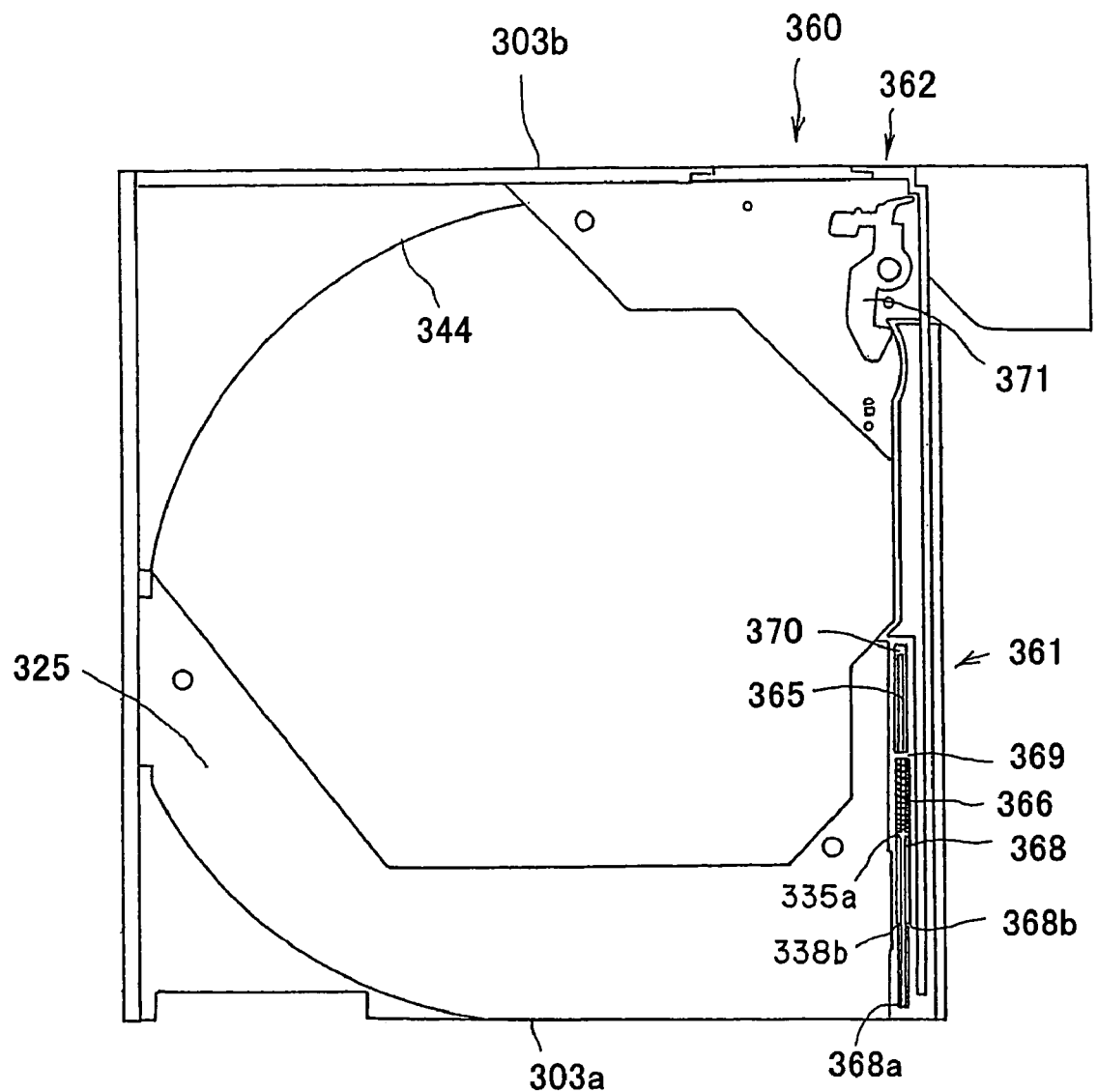
FIG. 8 is also a rear view of the disk tray in FIG. 7.
Figure 9:
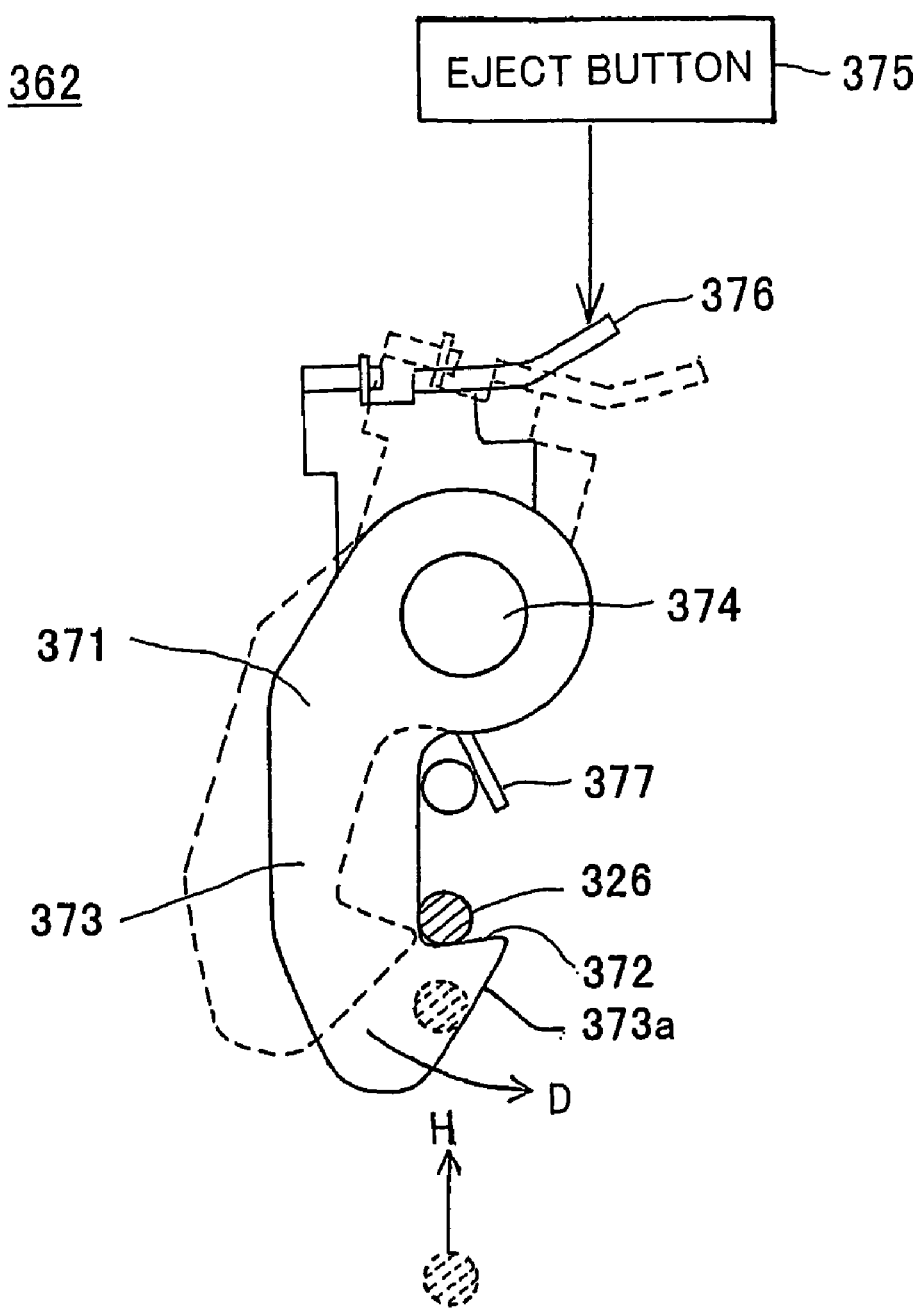
FIG. 9 is a plan view of an engagement mechanism used in the disk drive in FIG. 1.
Figure 11A:
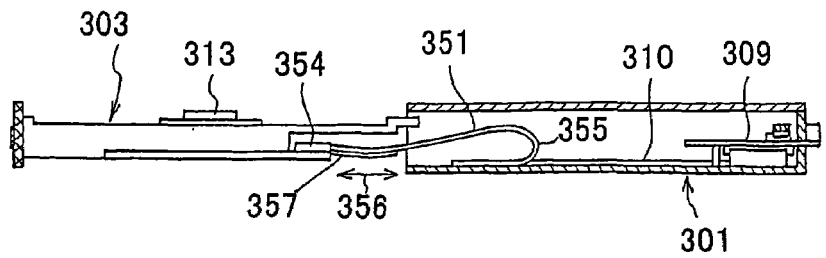
FIG. 11 is a sectional view of the disk drive in FIG. 1.
Figure 11B:
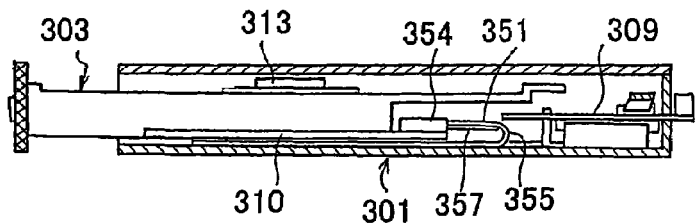
Figure 11C:
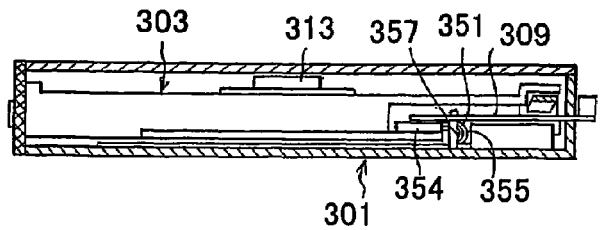
Figure 13:
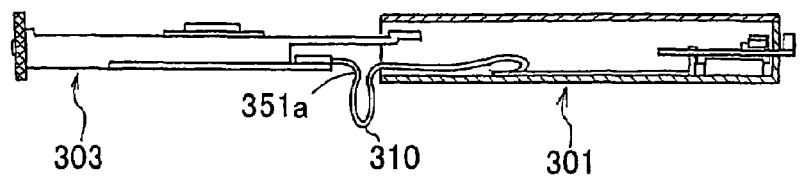
FIG. 13 is a sectional view of the disk tray and device body with the flexible printed wiring board being placed between them.
Figure 14:
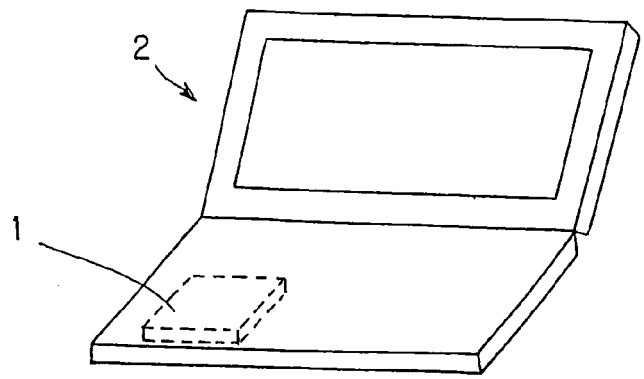
FIG. 14 is a perspective view of a notebook computer having installed therein the recording and/or playback device according to the present invention.

The disk recording and/or playback apparatus according to the present invention (will be referred to as "disk recorder/player" hereunder) will be described in detail with reference to the accompanying drawings. The recorder/player, generally indicated with a reference number 1, is a disk drive for playback of an optical disk such as CD (compact disk), DVD (digital versatile disk) and the like. It is to be installed in the drive bay of a host apparatus such as a notebook computer or the like as shown in FIG. 14.

Figure 15:
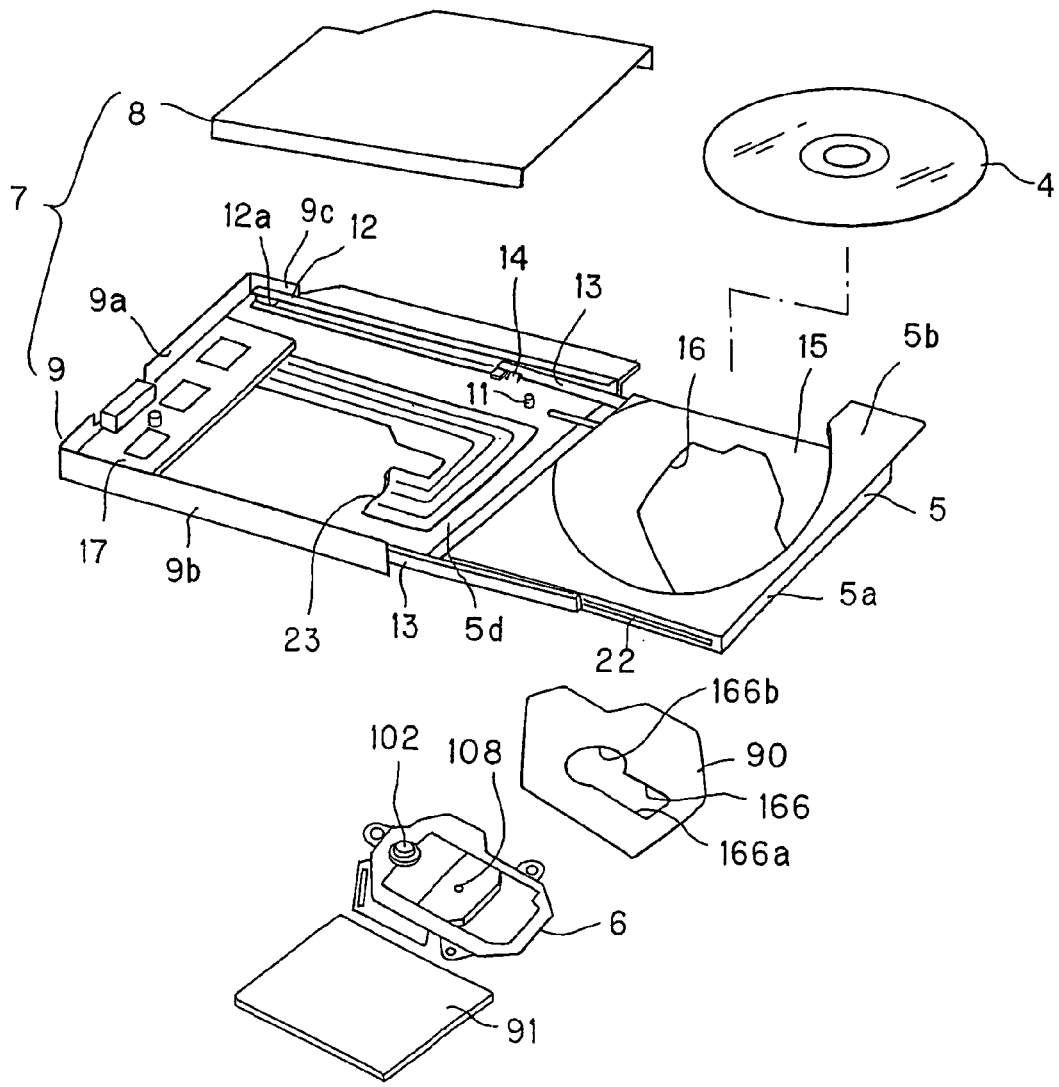
FIG. 15 is an exploded perspective view of the recording and/or playback device according to the present invention.
Figure 16:
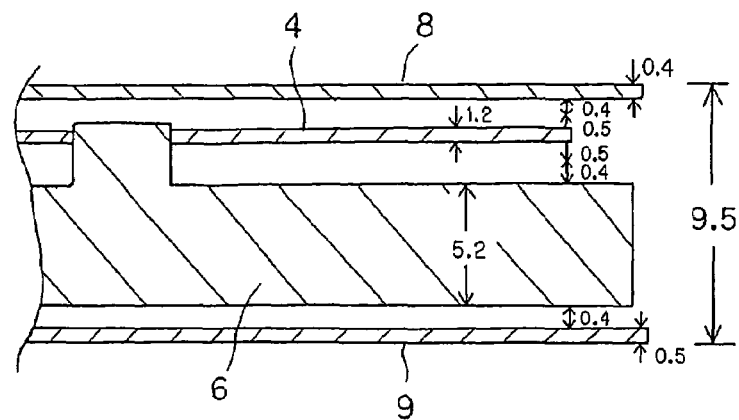
FIG. 16 is a sectional view of the recording and/or playback device in FIG. 15.

Referring now to FIG. 15, the disk recorder/player 1 is schematically illustrated in the form of an exploded perspective view. As shown, the disk recorder/player 1 includes a disk tray 5 having an optical disk 4 such as a DVD or the like placed therein, and an optical pickup unit 6 connected to the disk tray 5 to read information signals from the optical disk 4 placed on the disk tray 5. Also, correspondingly to the compact and thin design of the host apparatus 2 in which the disk recorder/player 1 is installed, the disk recorder/player 1 has a body (will be referred to as "device body" wherever appropriate hereinafter) 7 designed to have a height of about 9.5 mm, which is the same height of the hard disk drive, for example, as shown in FIG. 16. In the device body 7 having the height or thickness of 9.5 mm, the geometry of each component is as follows. That is, the optical disk 4 is 1.2 mm high or thick, the axial runout of the optical disk 4 is ±0.5 mm, the disk tray 5 connected to the optical pickup unit 6 is 5.2 mm high, clearance defined between the surface, on which the optical disk 4 is placed, of the disk tray 5 and the optical disk 4 is 0.4 mm thick, clearance defined between the disk tray 5 and the bottom of the device body 7 is 0.4 mm, and the upper and lower halves 8 and 9 joined to each other to form an outer casing of the device body 7 are 0.4 mm and 0.5 mm, respectively, thick.

The body 7 of the disk recorder/player 1 is composed of the upper and lower halves 8 and 9 butt-joined to each other. The upper and lower halves 8 and 9 are formed by punching and drilling a metallic plate.

The lower half 9 of the device body 7 has disposed thereon a circuit board 17 on which there are formed a control circuit for controlling the operation of the disk recorder/player 1, an interconnecting connector for connection of the disk recorder/player 1 to the host apparatus 2, etc. Also, the lower half 9 is open at one end thereof at which the disk tray 5 is drawn to outside the device body 7, and has a rear wall 9*a* formed at an end thereof opposite to the open end. The lower half 9 has also rising side walls 9*b* and 9*c* formed along the opposite edges thereof between which there are provided the open end and rear wall 9a.

On the opposite side walls 9b and 9c, guide rails 12 to guide the disk tray 5 for insertion into, and ejection from, the device body 7 are provided to extend from the rear wall 9a to the open end of the lower half 9. Each of the guide rails 12 is shaped to have a generally C-shaped section and has a C-shaped concavity 12a formed therein toward the device body 7. The guide rail 12 has slidably engaged in the concavity 12a thereof a guide member 13 connected to the disk tray 5. Also, the guide rail 12 has formed thereon a stopper 14 which limits the sliding range of the guide member 13 in order to prevent the disk tray 5 from being drawn out of the device body 7 to more than a predetermined length.

The guide member 13 engaged in the guide rail 12 is shaped to have a generally C-shaped section, and holds the disk tray 5 at the opposite sides to be slidable. When the disk tray 5 is ejected from, or inserted into, the device body 7, the guide member 13 slides on the guide rail 12 to guide the disk tray 5 for smooth movement.

Also, the lower half 9 has provided a rising engagement projection 11 which is engaged in a holding mechanism 18 which holds the disk tray 5 inside the device body 7. The holding mechanism 18 will be described in detail later. In addition, the lower half 9 has provided thereon near the rear wall 9a a printed wiring board 17 having a drive circuit formed thereon. The printed wiring board 17 includes a so-called rigid circuit substrate. It has a wiring pattern formed thereon and has mounted on the wiring pattern also various electronic parts such as a connector for connection to an external apparatus. Also, the printed wiring board 17 has mounted thereon an FPC (flexible printed circuit) 23 connected to the optical pickup unit 6. The FPC 25 will be described in detail later.

The disk tray 5 inserted into, and ejected to outside, the device body 7 has formed therein a concavity 15 in which the optical disk 4 is to be received. This concavity 15 is generally circular, and has formed in the main side thereof an opening 16 through which a disk table and objective lens of the optical pickup unit 6 housed in the disk tray 5 faces directly the optical disk 4. The opening 16 extends nearly from the center of the concavity 15 to the front end 5a of the disk tray 5. Also, a cover member installed to a base chassis of the optical pickup unit 6 and the disk table and objective lens installed on the base chassis and facing upward through the cover member are exposed to the optical disk 4 through the opening 16.

Figure 17:
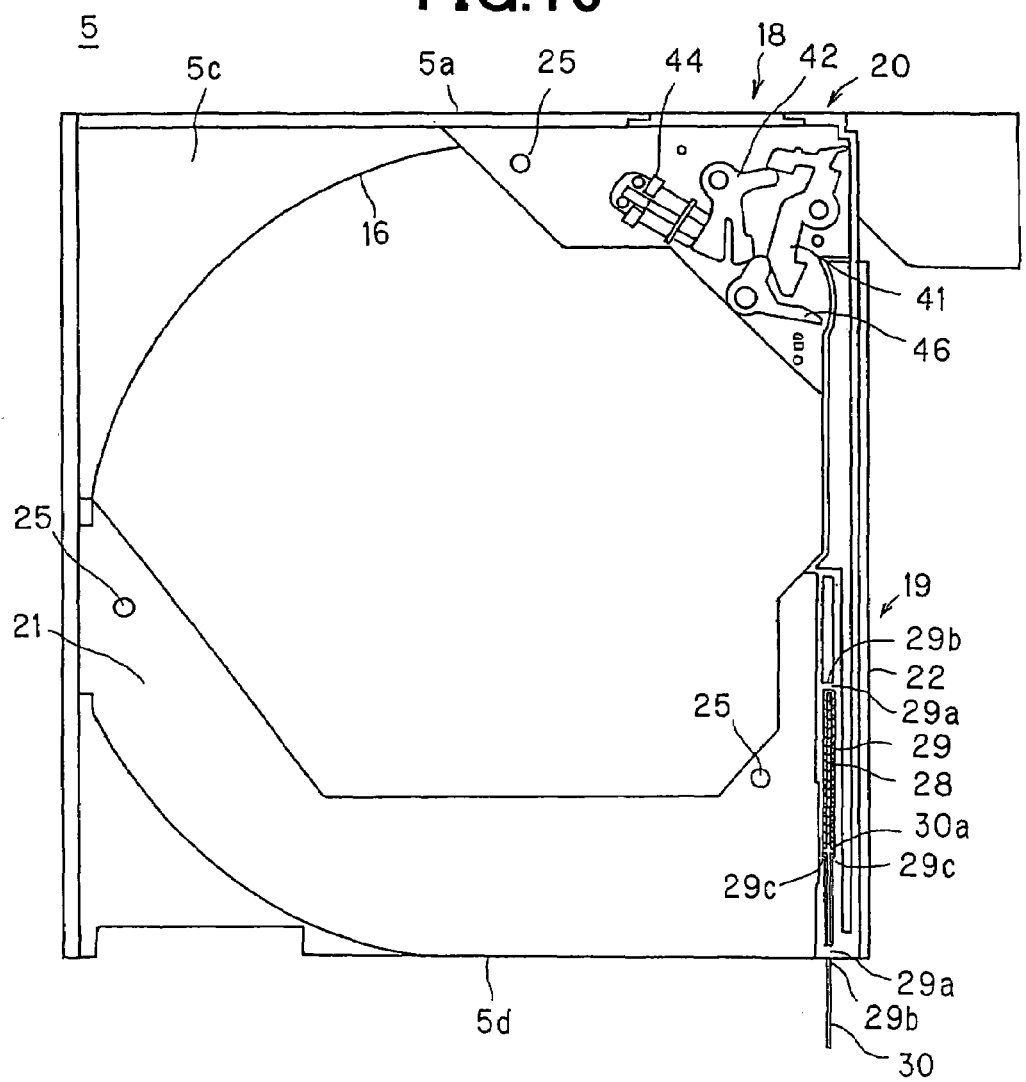
FIG. 17 is a rear vide of the disk tray in FIG. 16.

The disk tray 5 is formed from a rigid PPE (polyphenylene ether) containing glass in 20%. The generally circular concavity 15 in which the optical disk 4 is to be received is formed on a main side 5b of the disk tray 5, and the holding mechanism 18 holding a compartment 21 in which the optical pickup unit 6 is housed and the disk tray 5 engaged inside the device body 7 is formed on a rear side 5c of the disk tray 5 as shown in FIG. 17. The optical pickup unit 6 will be described in detail later.

The compartment 21 has provided therein a plurality of engagement projections 25 that engage with the optical pickup unit 6. When the engagement projections 25 are engaged in a plurality of engagement holes formed in the base chassis of the optical pickup unit 6, the compartment 21 is connected to the optical pickup unit 6.

The disk tray 5 has formed thereon a guide projection 22 extending in a direction in which the disk tray 5 is inserted into, and ejected to outside, the device body 7 and which is engaged on the guide member 13. The guide projection 22 is held slidably in the aforementioned guide member 13 to guide insertion and ejection of the disk tray 5 in relation to the device body 7. Also, the guide projection 22 has stop pieces provided at each of ends at the rear end 5d thereof at the device body 7 and at the front end 5a toward the disk tray 5 is to be drawn out. The stop pieces will not be described in detail herein. They are intended to prevent the disk tray 5 from being disengaged from the guide member 13 and projected to the front end 5a of the guide member 13.

The disk tray 5 has provided thereon the holding mechanism 18 which holds the disk tray 5 inside the device body 7. The holding mechanism 18 is formed near one edge at the rear side 5c of the disk tray 5, and includes a forcing mechanism 19 to force the disk tray 5 to outside the device body 7 and an engagement mechanism 20 which engages the disk tray 5 into the device body 7.

First, the above forcing mechanism 19 which forces the disk tray 5 to outside the device body 7 will be explained.

As shown in FIG. 17, the forcing mechanism 19 uses a coil spring 28 provided at the rear side 5c of the disk tray 5 to force out the disk tray 5 from inside the device body 7. The coil spring 28 is housed in a spring compartment 29 formed near one of the guide projections 22 to extend in the direction in which the disk tray 5 is inserted into, and ejected to outside, the device body 7. The coil spring 28 has a hollow structure in which a bar-like ejection member 30 is inserted. The ejection member 30 can be inserted in insertion holes 29b formed in walls 29a at the front end 5a and rear end 5d, respectively, of the spring compartment 29. Also, the ejection member 30 has a flange 30a formed generally at the middle of the length thereof. When the flange 30a is pressed at one side thereof by the end of the coil spring 28, the ejection member 30 is forced to the rear end 5d and the flange 30a is retained at the other side thereof by a step 29c formed at the rear end 5d of the spring compartment 29. At this time, a portion of the ejection member 30, extending from the flange 30a toward the rear end 5d, is projected to the device body 7 through the insertion hole 29b formed in the wall 29a of the spring compartment 29.

Figure 18:
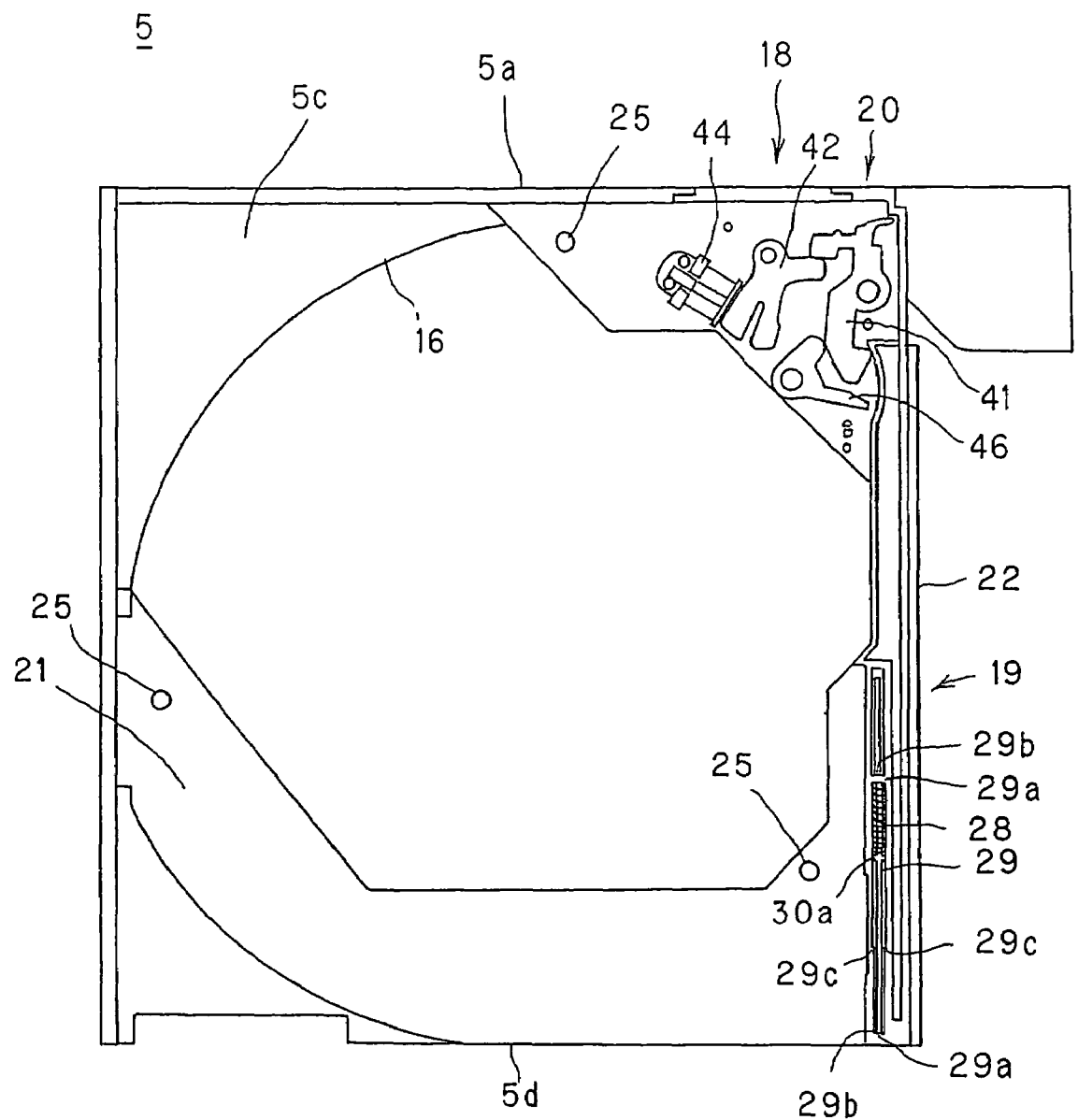
FIG. 18 is also a rear view of the disk tray in FIG. 16.

When the disk tray 5 is inserted into the device body 7, the portion, projecting toward the device body 7, of the ejection member 30 abuts the rear wall 9a of the lower half 9. As the disk tray 5 is further inserted, the ejection member 30 is forced back from the rear wall 9a and moves toward the front end 5a and compresses the coil spring 28 by the flange 30a toward the rear end 5a, as shown in FIG. 18. Since the coil spring 28 is retained at an end thereof at the front end 5a by the wall 29a of the spring compartment 29 at this time, it is compressed by the flange 30a and the force for pressing the flange 30a toward the rear end 5d is maintained. Thereafter, when the disk tray 5 is held engaged inside the device body 7 by the engagement mechanism 20 provided on the disk tray 5, the coil spring 28 holds the force for pressing the flange 30a toward the rear end 5d. The engagement mechanism 20 will be described in detail later.

When the disk tray 5 is disengaged by the engagement mechanism 20 after the above, the ejection member 30 pressed by the coil spring 28 receives a reaction equivalent to the force of the coil spring 28 from the rear wall 9a and presses the coil spring 28 by the flange 30a back to the front end 5a. Since the end, at the front end 5a, of the coil spring 28 is retained by the wall 29a of the coil compartment 29, the coil spring 28 is decompressed while pressing the wall 29a toward the front end 5a. Thus, the disk tray 5 is pressed out toward the open end of the device body 7, the front end 5a, of the disk tray 5 is projected toward the open end of the device body 7. The disk tray 5 can thus be drawn out. It should be noted that since the ejection member 30 is forced at the flange 30a by the coil spring 28 toward the rear end 5d, a portion, extending from the flange 30a toward the rear end 5d, of the ejection member 30 is projected through the insertion hole 29b formed in the wall 29a of the spring compartment 29 toward the device body 7 as shown in FIG. 16.

Next, the engagement mechanism 20 for engagement of the disk tray 5 into the device body 7 will be explained below. As shown in FIGS. 17 to 20, the engagement mechanism 20 includes an engagement projection 11 provided on the device body 7 to engage with the disk tray 5 and keep the disk tray 5 engaged in the device body 7, an engagement piece 41 provided on the disk tray 5 and forced to pivot in a direction of engaging the engagement projection 11 with the disk tray 5, a pivoting piece 42 for engaging the engagement piece 41 onto the engagement projection 11 or disengaging it from the engagement projection 11 by having a contact with the engagement piece 41 and limiting the pivoting range of the engagement piece 41, a plunger 45 engaging with the pivoting piece 42 and inserted into an on-core coil 44 to pivot the pivoting piece 42, and a pressing piece 46 pressed by the engagement projection 11 to have a contact with the pivoting piece 42 and press the pivoting piece 42 in a direction in which the engagement piece 41 will engage with the engagement projection 11.

As shown in FIG. 15, the engagement projection 11 is provided on the aforementioned lower half 9 and projected to near the open end of the guide rail 12. The engagement projection 11 is formed generally cylindrical. When the disk tray 5 is inserted into the device body 7, the engagement projection 11 is engaged on an engagement piece 41 formed on the disk tray 5 to hold the disk tray 5 inside the device body 7.

Figure 19:
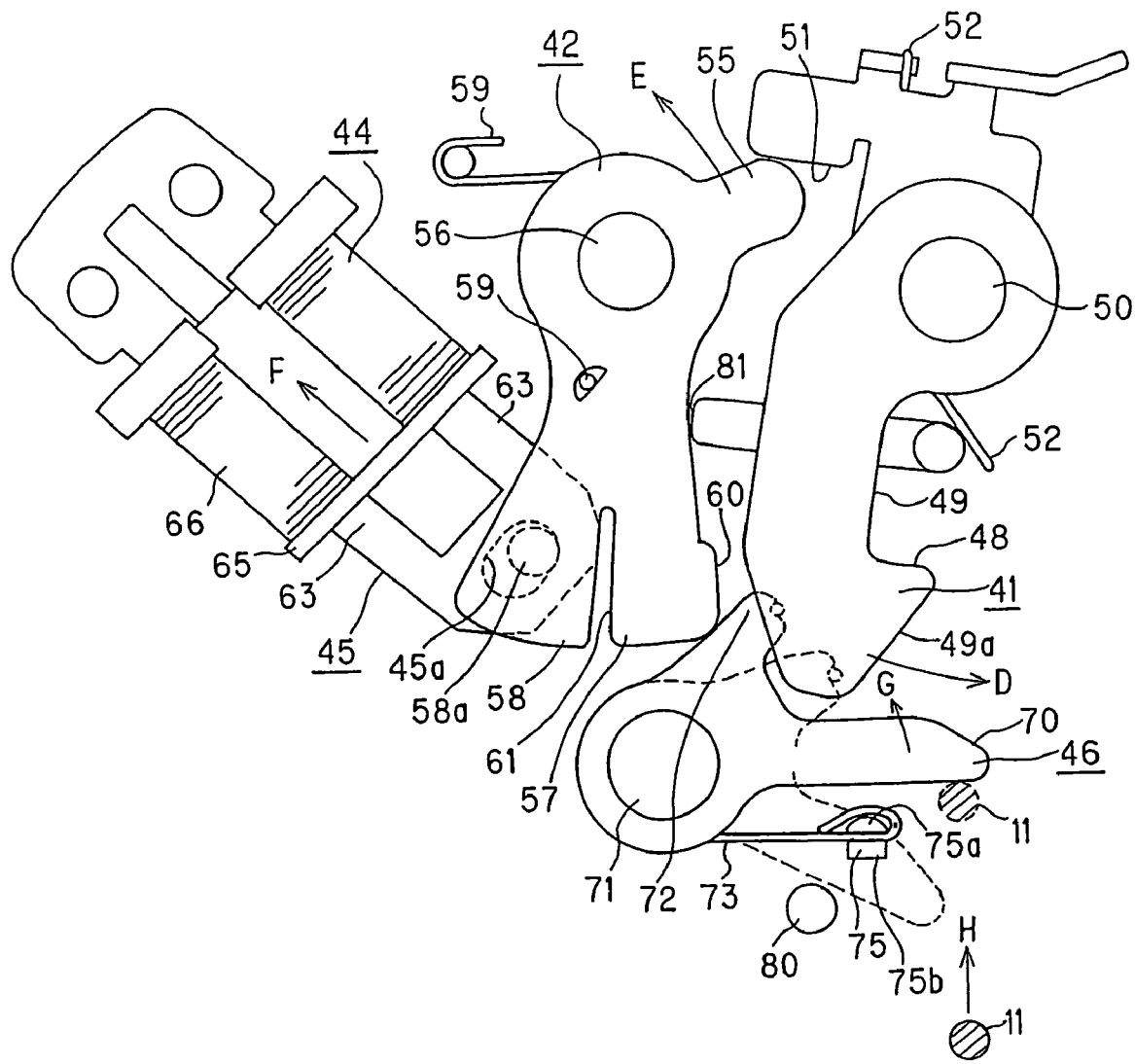
FIG. 19 is a plan view of an engagement mechanism used in the recording and/or playback device in FIG. 15.

As shown in FIG. 19, the engagement piece 41 engaged on the engagement projection 11 includes an engagement portion 48 shaped like a hook and engaged on the engagement projection 11, a body 49 having the engagement portion 48 formed at the free end thereof, a stud 50 provided at the base end of the body 49 to work as a pivot for the engagement piece 41, and an abutting portion 51 put into contact with the pivoting piece 42 which will be described in detail later. The engagement piece 41 is shaped to be pivotable about the stud 50 in the direction of arrow D in FIG. 19 or in a direction opposite to the direction of arrow D, and a torsion coil spring 52 is wound on the stud 50 to always force the engagement piece 41 for pivoting in the direction of arrow D in FIG. 19.

The engagement piece 41 has a bevel 49a formed thereon to protrude from the end of the body 49 in the moving direction of the engagement projection 11 in the direction of arrow D, and the hook-shaped engagement portion 48 is formed at the protruding end of the bevel 49a. Also, the engagement piece 41 has the abutting portion 51 formed at the side thereof opposite to the side where the bevel 49a is formed. Namely, the stud 50 is located between the abutting portion 51 and bevel 49a. Since the abutting portion 51 is pressed to abut the pivoting piece 42, the range of the pivoting in the direction of arrow D in FIG. 19 is limited. As pivoted in the direction of arrow D, the engagement portion 48 is engaged on the engagement projection 11, holds the disk tray 5 inside the device body 7. On contrary, when pivoted in the direction opposite to the direction of arrow D in FIG. 19, the engagement portion 48 is disengaged from the engagement projection 11 to enable the disk tray 5 to be ejected from inside the device body 7 by the aforementioned coil spring 28 and ejection member 30.

The pivoting piece 42 to limit the pivoting range of the engagement piece 41 includes a pivoting-range limiting projection 55 which presses the abutting portion 51 of the engagement piece 41 to limit the pivoting range, a stud 56 as a pivot for the pivoting piece 42, a contact portion 57 which is put into contact with the pressing piece 46 and pressed by the latter, and a connection 58 connected with the plunger 45.

The pivoting piece 42 is shaped to be pivotable about the stud 56 in the direction of arrow E in FIG. 19 or in a direction opposite to the direction of arrow E, and a torsion coil spring 59 is wound on the stud 56 to always force the pivoting piece 42 for pivoting in the direction of arrow E in FIG. 19.

As the engagement piece 41 is forced in the direction of arrow D in FIG. 19, thus always kept in contact with the abutting portion 51 and pivoted in either the direction of arrow E or in the direction opposite to the direction of arrow E, the pivoting-range limiting projection 55 limits the pivoting range of the engagement piece 41 by means of the abutting portion 51.

The contact portion 57 has a protrusion 60 formed at a contact thereof with the pressing piece 46. The protrusion 60 is pressed by the pressing piece 46 to pivot the pivoting piece 42 in the direction opposite to the direction of arrow E.

The connection 58 to which the plunger 45 is connected has formed at one side thereof a projection 58a inserted through a connection hole 45a formed in the plunger 45. When the pivoting piece 42 is pivoted by the pressing piece 46 in the direction opposite to the direction of arrow E, the connection 58 moves the plunger 45 toward the on-core coil 44. When the plunger 45 is held inside the on-core coil 44, the pivoting piece 42 is held directed in the direction opposite to the direction of arrow E.

Also, a slit 61 is formed between the contact portion 57 and connection 58 to permit the contact portion 57 pressed by the pressing piece 46 to be elastically movable. Therefore, the protrusion 60 formed on the contact portion 57 permits the pressing piece 46 to positively pivot the pivoting piece 42 and the pivoting piece 42 to hold the plunger 45 in the on-core coil 44, and the slit 61 can absorb the pressure by deflecting the contact portion 57 when the contact portion 57 is excessively pressed by the pressing piece 46.

Forced by the torsion coil spring 59 in the direction of arrow E in FIG. 19, the pivoting piece 42 pivots the pivoting-range limiting projection 55 put in contact with the abutting portion 51 of the engagement piece 41 in the direction of arrow E to pivot the engagement piece 41 in the direction opposite to the direction of arrow D. Thus, the engagement portion 48 of the engagement piece 41 is disengaged from the engagement projection 11 provided upright on the lower half 9 of the device body 7, and the disk tray 5 is ejected to outside the device body 7.

Also, when the disk tray 5 is inserted into the device body 7 and the contact portion 57 is pressed by the pressing piece 46 which will be described in detail later, the pivoting piece 42 is pivoted in the direction opposite to the direction of arrow E. When the plunger 45 connected to the contact portion 57 is held inside the on-core coil 44, the pivoting-range limiting projection 55 is pivoted in the direction opposite to the direction of arrow E to pivot the engagement piece 41 in the direction of arrow D in FIG. 20. Thus, the engagement portion 48 of the engagement piece 41 is engaged on the engagement projection 11 and the disk tray 5 is held inside the device body 7.

The plunger 45 which holds the pivoting piece 42 directed in the direction opposite to the direction of arrow E is a generally U-shaped magnetic member. It has a pair of insertion shafts 63 which are to be inserted into the on-core coil 44, and has a connection hole 45a formed in the base-end portion thereof. With the projection 58a formed on the connection 58 of the pivoting piece 42 being inserted into the connection hole 45a, the plunger 45 is connected to the pivoting piece 42.

Figure 20:
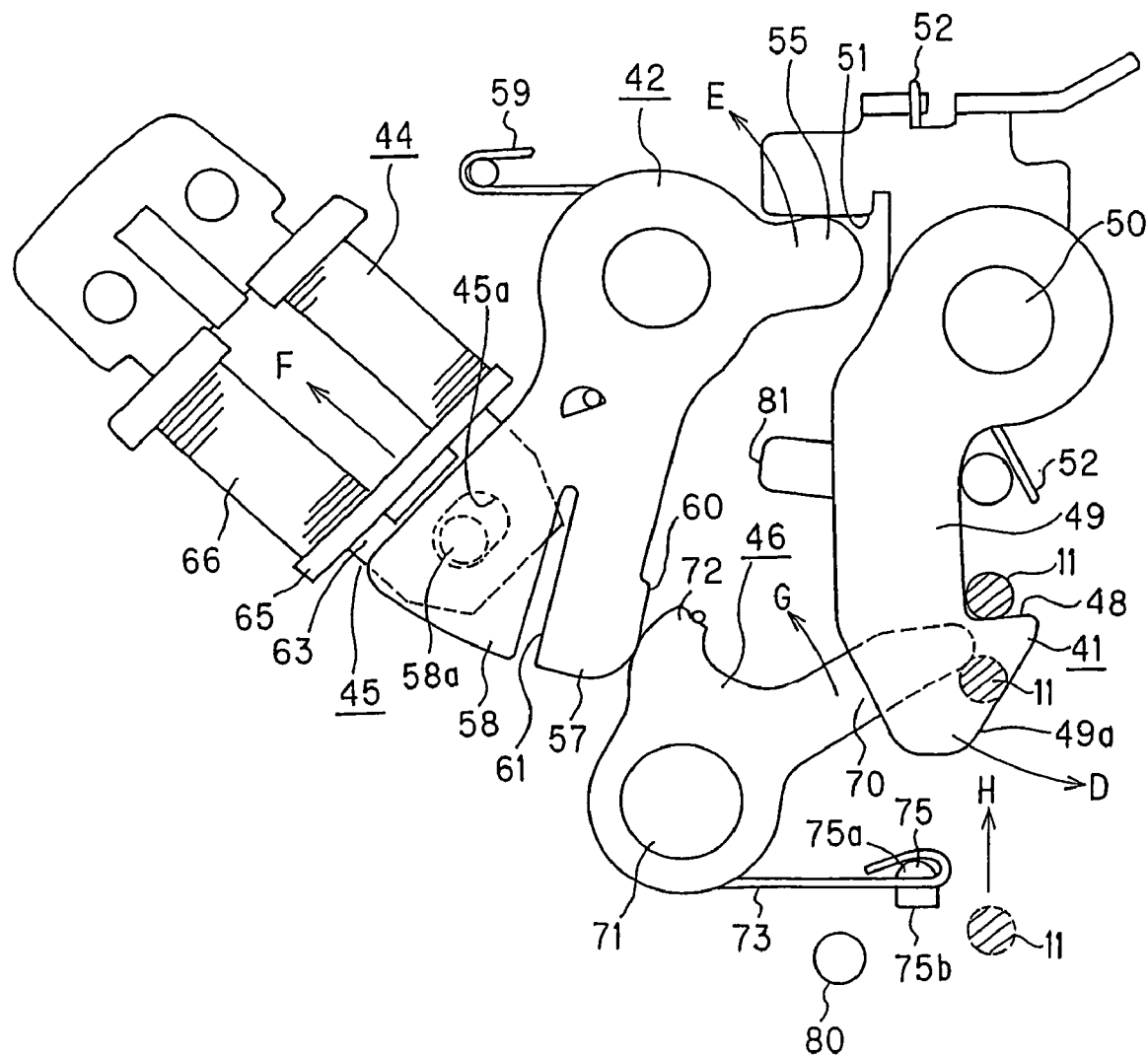
FIG. 20 is also a plan view of the engagement mechanism in FIG. 19.

The on-core coil 44 in which the insertion shaft 63 of the plunger 45 is passed has a coil 66 wound on a hollow core 65 in which the insertion shaft 63 is inserted. Also, the on-core coil 44 incorporates a magnet (not shown) which magnetically attracts the insertion shaft 63 away from the inserted end of the insertion shaft 63 in the direction of arrow F in FIG. 19. When the pivoting piece 42 is pivoted in the direction opposite to the direction of arrow E and the insertion shaft 63 of the plunger 45 is inserted deeper into the on-core coil 44, the insertion shaft 63 is held by the magnet in the on-core coil 44 as shown in FIG. 20. Also, when a current is supplied to the coil 66, the on-core coil 44 will cancel the magnetic force of the magnet magnetically attracting the insertion shaft 63 to free the plunger 45. When the plunger 45 is thus freed, the pivoting piece 42 is pivotable under the force of the torsion coil spring 59 in the direction of arrow E.

The pressing piece 46 which abuts the contact portion 57 of the pivoting piece 42 to press the latter includes an arm portion 70 which is pressed by the engagement projection 11 provided upright on the device body 7, a stud 71 provided at the base end of the arm portion 70 and about which the pressing piece 46 is pivoted, and a pressing portion 72 which presses the contact portion 57 of the pivoting piece 42 to pivot the latter.

The pressing piece 46 is formed to be pivotable about the stud 71 in the direction of arrow G or in a direction opposite to the direction of arrow G in FIG. 19, and a torsion coil spring 73 is wound on the stud 71 to hold the pressing piece 46 in a position where the arm portion 70 intersects the moving orbit of the engagement projection 11 as shown in FIG. 19. That is, the pressing piece 46 is returned by the torsion coil spring 73 to the home position after the arm portion 70 is pressed by the engagement projection 11 and thus pivoted in the direction of arrow G to pivot the pivoting piece 42 in the direction opposite to the direction of arrow E or even when the contact portion 57 collides with the pivoting piece 42 having been pivoted in the direction of arrow E to cause the pivoting piece 42 to pivot in the direction opposite to the direction of arrow G.

The torsion coil spring 73 to limit the position of the pressing piece 46 is wound on the stud 71 and has one end thereof retained by the pressing piece 46 and at the other end by a retaining member 75 formed on the rear side 5c of the disk tray 5. The retaining member 75 consists of a semi-circular retention piece 75a and a rectangular retention piece 75b between which a constant clearance is defined. The torsion coil spring 73 is inserted at the other end thereof into the clearance and wound on the semi-circular retention piece 75a. Since the retention piece 75a is formed semi-circular while the retention piece 75b is formed rectangular, the torsion coil spring 73 cannot be wound on the retention piece 75b but is only wound on the semi-circular retention piece 75a. Therefore, the torsion coil spring 73 applies an optimum force to the pressing piece 46, so than the pressing piece 46 once pressed by the engagement projection 11 and pivoting piece 42 to pivot in the direction of arrow G or in the direction opposite to the direction of arrow G can be return to the home position where the arm portion 70 intersects the moving orbit of the engagement projection 11.

Note that in a position near the area where the arm portion 70 is pivoted and at a side opposite to the direction of arrow G and, there is provided a stopper 80 which stops the arm portion 70 from being excessively pivoted. The stopper 80 is a cylindrical projection, for example, provided on the rear side 5c of the disk tray 5. When the contact portion 57 of the pivoting piece 42 pivoted in the direction of arrow E collides with the pressing piece 46 which will thus be pivoted in the direction opposite to the direction of arrow G, the arm portion 70 is limited by the stopper 80 from being excessively pivoted in the direction opposite to the direction of arrow G as shown with a dashed line in FIG. 19. Thus, the pressing piece 46 assures that the arm portion 70 can be back to the moving orbit of the engagement projection 11.

More specifically, on the assumption that the arm portion 70 will not return to the moving orbit of the engagement projection 11, the latter will not allow the arm portion 70 when the disk tray 5 is inserted into the device body 7. Thus, the pressing piece 46 cannot pivot the pivoting piece 42 in the direction of arrow E and the engagement piece 41 cannot be pivoted in the direction of arrow D to engage onto the engagement projection 11. Thus, the arm portion 70 of the pressing piece 46 has the pivoting range thereof limited by the stopper 80 provided to assure that the arm portion 70 can be back to the moving orbit of the engagement projection 11 without fail.

In the engagement mechanism 20 including the engagement projection 11, engagement piece 41, pivoting piece 42, plunger 45 and pressing piece 46 as mentioned above, when the disk tray 5 is outside the device body 7, the pivoting piece 42 is forced in the direction of arrow E, retained by a stop wall 81 provided on the disk tray 5 and thus limited from pivoting in the direction of arrow E as shown in FIG. 19. Also, the engagement piece 41 has the abutting portion 51 thereof pivoted by the pivoting-range limiting projection 55 of the pivoting piece 42 in the direction opposite to the direction of arrow D and the engagement portion 48 thereof kept in a position where it is retracted from the moving orbit of the engagement projection 11. Therefore, the lower half 9 of the device body 7 having the engagement projection 11 provided upright thereon and the disk tray 5 are disengaged from each other, the rear wall 9a of the lower half 9 is forced by the ejection member 30 forced by the coil spring 28 provided on the disk tray 5, and thus the disk tray 5 is ejected to outside the device body 7.

When the user inserts the disk tray 5 into the device body 7 with an optical disk 4 set in place in the concavity 15 of the disk tray 5, the engagement projection 11 provided on the lower half 9 goes forward in the direction of arrow H in FIG. 19 and gets in touch with the arm portion 70 of the pressing piece 46. Thus the arm portion 70 is pivoted in the direction of arrow G in FIG. 20. As the arm portion 70 is thus pivoted, the pressing portion 72 of the pressing piece 46 presses the contact portion 57 of the pivoting piece 42 which will thus be pivoted in the direction opposite to the direction of arrow E in FIG. 20. Thus, the plunger 45 connected to the connection 58 of the pivoting piece 42 will have the insertion shaft 63 inserted deep into the on-core coil 44 and magnetically attracted by the magnet disposed inside the on-core coil 44.

At this time, the pressing piece 46 presses the protrusion 60 formed on the contact portion 57 that gets into touch with the pressing portion 72 of the pressing piece 46 to positively pivot the pivoting piece 42 in the direction opposite to the direction of arrow E, so that the plunger 45 can be magnetically attracted by the magnet disposed inside the on-core coil 44. Also, the slit 61 formed between the contact portion 57 and connection 58 of the pivoting piece 42 allows the contact portion 57 to elastically be displaceable. Therefore, when excessively pressed by the pressing piece 46, the contact portion 57 can be deflected to absorb the excessive pressure.

Thus, the plunger 45 and pivoting piece 42 are kept pivoted in the direction opposite to the direction of arrow E in FIG. 20 against the force of the torsion coil spring 59 given in the direction of arrow E in FIG. 20. When the pivoting-range limiting projection 55 of the pivoting piece 42 is pivoted in the direction opposite to the direction of arrow E, the engagement piece 41 has the pivoting range thereof increased in the direction of arrow D and the force of the torsion coil spring 52 given in the direction of arrow D in FIG. 20 positions the engagement portion 48 on the moving orbit of the engagement projection 11 as shown in FIG. 20.

As the disk tray 5 is inserted deeper in the device body 7, the engagement projection 11 goes forward in the direction of arrow H in FIG. 20 while pivoting the bevel 49a on the free end portion of the body 49 of the engagement piece 41 in the direction opposite to the direction of arrow D, and is engaged on the engagement portion 48. Thus, the disk tray 5 and the lower half 9 of the device body 7 engage with each other.

At this time, the ejection member 30 is pressed back from the rear wall 9a of the lower half 9 and moves toward the front end 5a while compressing the coil spring 28 by the flange 30a thereof toward the front end 5a, as shown in FIG. 18. Since the coil spring 28 has the end thereof at the front end 5a retained by the wall 29a of the spring compartment 29, it is pressed by the flange 30a and thus compressed to keep a force under which the flange 30a is forced toward the rear end 5d. That is, the disk tray 5 is held in place inside the device body 7 while forcing the lower half 9 toward the rear end 5d to engage the engagement piece 41 on the engagement projection 11 provided on the lower half 9.

To eject the disk tray 5 from inside the device body 7, the control circuit supplied with a command signal from a user's control unit provided on the disk tray 5 supplies a current to the on-core coil 44 to cancel the magnetic force of the magnet built in the on-core coil 44. Thus the plunger 45 is freed. Therefore, the pivoting piece 42 is pivoted in the direction opposite to the direction of arrow E in FIG. 19 under the force of the torsion coil spring 59. When the pivoting-range limiting projection 55 is pivoted in the direction of arrow E, the engagement piece 41 is pivoted in the direction opposite to the direction of arrow D and has the engagement portion 48 thereof retracted from on the moving orbit of the engagement projection 11. Thus, the engagement projection 11 is disengaged from the engagement portion 48, so that the disk tray and the lower half 9 of the device body 7 will be disengaged from each other.

Then, the ejection member 30 having the free end thereof thrust upon the rear wall 9a of the lower half 9 is given a reaction equivalent to the force of the coil spring 28 from the rear wall 9a, and thus forces back the coil spring 28 by the flange 30a toward the front end 5a. Since the coil spring 28 has the end thereof at the front end 5a retained by the wall 29a of the coil compartment 29, it is decompressed while pressing the compartment wall 29a toward the front end 5a. Thus, the disk tray 5 is pressed out toward the open end of the device body 7 and thus has the front end 5a thereof ejected toward the open end of the device body 7.

Note that since the arm portion 70 is retained by the stopper 80 also when pivoting of the pivoting piece 42 in the direction of arrow E has caused the pressing portion 72 of the pressing piece 46 to collide with the contact portion 57 of the pivoting piece 42 and thus pivoted the pressing portion 72 in the direction opposite to the direction of arrow G, it can be avoided that the arm portion 70 will excessively be pivoted and not be positioned on the moving orbit of the engagement projection 11. Also, the torsion coil spring 73 wound on the pressing piece 46 can be retained in an appropriate position by the retaining member 75 formed on the rear side 5c of the disk tray 5 and thus provides an optimum force to the pressing piece 46. Therefore, even when having been pressed by the engagement projection 11 and pivoting piece 42 and pivoted in the direction of arrow G or in the direction opposite to the direction of arrow G, the pressing piece 46 is returned to the initial position where the arm portion position 70 intersects the moving orbit of the engagement projection 11 as indicated with a solid line in FIG. 19.

Note that the protrusion 60 formed on the contact portion 57 of the pivoting piece 42 as above may be formed on the pressing portion 72 of the pressing piece 46 or on both the pivoting piece 42 or pressing piece 46.

Next, the optical pickup unit 6 installed in the compartment 21 provided at the rear side 5c of the disk tray 5 will be explained.

Figure 21:
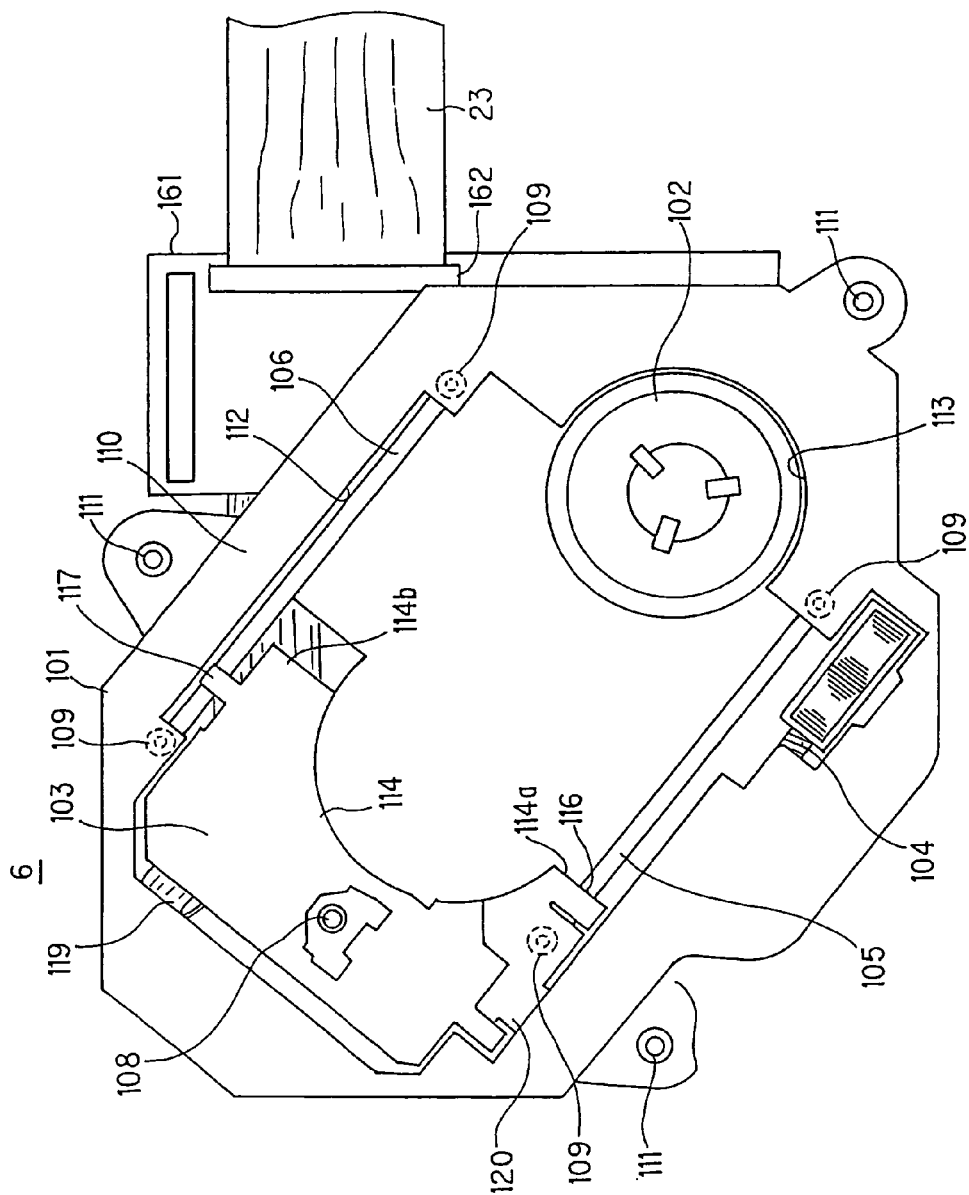
FIG. 21 is a plan view of an optical pickup unit used in the recording and/or playback device in FIG. 15.

As shown in FIG. 21, the optical pickup unit 6 includes a base chassis 101 forming the unit body, a disk table 102 formed integrally with the base chassis 101 and on which an optical disk 4 is placed, an optical pickup 103 to write or read information signals to or from the optical disk 4 placed in place on the disk table 102, a pickup moving mechanism 104 to move the optical pickup 103 radially of the optical disk 4, a pair of guide shafts 105 and 106 to guide the movement of the optical pickup 103 by the pickup moving mechanism 104, and a skew adjusting mechanism 109 to adjust the relation in inclination between an objective lens 108 provided on the optical pickup 103 and the signal recording surface of the optical disk 4 by adjusting the inclination of the guide shafts 105 and 106.

The base chassis 101 includes an iron-made frame 110. The frame 110 is formed generally rectangular, and has an opening 112 through which the objective lens 108 of the optical pickup 103 faces directly the signal recording surface of the optical disk 4. The opening 112 is formed generally rectangular. In the opening 112, there are disposed the pickup moving mechanism 104 to move the optical pickup 103 longitudinally, pair of guide shafts 105 and 106 and the optical pickup 103 supported on the guide shafts 105 and 106. The opening 112 has a generally circular cut 113 formed at one longitudinal end thereof. Also, the circular disk table 102 on which an optical disk 4 is placed and a spindle motor (not shown) to drive the rotation of the disk table 102 are disposed in the opening 112.

The frame 110 has a plurality of engagement holes 111 through which the base chassis 101 is engaged on a plurality of engagement projections 25 provided in the compartment 21 formed on the rear side 5c of the disk tray 5. With the engagement projections 25 being engaged in the corresponding engagement holes 111, the frame 110 is housed in the compartment 21.

As shown, the optical pickup 103 to write or read information signals to or from the optical disk 4 placed on the disk table 102 includes a pickup base 114 formed from a generally rectangular case. On this pickup base 114, there are disposed at least a light source (not shown) such as a semiconductor laser or the like, objective lens 108 to focus a light beam emitted from the light source onto the signal recording surface of the optical disk 4, photodetector (not shown) to detect a return light from the recording surface of the optical disk 4, and a drive system which moves the objective lens 108 in directions of focusing and tracking the optical disk 4. Also, the optical pickup 103 has formed in a longitudinal one end 114*a* of the pickup base 114 an insertion hole 116 in which the guide shaft 105 is inserted, and formed at the other end 114*b* thereof an engagement piece 117 which engages on the guide shaft 106. The guide shafts 105 and 106 will be described in detail later. The pickup base 114 has installed thereon a flexible printed wiring board 119 having formed thereon a drive circuit for controlling the drive system for the objective lens 108 and the like.

Also, the optical pickup 103 has formed thereon an engagement member 120 provided adjacent to the guide shaft 105 and which engages with a lead screw 140 of the pickup moving mechanism 104 which moves the pickup base 114.

Supported on the pair of guide shafts 105 and 106 disposed along opposite edges, respectively, of the opening 112 in the base chassis 101, the optical pickup 103 is guided by the guide shafts 105 and 106 in moving between the inner and outer circumferences of the optical disk 4, and has the objective lens 108 thereof exposed the signal recording surface of the optical disk 4 through the opening 112.

The guide shafts 105 and 106 in pair to guide the movement of the optical pickup 103 are disposed opposite to the opening 112 in the base chassis 101. The guide shaft 105 (106) is thinner at opposite ends thereof than the main portion. The end-portion diameter of the guide shaft 105 (106) is about 1.2 mm, for example. The guide shaft 105 (106) is supported at the opposite ends thereof by the skew adjusting mechanism 109 which adjusts the vertical inclination of the guide shafts 105 and 106. The guide shafts 105 and 106 are formed from an electroconductive material. Since an adjusting screw used with each guide shaft is formed also from an electrically conductive material, grounding of the adjusting screw makes it possible to remove the charge on the guide shafts 105 and 106.

Figure 22:
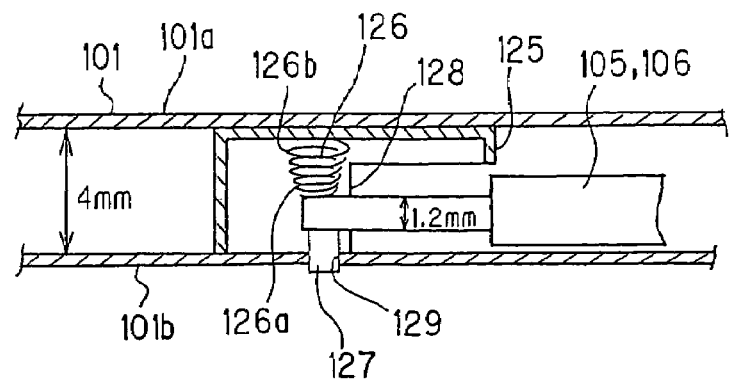
FIG. 22 is a sectional view of a skew adjusting mechanism used in the recording and/or playback device in FIG. 15.

As shown in FIG. 21, the skew adjusting mechanism 109 is provided at four places correspondingly opposite ends of the pair of guide shafts 105 and 106. As will be seen in FIG. 22, the skew adjusting mechanism 109 includes a housing 125 provided inside the base chassis 101, an elastic member 126 provided inside the housing 125 to force the guide shafts 105 and 106, and an adjusting screw 127 provided at a side opposite to the elastic member 126 across the guide shaft 105 (106) to press the guide shaft 105 (106) from a side opposite to the elastic member 126.

The housing 125 is disposed between the upper and lower sides 101*a* and 101*b* of the base chassis 101. Also, the housing 125 has formed therein an insertion hole 128 in which one end of the guide shaft 105 (106) is inserted. In the housing 125, there is housed the elastic member 126 which forces the guide shafts 105 and 106. The adjusting screw 127 inserted in a screw hole 129 formed in the lower side 101*b* of the base chassis 101 is exposed inside the housing 125.

The elastic member 126 is a helical spring formed generally conical, for example. The elastic member 126 is disposed to have a smaller-diameter end 126*a* thereof put in contact with the upper surface of the guide shaft 105 (106) and a larger-diameter base end 126*b* thereof put in contact with the upper wall of the housing 125.

When the guide shaft 105 (106) is pressed by the adjusting screw 127, the elastic member 126 is pinched and thus compressed between the guide shaft 105 (106) and the inner wall of the housing 125. At this time, the elastic member 126 is compressed to a length of 1 mm or less while the smaller-diameter end 126*a* thereof abutting the guide shaft 105 (106) is moved to inside the larger-diameter base end 126*b*. Therefore, the elastic member 126 used in the present invention can be compressed to a reduced length as compared with a cylindrical elastic member whose can be compressed to a length of 1 mm or more. Thus, the housing 125 as a whole can be designed to have a reduced thickness, for example, to a thickness of about 4 mm, and the base chassis 101 can be designed thinner.

Also, the adjusting screw 127 is inserted in the screw hole 129 formed in the lower side 101*b* of the base chassis 101 and has the free end thereof put in contact with the lower side of the guide shaft 105 (106). By adjusting the length of projection of the adjusting screw 127 into the housing 125, the inclination of the guide shafts 105 and 106 can be adjusted in steps of ±0.4 mm for example.

Note that the adjusting screw 127 is nickel- or copper-plated to be electroconductive. The adjusting screw 127 works also as a grounding conductor for the guide shaft 105 (106) because it connects to the lower side 101*b*, at the ground potential, of the base chassis 101 and abuts the lower surface of the guide shaft 105 (106).

The above skew adjusting mechanism 109 is provided at four places correspondingly to the opposite ends of each of the guide shafts 105 and 106. During assembling of the optical pickup unit 6, the skew adjusting mechanism 109 of the skew adjusting mechanism 109 is used with a skew-adjustment disk to adjust the inclination of the guide shafts 105 and 106 so that a light beam projected from the objective lens 108 is incident perpendicularly upon the signal recording surface of the skew-adjustment disk, and thus the relation in inclination between the objective lens 108 and signal recording surface of the skew-adjustment disk.

Figure 23:
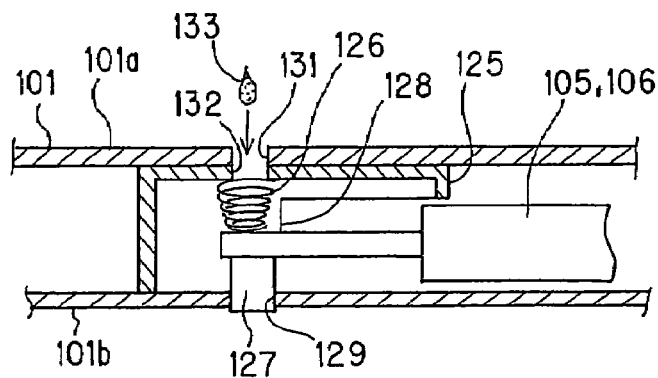
FIG. 23 is a sectional view of a variant of the skew adjusting mechanism in FIG. 22.

After completion of the skew adjustment with the skew adjusting mechanism 109, the elastic member 126 may be fixed with an adhesive to prevent the skew angle from varying. That is, the skew adjusting mechanism 109 has adhesive-injection holes 131 and 132 formed in the upper side 101*a* of the base chassis 101 and housing 125 as shown in FIG. 23. The adhesive-injection holes 131 and 132 are formed in positions corresponding to the locations of the elastic members 126. An adhesive 133 of ultraviolet setting type, for example, is injected into the adhesive-injection holes 131 and 132.

During assembling of the optical pickup unit 6, the adjusting screw 127 of the skew adjusting mechanism 109 is used to adjust the inclination of the guide shafts 105 and 106 and then inject the adhesive 133 from the adhesive-injection holes 131 and 132 in order to harden the elastic member 126. Thus, since the elastic member 126 can be hardened with the adhesive 133, the skew adjusting mechanism 109 can maintain an appropriate inclination of the guide shafts 105 and 106 even if the elastic member 126 is plastically be deformed due to the compression.

Note that the adhesive-injection holes 131 and 132 formed in the base chassis 101 and housing 125 are very small in diameter and so an adhesive 133 in liquid condition injected through them will not spill out of the base chassis 101 owing to its surface tension.

Figure 24:
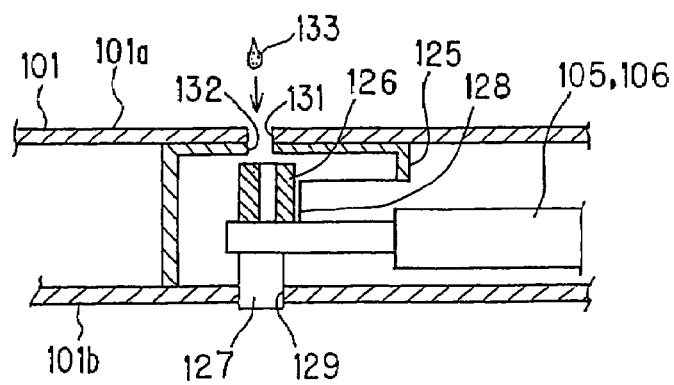
FIG. 24 is a sectional view of another variant of the skew adjusting mechanism in FIG. 22.

Also, the skew adjusting mechanism 109 uses a conical helical spring as the elastic member 126, but it may use a hollow cylinder of silicon rubber instead as shown in FIG. 24. The silicon-rubber hollow cylinder is disposed to have one end thereof in touch with the upper side of the guide shaft 105 (106) as well as the other end thereof in contact with the inner wall of the housing 125.

As the guide shafts 105 and 106 are pressed by the adjusting screw 127, the elastic member 126 of silicon rubber is compressed between the guide shaft 105 (106) and inner wall of the housing 125. At this time, the elastic member 126 is compressed by reducing the volume of the part thereof compressed inside the elastic member 126. Also, the elastic member 126 may be hardened with the adhesive 133 of ultraviolet setting type injected through the adhesive-injection holes 131 and 132 after completion of the skew adjustment. Thus, since the elastic member 126 is hardened with the adhesive 133, the skew adjusting mechanism 109 can maintain the appropriate inclination of the guide shafts 105 and 106 even if the elastic member 126 is plastically deformed due to the compression by the adjusting screw 127.

Note that the guide shafts 105 and 106 may be used also as a grounding conductor by adding an additive to the elastic member 126 of silicon rubber to render the elastic member 126 electroconductive while connecting the elastic member 126 to the lower side 101b, at the ground potential, of the base chassis 101 and putting it into contact with the lower surface of the guide shat 105 (106).

In the above skew adjusting mechanism 109, the housing 125 in which the elastic member 126 and adjusting screw 127 are disposed is held between the upper and lower sides 101a and 101b of the base chassis 101. So, the space for installation of the elastic member 126 can be made flat, which leads to a thinner design and simpler process of manufacture of the base chassis 101 as compared with the conventional base chassis in which supports for the guide shafts of the skew adjusting mechanism are formed by deep drawing.

The pickup moving mechanism 104 to move the optical pickup 103 radially of the optical disk 4 is provided adjacent to the guide shaft 105. As shown in FIGS. 21 and 25, the pickup moving mechanism 104 includes the lead screw 140 installed to the base chassis 101 adjacent and in parallel to the guide shaft 105 along the radius of the optical disk 4, and a feed motor 141 to rotate the lead screw 140.

The lead screw 140 is supported at the end of a shaft portion 140a thereof in a bearing 143 to be rotatable. The shaft portion 140a of the lead screw 140 has formed thereon threads 144 which are engaged slidably on the engagement member 120 provided on the pickup base 114. As rotated by the feed motor 141, the lead screw 140 can move the pickup base 114 radially of the optical disk 4 by means of the engagement member 120.

The feed motor 141 to rotate the lead screw 140 is a DC motor which is constructed as a step motor. Supplied with a rectangular wave, the feed motor 141 runs stepwise to rotate the lead screw 140 for moving the pickup base 114 radially of the optical disk 4.

The feed motor 141 to rotate the lead screw 140 is a DC motor. Since the DC motor will not provide any torque unless it runs at a high speed, various contact portions of the pickup moving mechanism 104 will heavily be abraded. Also, in case the feed motor is connected via a gear mechanism to the lead screw 140 to move the pickup base 114, it will emit a large operating noise.

On this account, the feed motor 141 in the present invention uses a step motor. Supplied with a rectangular-wave pulse, the feed motor 141 moves the pickup base 114 radially of the optical disk 4.

Figure 25B:
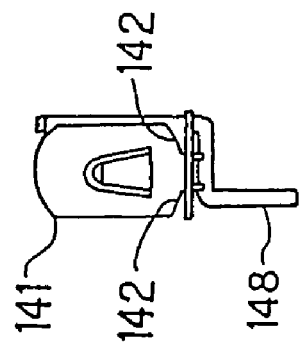
FIG. 25 is a plan view of a pickup moving mechanism used in the recording and/or playback device in FIG. 15.
Figure 25A:
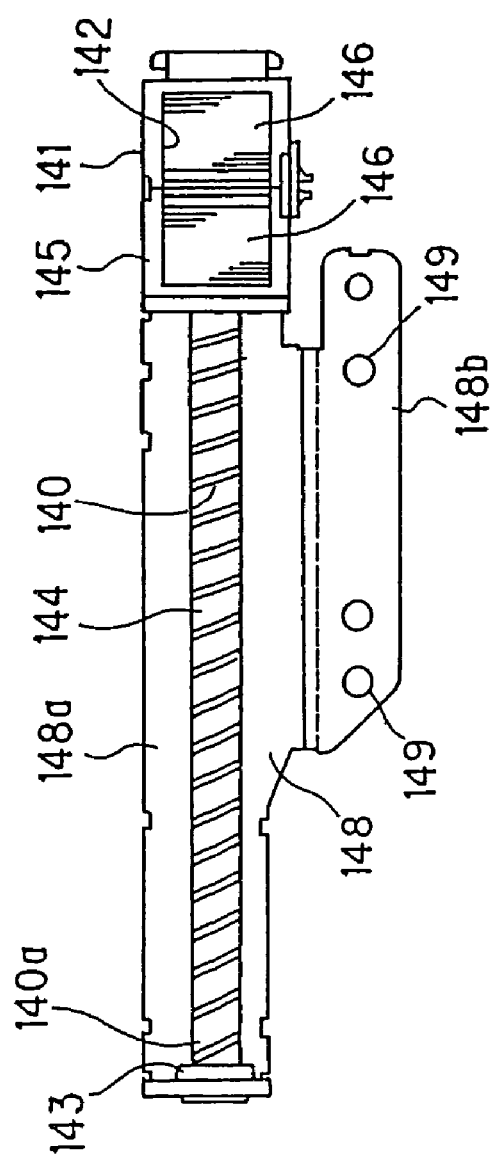

As shown in FIGS. 25A and 25B, the feed motor 141 has a motor housing 145 which has no upper and lower walls. The motor housing 145 has formed therein openings 142 through which a coil 146 housed inside is exposed to outside from the upper and lower sides of the motor housing 145. Because of the openings 142 with no upper and lower walls, the motor housing 145 is formed thinner for the thickness of the wall, for example, to a thickness of 5.1 mm.

The feed motor 141 and lead screw 140 are installed to a frame 148 and further to the base chassis 101 with the frame 148 between them. The frame 148 includes a generally rectangular plate-shaped connection 148a having connected thereto a side portion of the motor housing 145 from which the lead screw 140 is projected out and the bearing 143 supporting the end of the lead screw 140, and a fixing side portion 148b formed from a bent part of the connection 148a and having formed therein a binding-screw hole 149 in which a binding screw for fixation to the base chassis 101 is inserted.

The pickup moving mechanism 104 constructed as above can be installed by fixing, with binding screws, the frame 148 having the lead screw 140 and feed motor 141 installed thereto in place on the base chassis 101 as shown in FIG. 25.

Figure 29:
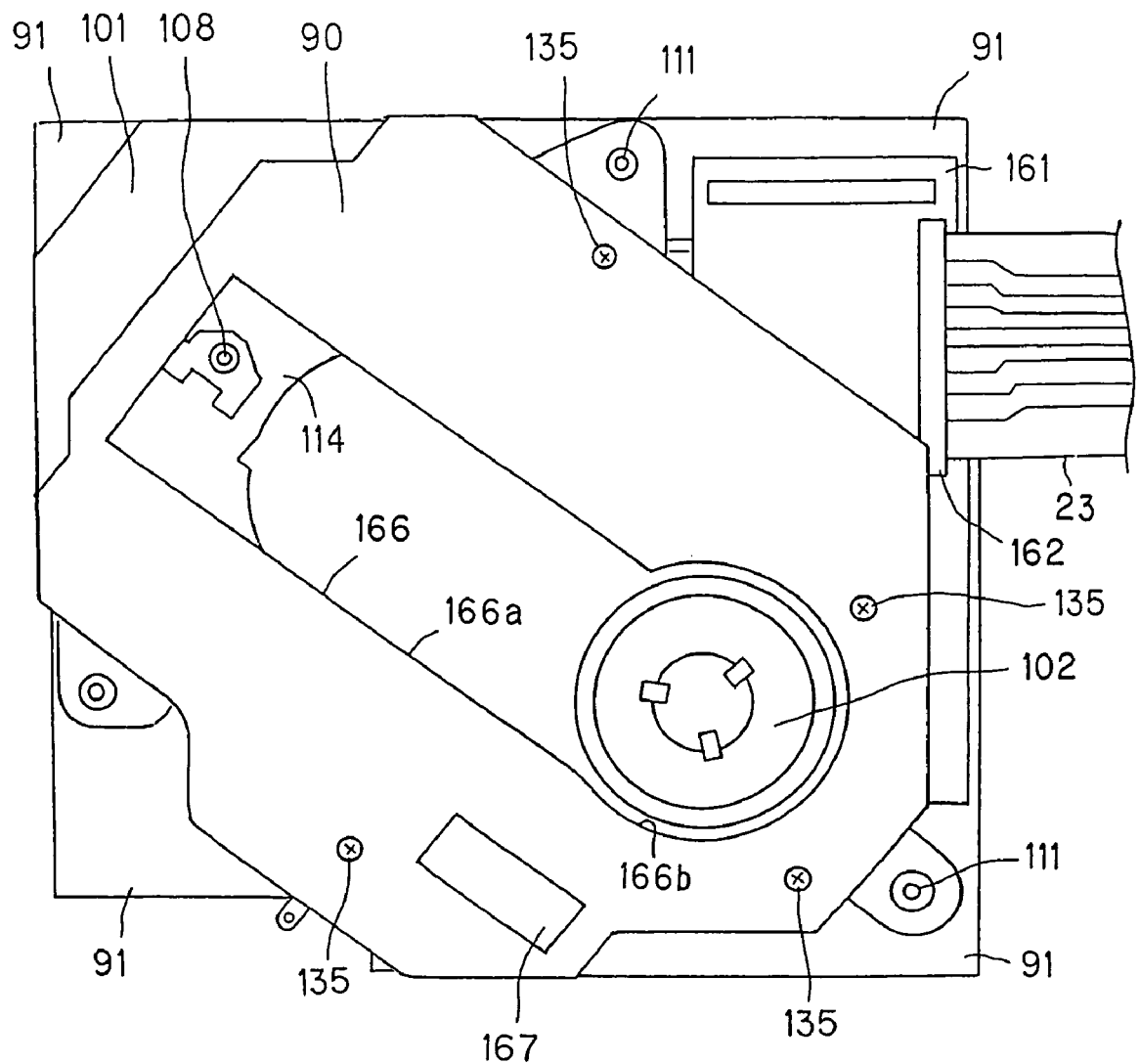
FIG. 29 is a plan view of the optical pickup unit having a cover member attached thereto.

In the pickup moving mechanism 104 in which the frame 148 is fixed to the base chassis 101, when the base chassis 101 is held between the cover member 90 covering the optical pickup unit 6 which will be described in detail later from above and a bottom plate 91 covering the optical pickup unit 6 from above, the openings 142 formed in the upper and lower sides of the motor housing 145 are closed by the cover member 90 and bottom plate 91, as shown in FIG. 29. Thus, the cover member 90 and bottom plate 91 can work as a yoke to close the magnetic field of the coil 146 housed in the motor housing 145. Thus, it is possible to prevent the fringe magnetic field from the feed motor 141 from adversely affecting write or read of information signals to or from the optical disk 4 as well as to prevent any foreign matter such as dust or the like from entering the motor housing 145. It should be noted that the openings 142 in the motor housing 145 can fully be closed by the cover member 90 and bottom plate 91 and some gap possibly taking place between the cover member 90 and bottom plate 91 due to the dimensional tolerances of various parts may be allowed.

Also, the motor housing 145 for the feed motor 141 is open at the upper and lower sides thereof in the pickup moving mechanism 104, heat developed inside the motor housing 145 can easily be exhausted. More specifically, in the pickup moving mechanism 104, when the pickup base 114 is moved from a stationary state, the friction coefficient is important and thus a large torque is required. Once the pickup base 114 is put into movement, however, the friction coefficient will be smaller and the torque is lowered correspondingly. After that, the pickup base 114 in the pickup moving mechanism 104 is applied with a sufficient torque to prevent any displacement of the pickup base 114 (holding torque). The holding torque will always be applied during operation of the recorder/player 1 and the feed motor 141 is always supplied with a current. On this account, the motor housing 145 for the feed motor 141 is designed open at the upper and lower sides thereof to prevent the feed motor 141 from being excessively heated, to thereby prevent the operation of moving the pickup base 114 from being adversely affected by the heat dissipated from the feed motor 141.

Also, in the above pickup moving mechanism 104, since the motor housing 145 for the feed motor 141 is open at the upper and lower sides thereof, it can be formed thinner than the base chassis 101. Thus, the recorder/player 1 can be designed thinner by limiting the thickness of the base chassis 101 having the pickup moving mechanism 104 fixed thereto.

Figure 26:
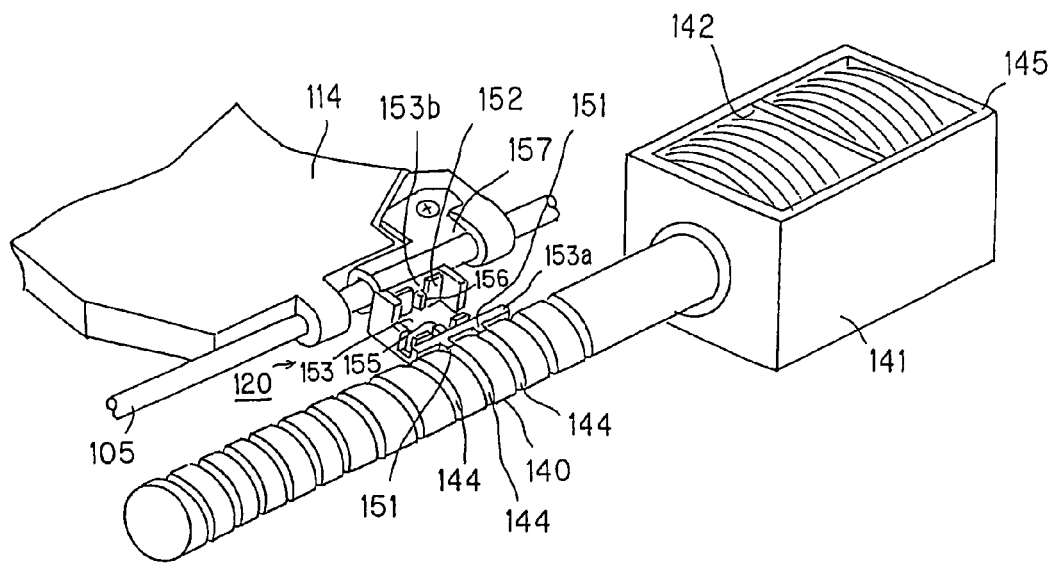
FIG. 26 is a perspective view of an engagement member used in the recording and/or playback device in FIG. 15.
Figure 27:
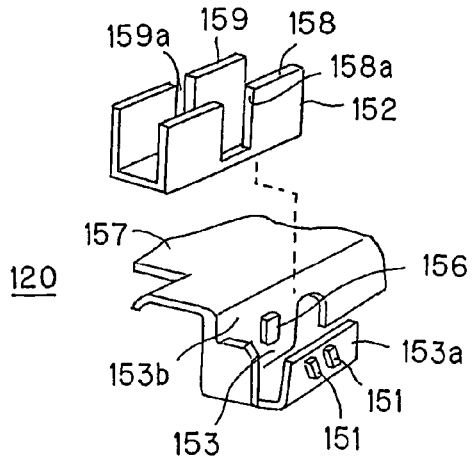
FIG. 27 is an exploded perspective view of the engagement member in FIG. 26.
Figure 28:
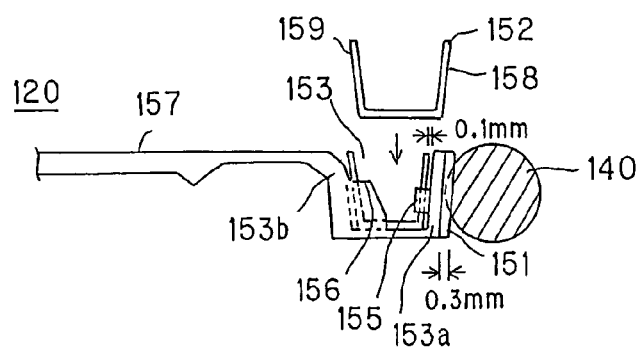
FIG. 28 is a side elevation of the engagement member in FIG. 26.

As shown in FIGS. 26 to 28, the engagement member 120 engaging with the threads 144 formed on the lead screw 140 is fixed at one end thereof to the pickup base 114 with binding screws and engaged at the other end thereof in the threads 144 on the lead screw 140 to convert the rotary motion of the lead screw 140 into a linear motion.

The engagement member 120 includes engagement projections 151 which are engaged in the threads 144 formed on the lead screw 140, and a compartment 153 provided contiguously to the pickup base 114 and in which there is housed a clearance definition member 152 to keep the engagement projections 151 at a distance over which they are kept engaged on the lead screw 140.

The engagement projections 151 are provided on a side wall 153a, at the side of the lead screw 140, of the compartment 153 to project toward the lead screw 140. The engagement member 151 is beveled equally to the bevel of the threads 144 on the lead screw 140. Also, the engagement member 151 is generally as wide as the threads 144.

The engagement projections 151 are engaged in the threads 144 to a depth of the latter, for example, to a depth of 0.3 mm. As the lead screw 140 is rotated, the engagement projections 151 are moved along the threads 144 axially of the lead screw 140.

The compartment 153 having the engagement projections 151 formed thereon is a concavity whose section is generally C-shaped and open at the top thereof. In the compartment 153, engagement projections 155 and 156 are formed on the side wall 153a of the lead screw 140 and side wall 153b of the guide shaft 105, respectively. The engagement projections 155 and 156 are provided to prevent the clearance definition member 152 from exiting from the compartment 153. The clearance definition member 152 will be described in detail later.

A connecting surface 157 is formed on the upper edge of the side wall 153b of the guide shaft 105 to connect the engagement member 120 to the pickup base 114. The connecting surface 157 is provided to extend over the guide shaft 105 disposed between the lead screw 140 and pickup base 114 to above the pickup base 114 and is connected with a binding screw to the upper side of the pickup base 114.

The clearance definition member 152 housed in the compartment 153 to support the side walls 153a and 153b is formed from a rigid, generally C-shaped metallic plate. As shown in FIG. 27, the clearance definition member 152 has slits 158a and 159a formed nearly in the center of the support walls 158 and 159, respectively. The slits 158a and 159a extend vertically from the upper end. With the engagement projections 155 and 156 provided on the side walls 153a and 153b, respectively, being retained by the slits 158a and 159a, the clearance definition member 152 is blocked from exiting from the compartment 153.

As shown in FIG. 28, when the clearance definition member 152 is housed in the compartment 153, there are defined between the side walls 153a and 153b of the compartment 153 and support walls 158 and 159 of the clearance definition member 152 clearances smaller than the depth of engagement between the engagement projection 151 and threads 144 on the lead screw 140, for example, a depth of 0.1 mm. Therefore, the clearance definition member 152 is housed without forcing the side wall 153a of the compartment 153 toward the lead screw 140. Also, since the clearance definition member 152 is rigid as mentioned above, even a misalignment between the engagement projection 151 and threads 144, if any caused due to the dimensional tolerance of the engagement member 120 during movement of the pickup base 114, can be limited to within the clearance (0.1 mm) defined between the side wall 153a of the compartment 153 and support wall 158 of the clearance definition member 152. Thus, the engagement member 120 prevents the engagement projection 151 from being misaligned to more than the depth of the threads 144 (0.3 mm) and the lead screw 140 and engagement projection 151 from being disengaged from each other during movement of the pickup base 114.

Figure 30:
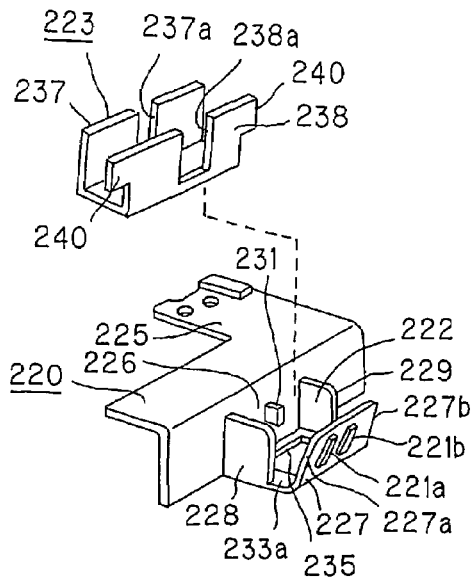
FIG. 30 is a perspective view of a variant of the engagement member in FIG. 26.

Also, in the recorder/player 1 according to the present invention, the engagement member and the clearance definition member housed in the compartment of the engagement member may be formed as will be described below. As shown in FIG. 30, an engagement member, generally indicated with a reference 220, includes a compartment 222 having formed outside thereof a pair of engagement projections 221a and 221b which are engaged in the threads 144 on the lead screw 140 and in which there is housed a clearance definition member 223 to keep the engagement projections 221a and 221b in position where they are kept in mesh with the threads 144 on the lead screw 140, and a connecting surface 225 fixed with a binding screw to a part of the pickup base 114 to connect the compartment to the pickup base 114.

The compartment 222 is a concavity having a generally C-shaped section open at the top thereof. The compartment 222 is formed from a first side wall 226 at the pickup base 114, a second side wall 227 provided opposite to the first side wall 226 and at the lead screw 140, and a pair of compartment walls 228 and 229 rising from the first side wall 226, which define together an area in which there is housed a clearance definition member 223 which will be described in detail later. The first and second side walls 226 and 227 have formed thereon inwardly thereof retaining projections 231 and 232, respectively, which will retain the clearance definition member 223 inside the compartment 222.

On the second side wall 227, a pair of engagement projections 221a and 221b to be engaged in the threads 144 on the lead screw 140 are formed outwardly with an interval generally equal to that between the threads 144 in the extending direction of the shaft portion 140a of the lead screw 140. The engagement projections 221a and 221b are formed inclined at an angle generally equal to that of the threads 144 on the lead screw 140. The engagement projections 221a and 221b are engaged in the threads 144 to the depth of the threads 144, for example, to a depth of 0.3 mm for example. Therefore, when the lead screw 140 is rotated, the engagement projection 221 is moved along the threads 144 and axially of the lead screw 140.

Also, the compartment 222 has the compartment walls 228 and 229 formed to overhang to short of the second side wall 227 and the second side wall 227 has the base end thereof formed thin, and there is thus formed a hinge 233 which allows the second side wall 227 to be deflected toward and away from the lead screw 140. Therefore, the second side wall 227 will deflect inwardly of the compartment 222 and thus apply no excessive load to the lead screw 140 even if the engagement projections 221a and 221b are pressed to the threads 144 on the lead screw 140 due to the dimensional tolerance of the engagement member 220, vibration of the pickup base 114 during movement or the like. Therefore, it is possible to assure a smooth rotation of the lead screw 140 and quick movement of the pickup base 114.

Also, the compartment 222 has a generally rectangular opening 235 formed on the bottom thereof. Thus, since the second side wall 227 has the base ends of side edges 227a and 227b thereof extending along the lead screw 140 supported by a pair of hinges 233a and 233b, respectively, it is assured that the engagement projections 221a at one edge 227a and the engagement projection 221b at the other edge 227b can separately be engaged in the threads 144 on the lead screw 140.

On the other hand, in the engagement member in which the pair of engagement projections 221a and 221b are supported only by one hinge, it is assured that the engagement projections 221a and 221b in pair can be engaged together on the lead screw 140. Therefore, if the dimensional tolerance of the engagement member 220 or vibration of the pickup base 114 during movement has caused a conflict between the inclination of the threads on the lead screw and that of one of the engagement projections 221a and 221b or a strong engagement of the engagement projection in the threads, the other engagement projection will not possibly engaged in the threads or will possibly be engaged in the threads but to a small depth.

In the engagement projection 220 used in the present invention, the edges 227a and 227b of the second side wall 227 are supported at the base ends thereof by the hinges 233a and 233b, respectively, and the engagement projections 221a and 221b in pair are separately engaged in the threads 144 on the lead screw 140. Therefore, even if any one of the engagement projections 221a and 221b is not well engaged in the threads 144, the other engagement projection 221a or 221b can positively be engaged in the threads 144 without being influenced by the poor engagement of the one engagement projection.

The clearance definition member 223 housed in the compartment 222 is a rigid, generally C-shaped metallic plate. The clearance definition member 223 has formed thereon first and second support walls 237 and 238 in pair, each having a size large enough to be housed in the compartment 222, to support the second side wall 227 when they are housed in the compartment 222. The first and second support walls 237 and 238 have vertical slits 237a and 238a, respectively, formed generally in the center thereon correspondingly to the retaining projections 231 and 232, respectively, formed on the first and second side walls 226 and 227, respectively, formed on the compartment 222. When the clearance definition member 223 is housed in the compartment 222, the retaining projections 231 and 232 formed on the first and second side walls 226 and 227, respectively, are retained by the slits 237a and 238a and thus prevented from coming out of the compartment 222.

For housing the clearance definition member 223 in the compartment 222, the horizontal length of the first support wall 237 provided at the side of the pickup base 114 is shorter than the spacing between the compartment walls 228 and 229 rising from the first side wall 226. On the other hand, the second support wall 238 provided at the side of the lead screw 140 has formed thereon right and left support pieces 240 extended beyond the first side wall 237 toward the side of the compartment 222, and it is formed to have a length generally equal to or larger than that of the horizontal length of the second side wall 227.

When the clearance definition member 223 is housed in the compartment 222, there will be defined between the first and second side walls 226 and 227 of the compartment 222 and first and second support walls 237 and 238 of the clearance definition member 223 clearances shorter than the depth of engagement of the engagement projection 221 in the threads 144 on the lead screw 140, for example, a depth of 0.1 mm (as shown in FIG. 28). Therefore, the clearance definition member 223 is housed into the compartment 222 without forcing the second side wall 227 of the compartment 222 toward the lead screw 140. Also, since the clearance definition member 223 is rigid as mentioned above, a misalignment between the engagement projection 221 and the threads 144, if any caused during movement of the pickup base 114 due to the dimensional tolerance of the engagement member 220, can be limited to within the clearance (0.1 mm) defined between the second side wall 227 of the compartment 222 and second support wall 238 of the clearance definition member 223. Thus, the engagement member 220 prevents the engagement projection 221 from being misaligned to more than the depth of the threads 144 (0.3 mm) and the lead screw 140 and engagement projection 221 from being disengaged from each other during movement of the pickup base 114.

Figure 31:
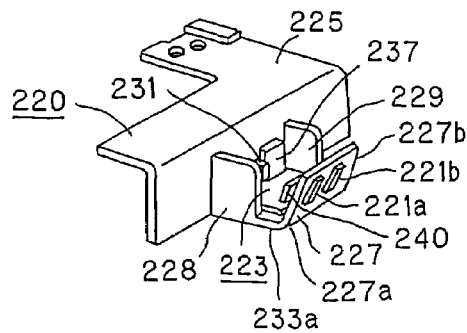
FIG. 31 is a perspective view of the engagement member (shown in FIG. 30) having a gap defining member housed in a compartment.
Figure 32:
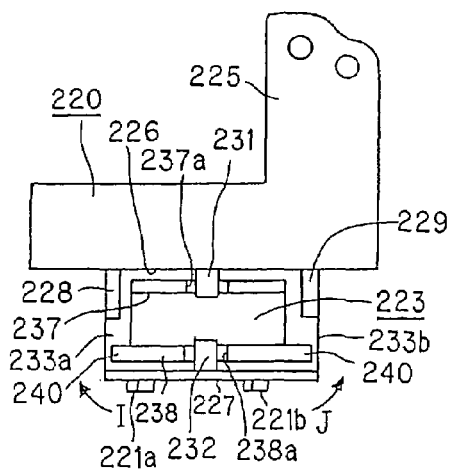
FIG. 32 is a plan view of the engagement member in FIG. 31.

Also, when the clearance definition member 223 is housed in the compartment 222, the support pieces 240 formed on the second side wall 238 can support the second side wall 227 of the compartment 222 over the entire horizontal width as shown in FIGS. 31 and 32. During movement of the pickup base 114 or if the recorder/player 1 incorporating the engagement member 220 is dropped by mistake, the clearance definition member 223 can relieve the load concentrated to the hinge 233 supporting the second side wall 227 by the engagement projections 221a and 221b engaged in the threads 144 on the lead screw 140.

More specifically, the engagement member 220 has the hinge 233 formed by reducing the thickness of the base end of the second side wall 227 for the latter to be flexible toward and away from the lead screw 140. If the recorder/player 1 is dropped by mistake and the pickup base 114 quickly slides on the guide shafts 105 and 106, the engagement member 220 installed on the pickup base 114 will quickly slide on the lead screw 140. In this case, a dropping impact of the pickup base 114 will concentrate, via the pair of engagement projections 221a and 221b engaged in the threads 144 on the lead screw 140, to the hinge 233 supporting the second side wall 227 having the engagement projections 221a and 221b provided thereon. The dropping impact will distort the second side wall 227, especially, the right and left edges 227a and 227b of the second side wall 227, in the direction of arrow I or J in FIG. 32, somewhat deviated from the appropriate direction of deflection. The deflection of the edges 227a and 227b of the second side wall 227 in a distorted form will cause an excessive load to the hinge 233 which will possibly be broken.

However, in the recorder/player 1 according to the present invention, the second support wall 238 of the clearance definition member 223 has provided thereon the support pieces 240 to support the edges 227a and 227b of the second side wall 227. So, even if a load in the direction of arrow I or J in FIG. 32 is applied to the edges 227a and 227b of the second side wall 227 when the recorder/player 1 is dropped, the support pieces 240 of the clearance definition member 223 will support the second side wall 227 and thus relieve the load to the hinge 223, thus permitting to prevent the hinge 223 from being broken.

Figure 33:
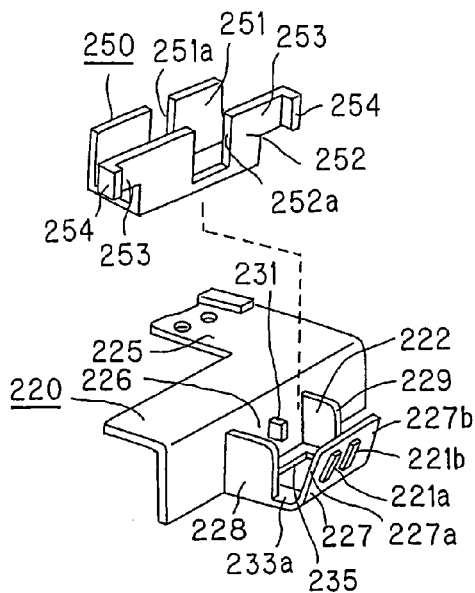
FIG. 33 is a perspective view of another variant of the engagement member in FIG. 26.

Also, the clearance definition member may be formed similarly to the aforementioned clearance definition member 223 by bending the free end of the support piece toward the second side wall 227 as shown in FIG. 33. This clearance definition member, indicated with a reference number 250, is shaped to have a generally C-shaped section similarly to the aforementioned clearance definition member 223, and has formed thereon first and second support walls 251 and 252 in pair to support first and second side walls formed on the compartment 222. The first and second support walls 251 and 252 have formed nearly in the center thereof slits 251a and 252a, respectively, corresponding to engagement projections 231 and 232 formed on the first and second side walls 226 and 227, respectively, of the compartment 222. The slits 251a and 252a extend vertically from the upper end.

Also, in the clearance definition member 250, the horizontal length of the first support wall 251 is smaller than the spacing between the compartment walls 228 and 229 provided to rise from the first side wall 226. On the other hand, the second support wall 252 has right and left support pieces 253 formed to extend beyond the first support wall 251 toward the compartment 222, and has a length generally equal to or larger than the horizontal length of the second side wall 227.

Figure 34:
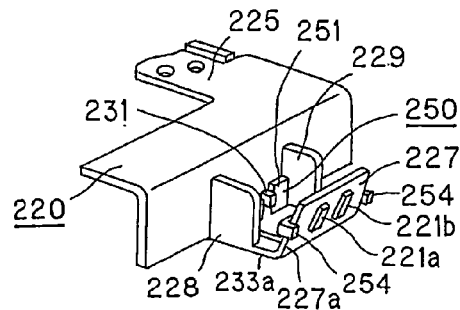
FIG. 34 is a plan view of the engagement member (shown in FIG. 33) having a gap defining member housed in a compartment.
Figure 35:
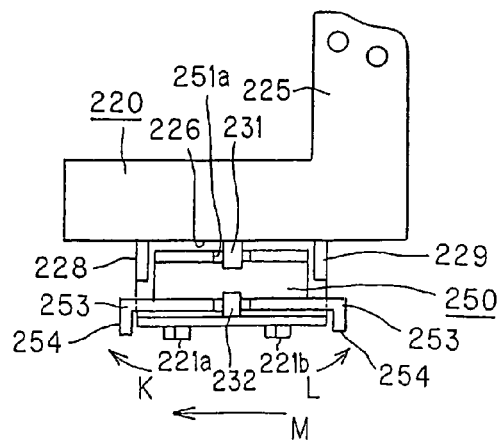
FIG. 35 is a plan view of the engagement member in FIG. 34.

These support pieces 253 have formed at the right and left ends thereof folds 254 bent toward the second side wall 227. When the clearance definition member 250 is housed in the compartment 222, the folds 254 extend toward the second side wall 227 and hold the opposite ends 227a and 227b of the second side wall 227 between them as shown in FIGS. 34 and 35.

Similarly to the aforementioned clearance definition member 223, the above clearance definition member 250 will work as follows. It is assumed here that the recorder/player 1 is dropped by mistake, the pickup base 114 will quickly slide on the guide shafts 105 and 106 and as dropping impact is applied in the direction of arrow K or in the direction of arrow L in FIG. 35, somewhat deviated from the appropriate direction of distortion. In this case, the right end 227a or left end 227b of the second side wall 227 of the engagement member 220 will be supported by the support piece 253. Also, even if the pickup base 114 quickly slides and a load is applied in the direction of arrow M or in the direction opposite to the direction of arrow M in FIG. 35 in which the pickup base slides, the edges 227a and 227b of the second side wall 227 will be supported by the folds 254 formed at the free end of the support piece 253. Therefore, the lead to the hinges 233a and 223b supporting the edges 227a and 227b of the second side wall 227 is relieved and the engagement member 220 is prevented from being broken.

Note that similarly to the aforementioned clearance definition member 152, the above clearance definition member 250 will work as follows. Namely, when the clearance definition member 250 is housed in the compartment 222, there are defined between the second support wall 252 and the second side wall 227 of the engagement member 220 clearances smaller than the depth of engagement between the engagement projection 221 and threads 144 on the lead screw 140, for example, a depth of 0.1 mm. Therefore, in the clearance definition member 250, the second side wall 227 of the engagement member 220 is housed without forcing the second side wall 227 of the engagement member 220 toward the lead screw 140. Also, since the clearance definition member 250 is rigid as mentioned above, even a misalignment between the engagement projection 221 and threads 144, if any caused due to the dimensional tolerance of the engagement member 220 during movement of the pickup base 114, can be limited to within the clearance (0.1 mm) defined between the second side wall 227 and second support wall 252 of the clearance definition member 250. Thus, the engagement member 220 prevents the engagement projection 221 from being misaligned to more than the depth of the threads 144 (0.3 mm) and the lead screw 140 and engagement projection 221 from being disengaged from each other during movement of the pickup base 114.

Note that in case the second side wall having the engagement projection 221 provided thereon is movable toward and away from the lead screw 140, the hinge 233 provided on the engagement member 220 may be anywhere on the compartment 222 other than the base end of the second side wall 227. Also, the retaining projection 231 (232) to prevent the clearance definition member 223 (250) from being disengaged from the compartment 222 may be provided on the clearance definition member 223 (250) and slits may be formed in the inner surfaces of the first and second side walls 226 and 227 to catch the clearance definition member.

As shown in FIG. 21, the base chassis 101 has connected thereto a printed wiring board 161 having a drive circuit formed thereon. The printed wiring board 161 includes a so-called rigid circuit substrate having a wiring pattern formed thereon and has mounted on the wiring pattern also various electronic parts such as a connector 162 for connection of the FPC (flexible printed circuit) 23 mounted on the printed wiring board 17 disposed on the lower half 9 of the device body 7.

As shown in FIGS. 15 and 29, with the cover member 90 being fixed with binding screws to the upper side of the base chassis 101 and the bottom plate 91 being fixed with binding screws at the lower side to the disk tray 5, the above optical pickup unit 6 is held tight between the cover member 90 and bottom plate 91.

The cover member 90 has formed therein an opening 166 through which the objective lens 108 and disk table 18 provided on the optical pickup unit 103 are exposed upward. The opening 166 consists of an opening 166a formed generally rectangular correspondingly to the moving range of the pickup base 114 to extend from the inner circumference to the outer circumference of the optical disk 4, and an opening 166b formed generally circular correspondingly to the shape of the disk table 18 and contiguously to the inner-circumferential end of the rectangular opening 166a. Also, the cover member 90 has formed thereon an abutting portion 167 the top of the motor housing 145 for the feed motor 141 on the pickup base 114 formed on the base chassis 101 abuts.

With the cover member 90 being fixed with screws 135 to the upper side of the base chassis 101, the disk table 18 and objective lens 108 on the pickup base 114 are directed upward through the opening 166. Also, when the motor housing 145 for the feed motor 141 abuts the rear side of the abutting portion 167, the cover member 90 closes the openings 142 in the upper side of the motor housing 145, to thereby close the magnetic field of the coil 146 housed in the motor housing 145.

Figure 36:
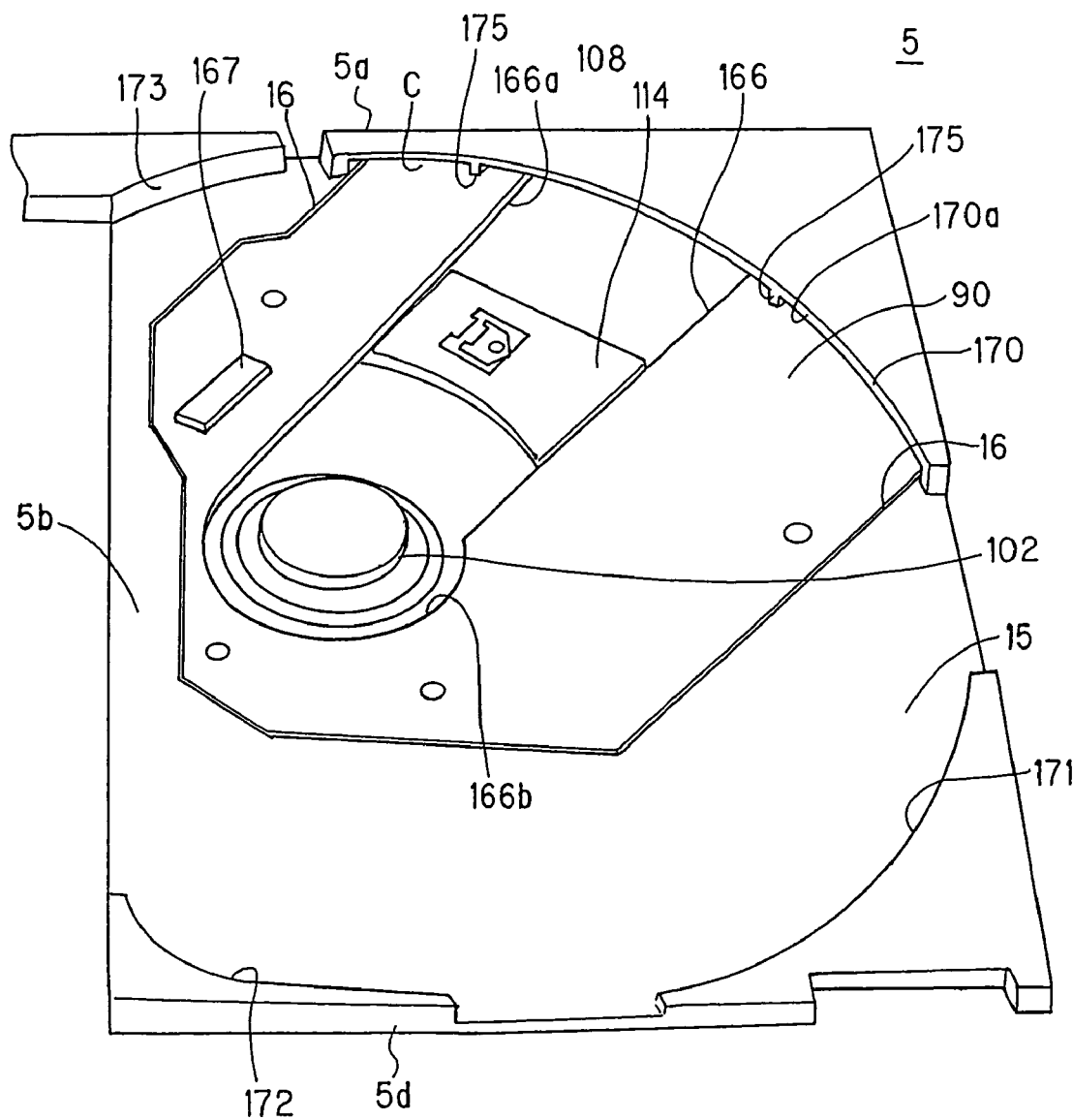
FIG. 36 is a perspective view of the disk tray having a concavity for receiving a disk.

When the base chassis 101 is housed in the compartment 21 for the disk tray 5, the cover member 90 faces directly the optical disk 4 through the opening 16 in the disk tray 5 as shown in FIG. 36. Namely, the cover member 90 forms a part of the concavity 15. Since the cover member 90 is fixed with screws to the base chassis 101, it is closely attached to the base chassis 101. Thus, it is blocked from lifting from the concavity 15, and prevents the main surface of the cover member 90 and the end of the opening 166 from scratching the signal recording surface of the optical disk 4.

The above cover member 90 is formed by punching an aluminum plate. On the lower side of the cover member 90, there is disposed the flexible printed wiring board 119 connected to the pickup base 114. On this account, the cover member 90 is prepared by punching the aluminum plate in a direction from the lower side toward the upper side with a consideration against any burr which will possibly spoil the flexible printed wiring board 119. Thereafter, the cover member 90 is deburred along the edge of the opening 166 and along the perimeter thereof.

The bottom plate 91 is also formed by punching an aluminum plate. The bottom plate 91 has screw holes formed therein, and is fixed with screws to the compartment 21 from the lower side of the base chassis 101 housed in the compartment 21 of the disk tray 5. Thus, the bottom plate 91 itself is connected to the base chassis 101 with the base chassis 101 being held tight between the bottom plate 91 and cover member 90.

The concavity 15 for housing the disk tray 5 the pickup base 114 and disk table 18 are directed to face through the opening 166 in the cover member 90 is formed generally circular. As shown in FIG. 36, the concavity 15 is defined by first to fourth walls 170 to 173 which are formed generally circular.

The first wall 170 is formed at the side of the front end 5a of the disk tray 5 to extend to over the opening 16 formed in the concavity 15. The first wall 170 has a constant clearance C defined between the lower edge of a wall body 170a facing the concavity 15 and the cover member 90 exposed through the opening 16 in the concavity 15. In this clearance C, there is provided a projection 175 extending from the lower edge of the device body 7 toward the concavity 15.

The projection 175 is provided to prevent the cover member 90 exposed trough the opening 16 from being deflected toward the signal recording surface of the optical disk 4. More specifically, the disk tray 5 is formed from rigid PPE (polyphenylene ether) containing glass in 20%, the base chassis 101 of the optical pickup unit 6 housed in the disk tray 5 is formed from iron (Fe), and the cover member 90 fixed to the upper side of the base chassis 101 and exposed through the opening 16 in the disk tray 5 is formed from aluminum (Al). Namely, the disk tray 5, base chassis 101 and cover member 90 are formed from different materials, respectively, and thus different in coefficient of linear thermal expansion from each other. The linear expansion coefficient of PPE is about $2.8 \times 10^{-5}/\text{mm}^\circ$ C., that of aluminum is about $2.4 \times 10^{-5}/\text{mm}^\circ$ C., and that of iron is about $1.2 \times 10^{-5}/\text{mm}^\circ$ C.

Therefore, as the recorder/player 1 is put into operation and the disk tray 5, base chassis 101 and cover member 90 have higher temperatures, these components will be distorted differently from each other due to differences in linear expansion coefficient from each other. More specifically, the aluminum-made cover member 90 has the wall 166a of the rectangular opening 166 deflected toward the optical disk 4. The deflected wall 166a will possibly get into sliding touch with the signal recording surface of the optical disk 4 received in the concavity 15. The first wall 170 has the projection 175 formed on the lower edge of the wall body 170a and thus the cover member 90 abuts the projection 175, which permits to prevent the cover member 90 from being deflected toward the optical disk 4.

Note that the screws 135 fixing the cover member 90 to the base chassis 101 are made from a liquid crystal polymer lower in contraction percentage. Therefore, the screws 135 limits the base chassis 101 and cover member 90 from being thermally distorted.

The second to fourth walls 171 to 173 are formed to rise from the concavity 15 in a generally circular form.

Next, the FPC 23 which connects the disk tray 5 housing the optical pickup unit 6 and the printed wiring board 17 provided on the lower half 9 to each other will be described.

Figure 37:
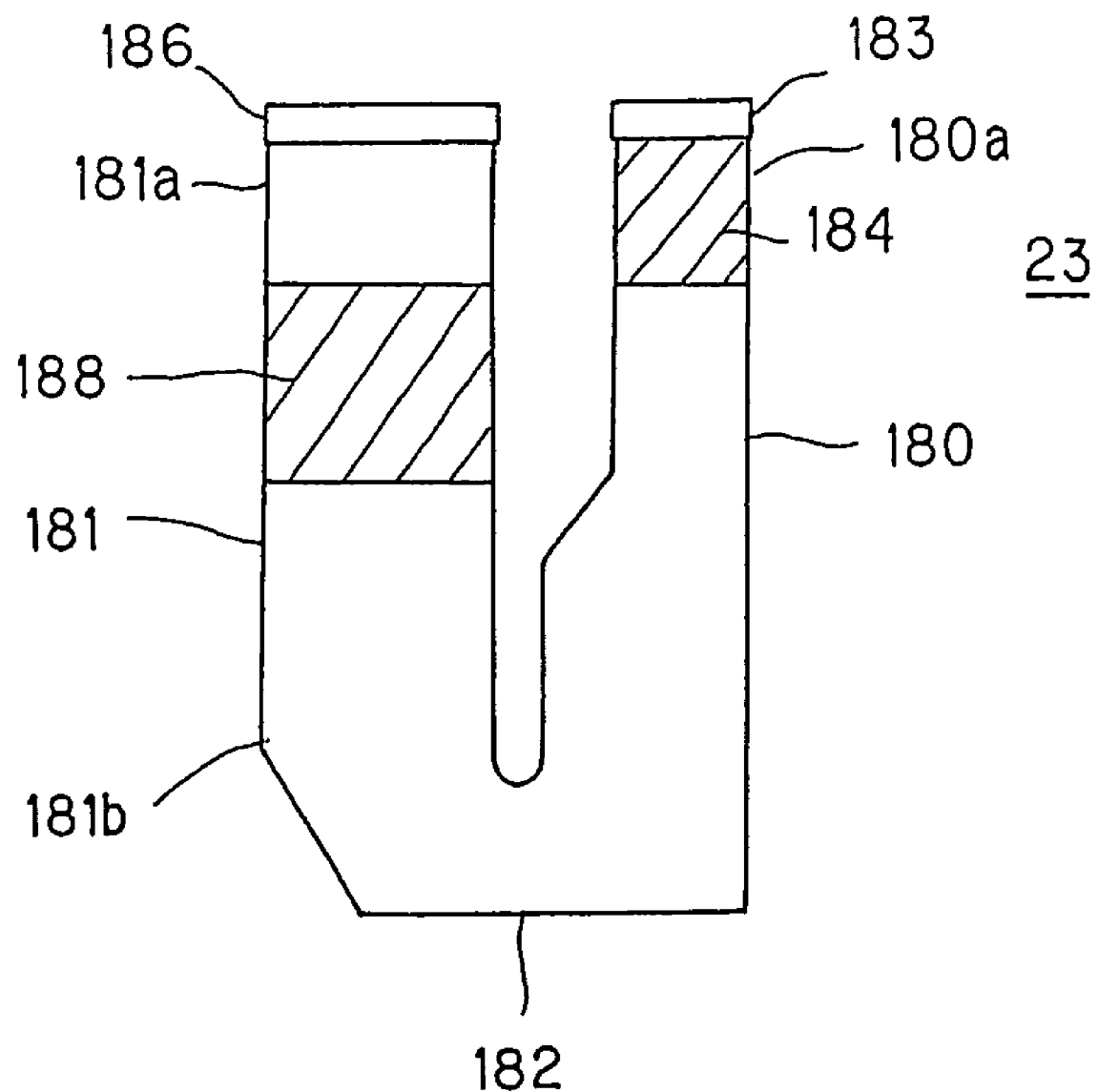
FIG. 37 is a plan view a flexible printed wiring board for connecting the disk tray and device body to each other.

As shown in FIG. 37, the FPC 23 is generally U-shaped and thus includes first and second arm portions 180 and 181 both being linear, adjacent and parallel to each other, and a joining portion 182 for connection of the first and second arm portions 180 and 181 to each other.

Figure 38A:
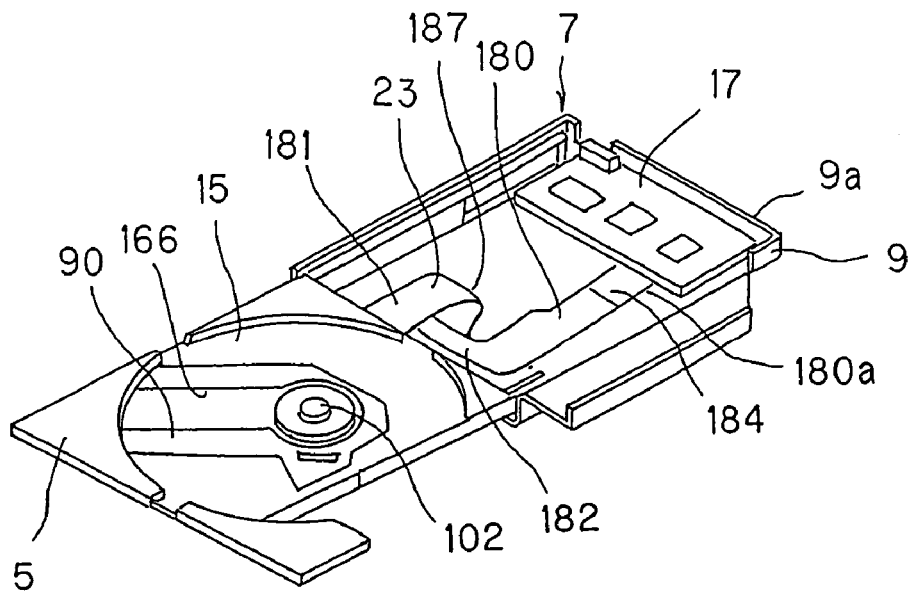
FIG. 38 is a perspective view of the disk tray and device body connected by the flexible printed wiring board to each other.

The first arm portion 180 has formed at the free end thereof a connection 183 for connection to a connector (not shown) provided on the bottom of the printed wiring board 17, and has attached on an end portion 180a thereof a cover lay 184 to increase the rigidity of the arm portion 180. As shown in FIG. 38A, the first arm portion 180 has the end portion 180a reinforced by the cover lay 184 directed toward the rear wall 9a of the lower half 9, and is connected to a connector provided on the bottom of the printed wiring board 17. Since the first arm portion 180 has the end portion 180a thereof improved in rigidity by the attached cover lay 184, the connection 183 can easily be connected to the connector on the bottom of the printed wiring board 17. Also, the first arm portion 180 is fixed to the lower side of the lower half 9.

The second arm portion 181 connected to the first arm portion 180 by the connection 182 has formed at the end portion thereof a connection 186 for connection to the connector 162 provided on the optical pickup unit 6 housed in the disk tray 5. As shown in FIG. 38A, the second arm portion 181 is folded back at the end portion 181a toward the open end of the lower half 9 and extended toward the disk tray 5 and thus the connection 186 is connected to the connector 162 of the optical pickup unit 6. Also, the second arm portion 181 is folded back at a point (indicated with a reference number 187) toward the open end of the lower half 9.

Also, the second arm portion 181 has attached thereon in a position somewhat set back from the end portion 181a toward the connection 182 a cover lay 188 which enhances the rigidity of the second arm portion 181. That is, the second arm 181 is larger in rigidity in the portion somewhat set back from the connection 186 toward the connection 182 than the portion including the connection 186. The cover lay 188 is attached generally at the middle of the second arm portion 181 to increase the rigidity of the portion of the second arm portion 181 having the cover lay 188 attached thereon in comparison with that of the other portions including the connections 186 and 182.

Figure 38B:
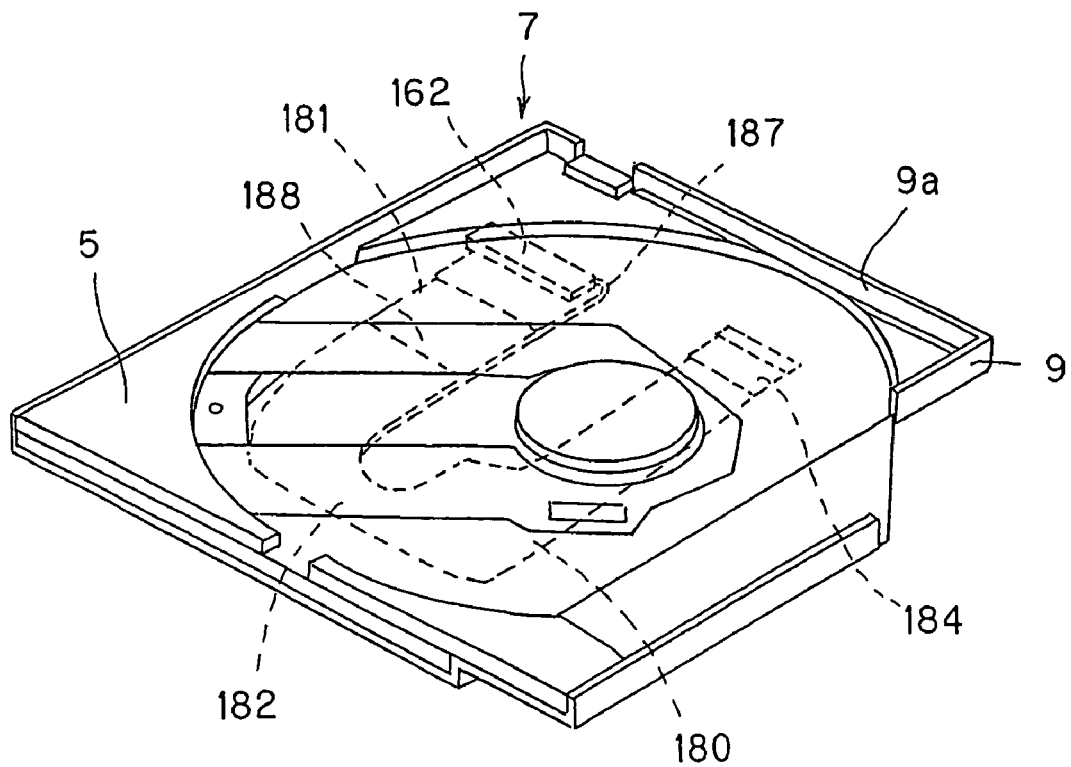

The above second arm portion 181 is not fixed to the bottom of the lower half 9 but is movable from the connection 182 into, and to outside, the device body 7 as the disk tray 5 is moved, as shown in FIGS. 38A and 38B. Also, the bending 187 of the second arm portion 181 shifts in the moving direction of the disk tray 5 as the latter is moved, as shown in FIGS. 39A to 39C.

Note here that the length of the portion, not fixed to the bottom of the lower half 9 and formed flexibly deformable, of the second arm portion 181 is generally a half of the moving distance of the disk tray 5 and the boundary thereof with respect to the connection 182 is generally at the middle of the moving range of the disk tray 5. In other words, the second arm portion 181 has a necessary minimum length for the movement of the disk tray 5 or a little larger length. As the disk tray 5 is moved, the second arm portion 181 is moved to outside the lower half 9 from the boundary thereof with respect to the connection 182 fixed to the bottom of the lower half 9, and thus bent at a base end portion 181b thereof and then drawn out of the device body 7. Also, when the second arm portion 181 is moved into the lower half 9, it is housed into the device body 7 with bending of the end portion 181a thereof having the connection 186 formed thereon.

Figure 39A:
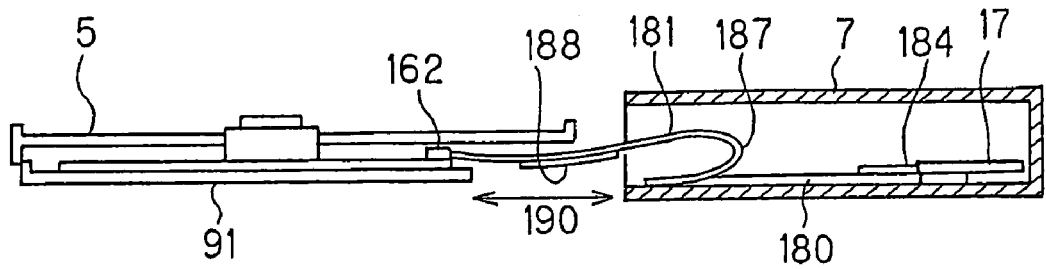
FIG. 39 is a section view of the flexible printed wiring board when the disk tray is moved between two positions inside and outside the device.
Figure 39B:
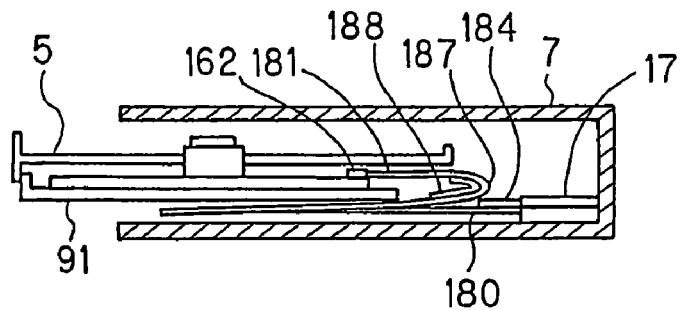
Figure 39C:
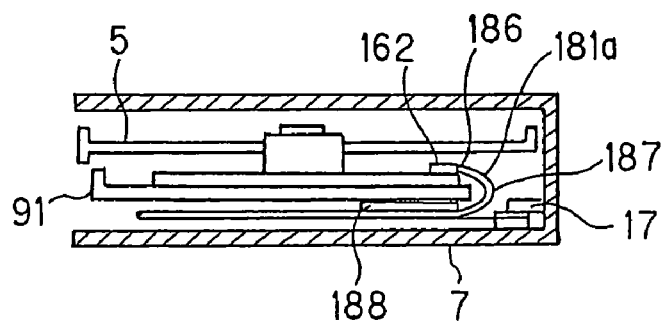

More specifically, when the disk tray 5 is ejected to outside the device body 7, the second arm portion 181 has the end portion 181a thereof ejected to outside the device body 7 and the bending 187 is formed near the connection 182, as shown in FIG. 39A. Next, as the disk tray 5 is moved into the device body 7 and also the second arm portion 181 is also moved into the device body 7, the bending 187 shifts toward the end portion 181a as shown in FIG. 39B. Then, when the disk tray 5 is fully housed into the device body 7, the second arm portion 181 will have the bending 187 formed near the connection 186 as shown in FIG. 39C.

As mentioned above, in the second arm portion 181, the portion thereof near the connection 186 is relatively lower in rigidity than the portion thereof somewhat set back toward the connection 182 and on which the cover lay 188 is attached. Thus, even when the bending 187 of the second arm portion 181 is formed near the connection 186 with the disk tray 5 being housed in the device body 7 as shown in FIGS. 28B and 39C, the load applied to the second arm portion 181 due to the bending can be reduced. Thus, the second arm portion 181 can prevent the circuit pattern formed on the FPC 23 from being broken due to a cracking taking place in the end portion 181a.

Also, since the second arm portion 181 reduces the load applied thereto due to the bending 187 formed near the connection 186, it is not necessary to increase the distance between the connection 186 and bending 187 at the time of housing the disk tray 5 into the device body 7 in order to reduce the load applied to the second arm portion 181 due to the bending. Thus, the second arm portion 181 may not have any extra length, which will advantageously lead to a reduction of the cost of manufacture.

Further, the device body 7 of the recorder/player 1 has to be limited in thickness because many available host apparatuses are designed thinner. When the height of the space where the FPC 23 is disposed has to be limited, the bending 187 should be made to have a larger curvature and thus the load to the bending 187 will be larger. However, since the second arm portion 181 can reduce the load to the bending 187 when the disk tray 5 is housed into the device body 7, the present invention can meet the requirement for a thinner design of the device body 7.

Note that the FPC 23 has the cover lay 188 attached generally on the middle of the second arm portion 181 thereof so that it will not be caught between the device body 7 and the rear end 5d of the disk tray 5 when the disk tray 5 is housed into the device body 7. More specifically, when the disk tray 5 is outside the device body 7, a clearance 190 is defined between the disk tray 6 and device body 7 as shown in FIG. 39A. Therefore, when the flexible second arm portion 181 is deflected generally at the intermediate portion thereof to below the clearance 190 downward at the time of housing the disk tray 5 into the device body 7, it will be caught nearly at the middle thereof between the rear end 5d of the disk tray 5 and the device body 7.

Note here that in the FPC 23, the cover lay 188 provided generally at the middle of the second arm portion 181 makes the rigidity generally at the middle of the second arm portion 181 higher than that of the rear end portion 181b. Therefore, when the disk tray 5 once ejected to outside the device body 7 is housed back into the device body 7, the middle of the second arm portion 181, higher in rigidity, is prevented from being deflected to below the clearance 190 while the rear end portion 181b of the second arm portion 181, lower in rigidity and more flexible, is bent, to assure a positive movement of the disk tray 5 into the device body 7.

Next, the recorder/player 1 constructed as having been described above will be described concerning its circuit configuration.

Figure 40:
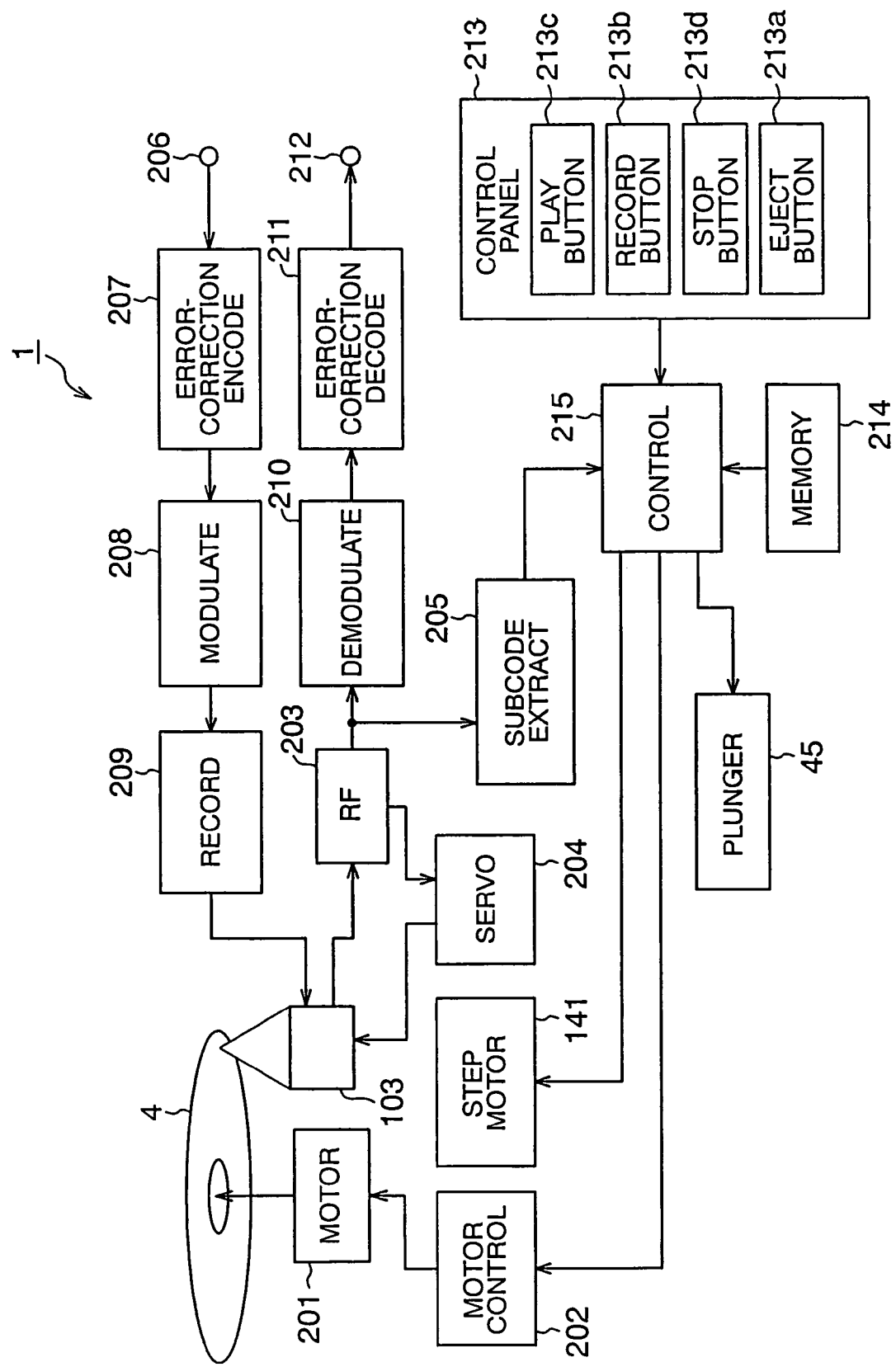
FIG. 40 is a block diagram of the recording and/or playback device according to the present invention.

The recorder/player 1 according to the present invention writes data to the optical disk 4 by projecting a light beam to the optical disk 4, and reads data recorded in the optical disk 4 by detecting a return light from the optical disk 4. As shown in FIG. 40, the recorder/player 1 includes a spindle motor 201 to rotate the optical disk 4, a motor control circuit 202 to control the spindle motor 201, the optical pickup 103 to detect a return light from the optical disk by projecting a light beam to the optical disk 4 being rotated by the spindle motor 201, an RF amplifier 203 to amplify an electrical signal output from the optical pickup 103, a servo circuit 204 to generate a focusing servo signal and tracking servo signal for the objective lens 108, and a subcode extraction circuit 205 to extract a subcode. Also, the recorder/player 1 additionally includes a recording system including an input terminal 206 connected to the host apparatus 2 such as a personal computer or the like to receive recording data, an error correction/encoding circuit 207 which makes error correction and encodes recording data supplied at the input terminal 206, a modulation circuit 208 to modulate the error-corrected and encoded data from the circuit 207, and a recording circuit 209 to record the modulated recording data. In addition, the recorder/player 1 includes a playback system including a demodulation circuit 210 to demodulate read data from the optical disk 4, an error correction/decoding circuit 211 to make error correction/decoding of the demodulated read data, and an output terminal 212 to provide the error-corrected and decoded data. The recorder/player 1 further includes a user's control unit 213 to make input of a command signal for the device, a memory 214 to store various control data etc., and a control circuit 215 to control the system operation.

The above spindle motor 201 has provided on the spindle thereof the disk table 102 on which an optical disk 4 is to be placed, and it rotates the optical disk on the disk table 102. The motor control circuit 202 controls the spindle motor 201 to rotate the optical disk 4 at a CLV (constant linear velocity). More particularly, the motor control circuit 202 controls the spindle motor 201 for the optical disk 4 to be rotated at CLV on the basis of a reference clock from a crystal oscillator and a clock from a PLL circuit. Of course, the optical disk 4 may be rotated at a CAV (constant angular velocity) or at a combination of CLV and CAV.

The above optical pickup 103 includes a semiconductor laser which can emit a light beam having a wavelength corresponding to the type of the optical disk 4 set in the recorder/player 1, objective lens 108 having a numerical aperture corresponding to the type of the optical disk 4 and which focuses the light beam emitted from the semiconductor laser, photodetector to detect a return light from the optical disk 4, etc. When reading data recorded in the optical disk 4, the optical pickup 103 sets the output of the semiconductor laser to a standard level and controls the semiconductor laser to emit a laser light. Also, when writing recording data to the optical disk 4, the optical pickup 103 sets the semiconductor laser output to a recording level higher than the standard level for the data reading and controls the semiconductor laser to emit a laser light. For both data write and read, the optical pickup 103 projects the light beam to the optical disk 4, detects a return light from the signal recording surface of the optical disk 4 by the photodetector, and makes photoelectric conversion of the detected light. Also, the objective lens 108 is held by an objective lens drive mechanism such as a biaxial actuator or the like, and moved by the drive mechanism in a focusing direction parallel to the optical axis thereof on the basis of a focusing servo signal and in a tracking direction perpendicular to the optical axis thereof on the basis of a tracking servo signal.

The above RF amplifier 203 generates an RF signal, and focusing and tracking error signals on the basis of the electric signal output from the photodetector included in the optical pickup 103. For example, the focusing error signal is generated by the astigmatism method, and a tracking error signal is generated by the three-beam method or push-pull method. When in the playback mode, the RF amplifier 203 provides the RF signal to the demodulation circuit 210 while providing the focusing and tracking error signals to the servo circuit 204.

The above servo circuit 204 generates a servo signal for playback of the optical disk 4. More specifically, the servo circuit 204 generates, based on a focusing error signal supplied from the RF amplifier 203, a focusing servo signal with which the focusing error signal becomes zero, and based on a tracking error signal supplied from the RF amplifier 203, a tracking servo signal with which the tracking error signal becomes zero. Then, the servo circuit 204 provides the focusing and tracking servo signals to a drive circuit in the objective lens drive mechanism included in the optical pickup 103. The drive circuit drives the biaxial actuator on the basis of the focusing servo signal to move the objective lens 108 in a focusing direction parallel to the optical axis of the objective lens 108, and on the basis of the tracking servo signal to move the objective lens 108 in a tracking direction perpendicular to the optical axis of the objective lens 108.

The above subcode extraction circuit 205 extracts subcode data from the RF signal output from the RF amplifier 203 and provides the extracted subcode data to the control circuit 215 which will thus be able to identify address data etc.

An input terminal 206 is electrically connected to an interface such as SCSI (small computer system interface), ATAPI (advanced technology attachment packet interface), USB (universal serial bus), IEEE (Institute of Electrical and Electronic Engineers) 1394 or the like of the host apparatus 2 such as a personal computer or the like to receive recording data for audio data, movie data, computer program, computer-processed data or the like from the host apparatus 2 and provide the supplied recording data to the error correction/encoding circuit 207.

The above error correction/encoding circuit 207 makes an error correction/encoding such as CIRC (cross interleave Reed-Solomon coding) or Reed-Solomon Product Coding and provides the error-corrected and encoded recording data to the modulation circuit 208. Having eight-to-ten and eight-to-sixteen conversion tables, the modulation circuit 208 converts the supplied 8 bit recording data into 14- or 16-bit data, and provides the data to a recording circuit 209. The recording circuit 209 makes a recording compensation such as NRZ (non-return to zero), NRZI (non-return to zero inverted) or the like and provides the processed data to the optical pickup 103.

The demodulation circuit 210 has similar conversion tables to those in the modulation circuit 208 to convert an RF signal supplied from the RF amplifier 203 from 14 or 16 bits to 8 bits, and provides the converted 8-bit read data to the error connection/decoding circuit 211. The error correction/decoding circuit 211 makes a error correction and decoding of data supplied from the demodulation circuit 210, and provides the data to the output terminal 212. The output terminal 212 is electrically connected to the aforementioned interface of the host apparatus 2. The read data provided from the output terminal 212 is displayed on a monitor connected to the host apparatus 2 and converted by a speaker into an audible sound.

The user's control unit 213 generates various command signals for operation of the recorder/player 1, and provides the signals thus generated to the control circuit 215. More particularly, the user's control unit 213 is provided with an eject button 213a, and in addition, with a record button 213b to start write of recording data to an optical disk 4 set in place on the disk table 102, a play button 213c to start read of data recorded in the optical disk 4, and a stop button 213d to stop the record and playback operations. For example, when the user operates a keyboard, mouse or the like of the host apparatus 2, the eject button 213a, record button 213b, play button 213c and stop button 213d provide record start signal, playback start signal, stop signal, etc. to the control circuit 215 from the host apparatus 2 via the interface.

The above memory 214 is a EP-ROM (erasable programmable read-only memory) or the like, for example, to store various control data and programs used in the control circuit 215. More specifically, data stored in the memory 214 include various control data for the feed motor 141 (step motor) to move the optical pickup 103 radially of an optical disk 4 set in place on the disk table 102.

Figure 41:
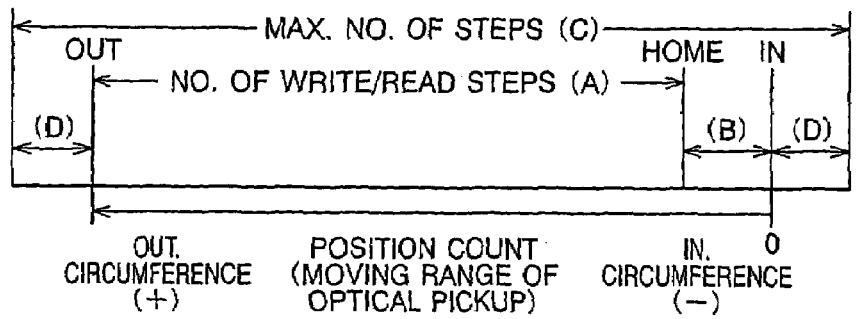
FIG. 41 explains an area in which the optical pickup unit is moved stepwise.

Note here that the optical disk 4 has a lead-in area formed in an inner-circumferential area thereof, a program area formed in an area outside the lead-in area, and a lead-out area formed outside the program area, that is, in the outermost-circumferential area thereof. In the subcode data in the lead-in area, there are stored TOC (table of contents) data such as address data on data stored in the program area and address data on data stored in the lead-out area. Also, the feed motor 141 is supplied with a pulsed voltage to feed the optical pickup 103 stepwise. On this account, the memory 214 stores a number of write and read steps (A) required for moving the optical pickup 103 in a range from a beginning (HOME) of the lead-in area to an end (OUT) of the outermost lead-out area, in which range the optical pickup 103 can read data from the optical disk 4, as shown in FIG. 41. It should be noted that when the optical pickup 103 has arrived at the end position (OUT), it will mechanically be limited from moving and cannot move further to the outer circumference of the optical disk 4.

Also, the movable range of the optical pickup 103 can be shifted to a position inner than the lead-in area in the optical disk 4 so that the optical pickup 103 can positively read TOC data in the lead-in area. On this account, the memory 214 further stores a number of steps (B) required for movement of the optical pickup 103 from an innermost-circumferential position (IN) of the optical pickup 103 to the beginning (HOME) of the lead-in area. When the optical pickup 103 has arrived at its IN position, it will mechanically be limited from moving and cannot move further inwardly.

The movable range of the optical pickup 103 extends from the innermost-circumferential position (IN) to the end (OUT) of the lead-out area, in which range the optical pickup 103 can read data from the optical disk 4, and thus the optical pickup 103 has to accurately be positioned in a mechanical manner. On this account, the memory 214 stores a maximum number of steps (C) for the step motor or feed motor 141. The maximum number of steps (C) includes a number of extra steps (D) applied to an area inner than the innermost-circumferential position (IN) for a positive arrival of the optical pickup 103 at the innermost-circumferential position (IN), and also applied to an area outer than the end position (OUT) for a positive arrival of the optical pickup 103 at the end position (OUT). In the areas to which the number of extra steps (D) is applied, the optical pickup 103 is mechanically limited from moving, that is, immovable. In this immovable condition, the step motor 141 is supplied with an additional pulse voltage to rotate the lead screw. This idle rotation of the lead screw will cause a noise.

As shown in FIG. 40, the control circuit 215 includes a microcomputer, CPU (central processing unit), etc. to control the system operation in response to command signals supplied from the user's control unit 213. As shown in FIG. 41, the control circuit 215 counts the positions of the optical pickup 103 taking the beginning (HOME) of the lead-in area as "0". Also, with the optical disk 4 is ejected, the control circuit 215 supplies a power to the on-core coil 44 to cancel the magnetic force of the magnet attracting the plunger 45 magnetically and thus disengaging the engagement mechanism 20 of the disk tray 5 from the engagement concavity 11 of the device body 7.

The recorder/player 1 constructed as above functions as will be described below:

In the recorder/player 1, the skew adjusting mechanism 109 pre-supports the pair of guide shafts 105 and 106 at the opposite ends of the latter. The skew adjusting mechanism 109 adjusts the inclination of the guide shafts 105 and 106 so that the light beam projected from the objective lens 108 will be incident perpendicularly upon the signal recording surface of the optical disk. The elastic member 126 disposed inside the housing 125 for the skew adjusting mechanism 109 is hardened with the adhesive 133. Thus, even if the elastic member 126 is plastically deformed due to compression by the adjusting screw 127, the skew adjusting mechanism 109 can maintain an appropriate inclination of the guide shafts 105 and 106.

In the recorder/player 1, the disk tray 5 is ejected to outside the device body 7 for setting an optical disk 4 onto the disk tray 5. At this time, the pivoting piece 42 is forced in the direction of arrow E and thus the device body 7 is in touch with the stop wall 81 provided on the disk tray 5 as shown in FIG. 19. Also, the engagement piece 41 has the abutting portion 51 thereof pivoted by the pivoting-range limiting projection 55 of the pivoting piece 42 in the direction opposite to the direction of arrow D and thus the engagement portion 48 thereof held retracted from the moving orbit of the engagement projection 11. Therefore, the lower half 9 of the device body 7 on which the engagement projection 11 is provided upright and the disk tray 5 are disengaged from each other, and the ejection member 30 forced by the coil spring 28 provided on the disk tray 5 forces the rear wall 9a of the lower half 9 and thus the disk tray 5 is ejected out of the device body 7.

When an optical disk 4 is set in place in the concavity 15 of the disk tray 5 and the disk tray 5 is introduced by the user into the device body 7, the engagement projection 11 provided upright on the lower half 9 moves forward in the direction of arrow H in FIG. 19 until it gets in touch with the arm portion 70 of the pressing piece 46, and the arm portion 70 is thus pivoted in the direction of arrow G in FIG. 20. As the arm portion 70 is thus pivoted, the pressing portion 72 of the pressing piece 46 presses the contact portion 57 of the pivoting piece 42 to pivot the pivoting piece in the direction opposite to the direction of arrow E in FIG. 20. The plunger 45 connected to the connection 58 of the pivoting piece 42 has the insertion shaft 63 thereof inserted deep into the on-core coil 44 and magnetically attracted by the magnet disposed in the on-core coil 44.

Since the contact portion 57 put into contact with the pressing portion 72 of the pressing piece 46 has the protrusion 60 formed thereon, the pressing piece 46 can press the protrusion 60 to positively pivot the pivoting piece 42 in the direction opposite to the direction of E and thus permit the plunger 45 to be attracted by the magnet built in the on-core coil 44. Also, since the slit 61 is formed between the contact portion 57 and connection 58 and the contact portion 57 is elastically displaceable, the pivoting piece 42 can have the contact portion 57 deflect even when it is excessively pressed by the pressing piece 46, thus permitting to absorb the pressure.

Thus, the plunger 45 and pivoting piece 42 are held pivoted in the direction opposite to the direction of arrow E in FIG. 20 against the force of the torsion coil spring 59. As the pivoting-range limiting projection 55 of the pivoting piece 42 is pivoted in the direction opposite to the direction of arrow E, the engagement piece 41 is allowed to pivot in an increased range in the direction of arrow D and hence the engagement portion 48 is positioned on the moving orbit of the engagement projection 11 as shown in FIG. 20.

As the disk tray 5 is inserted deeper into the device body 7, the engagement projection 11 moves in the direction of arrow H in FIG. 20 while pivoting the bevel 49a formed on the end portion of the body 49 of the engagement piece 41 in the direction opposite to the direction of arrow D, and is engaged on the engagement portion 48. Thus, the disk tray 5 and the lower half 9 of the device body 7 are engaged on each other.

As shown in FIG. 18, the ejection member 30 is pressed back from the rear wall 9a of the lower half 9 and moves toward the front end 5a while compressing the coil spring 28 by the flange 30a toward the front end 5a. Since the end portion at the side of the front end 5a is retained by the compartment wall 29a of the spring compartment 29, the coil spring 28 is pressed and thus compressed by the flange 30a to maintain the force for forcing the flange 30a toward the rear end 5d. That is, the disk tray 5 engages the engagement projection 11 provided upright on the lower half 9 onto the engagement piece 41 while forcing the lower half 9 toward the rear end 5d, and it is thus held inside the device body 7.

Also, when the disk tray 5 is housed into the device body 7, the FPC 23 connecting the optical pickup unit 6 housed in the disk tray 5 and the printed wiring board 17 disposed on the lower half 9 of the device body 7 is deflected at the end portion 181a of the second arm portion 181 and the bending 187 formed at the rear end portion 181b shifts into the device body 7 while moving toward the end portion 181a. Since the FPC 23 has the cover lay 188 attached generally at the middle of the second arm portion 181, the second arm portion 181 is more rigid generally at the middle thereof than the rear end portion 181b. Therefore, when the disk tray 5 once ejected to outside the device body 7 is housed again into the device body 7, the second arm portion 181 is prevented from being deflected at the higher-rigidity middle portion thereof to below the clearance 190, while the rear end portion 181b of the second arm portion 181, lower in rigidity and more flexible, is bent and positively moved into the device body 7.

Also, when the disk tray 5 is fully housed in the device body 7, the second arm portion 181 is bent (indicated with the reference number 187) near the connection 186 with the connector 162 as shown in FIGS. 38B and 39C. However, since the rigidity of the portion, near the connection 186, of the second arm portion 181 is lower than that of the portion somewhat set back toward the connection 182 where the cover lay 188 is attached, it is possible to reduce the load applied to the second arm portion 181 due to the bending. Therefore, the second arm portion 181 can prevent the end portion 181a thereof from being cracked to break the circuit pattern formed in the FPC 23.

Also, since the second arm portion 181 reduces the load applied thereto due to the bending 187 formed near the connection 186, it is not necessary to increase the distance between the connection 186 and bending 187 at the time of housing the disk tray 5 into the device body 7 in order to reduce the load applied to the second arm portion 181 due to the bending. Thus, the second arm portion 181 may not have any extra length, which will advantageously lead to a reduction of the cost of manufacture.

Further, in the thin-designed recorder/player 1, since the height of the space where the FPC 23 is limited to the maximum possible extent for housing the disk tray 5, the bending 187 should be made to have a larger curvature and thus the load to the bending 187 will be larger. However, since the second arm portion 181 can reduce the load to the bending 187 when the disk tray 5 is housed into the device body 7, the present invention can meet the requirement for a thinner design of the device body 7.

Also, in the recorder/player 1, the optical pickup 103 is normally positioned at the beginning (HOME) of the lead-in area. Since the recorder/player 1 is to be incorporated in a portable apparatus such as notebook computer or the like, it may possibly be applied with a vibration when the portable apparatus is being carried or in a similar condition. When the host apparatus 2 having the recorder/player 1 built therein is being carried with an optical disk 4 being set on the disk tray 5, it is likely that a vibration, if any applied to the host apparatus 2, will cause the optical disk 4 to be rattled. The displacement of the optical disk 4, due to the rattling, is larger at the outer circumference. On this account, the recorder/player 1 is designed according to the present invention such that the optical pickup 103 is positioned at the inner circumference of the optical disk 4 where the rattling-caused displacement is small, to thereby prevent the optical disk 4 and the objective lens 108 of the optical pickup 103 or the like from getting into touch with each other to scratch each other.

Figure 42:
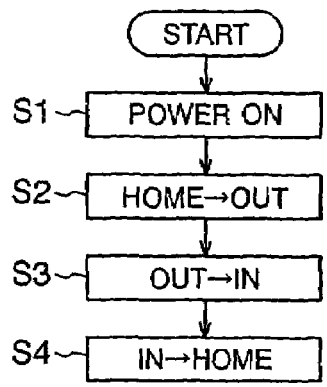
FIG. 42 shows a sequence of operations made in pulsed driving of the optical pickup unit at start-up of the recording and/or playback device.

As shown in FIG. 42, after the recorder/player 1 is switched on in step S1, the control circuit 215 drives the step motor 141 in step S2. More specifically, the control circuit 215 applies a pulsed voltage equivalent to the maximum number of steps (C) to the step motor 141. Then, the lead screw 140 connected to the step motor 141 is rotated and the optical pickup 103 is moved stepwise to the end position (OUT) at the outer circumference of the optical disk 4.

In the recorder/player 1, if a vibration is applied thereto while it is being carried, the optical pickup 103 may possibly move, by jumping, from the beginning (HOME) of the lead-in area toward the inner or outer circumference of the optical disk 4. Even is such an event, the step motor 141 is applied with a pulsed voltage equivalent to the maximum number of steps (C) resulted from addition, to the number of write and read steps (A) in FIG. 41, of the number of steps (B) required for movement of the optical pickup 103 from its innermost-circumferential position (IN) to the beginning (HOME) of the lead-in area and the number of extra steps (D) at the inner and outer circumferences. That is, since the step motor 141 is driven until the lead screw 140 rotates idly after the optical pickup 103 is mechanically limited from moving beyond the end position (OUT), the end position (OUT) of the optical pickup 103 can positively be indexed.

Note that when the lead screw 140 is rotating idly, it will cause a noise. However, the noise occurs only for a period corresponding to the sum of the number of steps (B) required for movement of the optical pickup 103 from its innermost-circumferential position (IN) to the beginning (HOME) of the lead-in area and the number of extra steps at the inner and outer circumferences and the number of extra steps (D). Therefore, the noise can be suppressed to be smaller than that when the step motor 141 is applied with a negative pulsed voltage equivalent to the maximum number of steps (C) in a direction from the beginning (HOME) of the lead-in area toward the innermost-circumferential position (IN), for example.

When the end position (OUT) of the optical pickup 103 is positively identified in step S2, the control circuit 215 applies, in step S3, the step motor 141 with a negative pulsed voltage equivalent to the maximum number of steps (C). Thus, after the optical pickup 103 is mechanically limited from moving being the innermost-circumferential position (IN), the step motor 141 is driven until the lead screw 140 rotates idly, whereby the innermost-circumferential position (IN) of the optical pickup 103 can positively be indexed.

Note that when the lead screw 140 is rotating idly, it will cause a noise. However, the noise occurs only for a period corresponding to the number of extra steps (D) at the inner circumference and the time of noise occurrence is caused can be minimized.

When the innermost-circumference position (IN) of the optical pickup 103 is positively identified in step S3, the control circuit 215 applies, in step S4, the step motor 141 with a negative pulsed voltage equivalent to the number of steps (B) required for movement of the optical pickup 103 from the innermost-circumferential position (IN) of the optical pickup 103 to the beginning (HOME) of the lead-in area. Thus, the control circuit 215 can positively move the optical pickup 103 to the beginning (HOME) of the lead-in area. Also, the control circuit 215 sets the beginning (HOME) of the lead-in area to zero, starts counting the pulses and starts managing the position of the optical pickup 103.

The recorder/player 1 operates for writing recording data to the optical disk 4 as will be described below:

When the user pushes the record button 213a on the user's control unit 213, recording data is supplied at the input terminal 206 of the recorder/player 1. The recording data undergoes, in the error correction/encoding circuit 207, an error correction and encoding corresponding to the type of an optical disk 4 currently used in the recorder/player 1, and next in the modulation circuit 208, a modulation corresponding to the type of the optical disk 4. The modulated data is recorded in the recording circuit 209, and then supplied to the optical pickup 103. Then, the optical pickup 103 projects, to the recording layer of the optical disk 4, a light beam emitted from the semiconductor laser and having a wavelength corresponding to the type of the optical disk 4, detects a return light from the reflection layer in the optical disk 4, makes a photoelectric conversion of the detected light, and provides the resultant electrical signal to the RF amplifier 203. The RF amplifier 203 will generate a focusing error signal, tracking error signal and an RF signal. The servo circuit 204 generates a focusing servo signal and tracking servo signal on the basis of the focusing error signal and tracking error signal supplied from the RF amplifier 203, and provides the servo signals to the drive circuit in the objective lens drive mechanism included in the optical pickup 103. Thus, the objective lens 108 held by the objective lens drive mechanism is moved in a focusing direction parallel to the optical axis of the objective lens 108 and in a tracking direction perpendicular to the optical axis of the objective lens 108. Further, the motor control circuit 202 generates a rotation servo signal with which a clock generated from a wobble component of a groove and an addressing pit will be synchronous with a reference clock from the crystal oscillator, and drives the spindle motor 201 on the basis of the rotation servo signal to rotate the optical disk 4 at CLV. Furthermore, the subcode extraction circuit 205 extracts a wobbled groove from the RF signal and address data on the lead-in area from the pit pattern, and provides the extracted data to the control circuit 215. To write data processed in the recording circuit 209 under the control of the control circuit 215, the optical pickup 103 accesses a predetermined address on the basis of the extracted address data, drives the semiconductor laser at the recording level, and projects the light beam to the recording layer of the optical disk 4 to write the data to the optical disk 4. As the optical pickup 103 writes the recording data, it is moved stepwise by the step motor 141 to write the recording data over the area between the inner and outer circumferences of the optical disk 4.

The recorder/player 1 operates for reading data recorded in the optical disk 4 as will be described below:

When the user pushes the play button 213c on the user's control unit 213, the optical pickup 103 will project, to the recording layer of the optical disk 4, a light beam emitted from the semiconductor laser and having a wavelength corresponding to the type of the optical disk 4, detects a return light from the reflection layer in the optical disk 4, makes a photoelectric conversion of the detected light, and provides the resultant electrical signal to the RF amplifier 203. The RF amplifier 203 will generate a focusing error signal, tracking error signal and an RF signal. The servo circuit 204 generates a focusing servo signal and tracking servo signal on the basis of the focusing error signal and tracking error signal supplied from the RF amplifier 203, and controls the focus and tracking of the objective lens 108 on the basis of these servo signals. Further, the motor control circuit 202 generates a rotation servo signal with which a clock generated from a sync signal will be synchronous with the reference clock from the crystal oscillator, and drives the spindle motor 201 on the basis of the rotation servo signal to rotate the optical disk 4 at CLV. Furthermore, the subcode extraction circuit 205 extracts subcode data from the RF signal, and provides the extracted subcode data to the control circuit 215. To read data, the optical pickup 103 accesses a predetermined address on the basis of address data included in the extracted subcode data, drives the semiconductor laser at the playback level, and projects the light beam to the recording layer of the optical disk 4 to read recorded in the optical disk 4. As the optical pickup 103 reads the data from the optical disk 4, it is moved stepwise by the step motor 141 to read the data over the area between the inner and outer circumferences of the optical disk 4.

The RF signal generated by the RF amplifier 203 is demodulated in the demodulation circuit 210 correspondingly to a method used for modulation of the data for recording, undergoes and the error correction/decoding in the error correction/decoding circuit 211, and then is delivered at the output terminal 212. Thereafter, the data delivered at the output terminal 212 is outputted as it is in the digital form or converted by a D-A (digital-to-analog) converter from digital to analog, for example, and supplied to the speaker, monitor or the like.

When writing or reading data to or from the optical disk 4 as above, the engagement projection 151, formed in the compartment 153, of the engagement member 120 connected to the pickup base 114 having the objective lens 108 provided thereon in the threads 144 on the lead screw 140 to the depth of the threads 144, for example, to a depth of 0.3 mm, and the clearance definition member 152 formed from a rigid metallic plate inside the compartment 153 is housed between the support walls 158 and 159 of the compartment 153 with a space, between them, smaller than the depth of engagement between the engagement projection 151 and threads 144 on the lead screw 140, for example, with a clearance of 0.1 mm.

Therefore, the clearance definition member 152 is housed without forcing the engagement projection 151 formed on the side wall 153a to the lead screw 140. That is, it is possible to prevent the lead screw 140 from being applied with any excessive force and thus the rotation of the lead screw 140 from being dulled. Thus it is assured that the lead screw 140 can be rotated smoothly. Also, the clearance definition member 152 can limit any misalignment of the engagement projection 151 in relation to the threads 144, caused by the dimensional tolerance of the engagement member 120 during movement of the pickup base 114, to smaller than a clearance (0.1 mm) defined between the side wall 153a of the compartment 153 and support wall 158 of the clearance definition member 152. Thus, the engagement member 120 can limit the misalignment of the engagement projection 151 to less than the depth (0.3 mm) of the threads 144 to prevent the lead screw 140 and engagement projection 151 from disengaged from each other during movement of the pickup base 114.

Also, the engagement member 120 in which the clearance definition member 220 (250) is housed works effectively as follows. Even if the recorder/player 1 is dropped by mistake and the pickup base 114 quickly slides on the guide shafts 105 and 106 and thus the engagement member 220 installed on the pickup base 114 quickly slides on the lead screw 140, both the edges 227a and 227b of the second side wall 227 having formed thereon the engagement projection 221 which is in mesh with the threads 144 on the lead screw 140 are supported by the support piece 240 (253) of the clearance definition member 220 (250) or at the folds 254. Therefore, it is possible to relieve the load concentrated to the hinge 233 supporting the second side wall 227 and thus prevent the hinge 223 from being broken.

Also, the feed motor 141, which is supplied with a rectangular wave to feed the pickup base 114 as the lead screw 140 is rotated, is designed thinner because the motor housing 145 is open at the top and bottom thereof. Further, the motor housing 145 is held between the cover member 90 and bottom plate 91 disposed on the top and bottom, respectively, of the optical pickup unit 6.

As above, the magnetic field of the coil 146 housed in the motor housing 145 can be closed, so that the fringe magnetic field from the feed motor 1 can be inhibited from adversely affecting write or read of information signals to or from the optical disk 4. Also, since the motor housing 145 for the feed motor 141 is open at both the top and bottom thereof, the heat can easily be discharged from inside the motor housing 145.

Also, in the recorder/player 1, the disk tray 5, base chassis 101 and cover member 90 are made of materials different in coefficient of linear thermal expansion from each other, respectively, these components will be distorted differently from each other due to the differences in linear expansion coefficient from each other when have higher temperatures, these components. More specifically, the aluminum-made cover member 90 has the wall 166a of the rectangular opening 166 deflected toward the optical disk 4, and the deflected wall 166a will possibly get into sliding touch with the signal recording surface of the optical disk 4 received in the concavity 15.

The first wall 170 has the projection 175 formed on the lower edge of the wall body 170a and thus the cover member 90 abuts the projection 175, which permits to prevent the cover member 90 from being deflected toward the optical disk 4 and thus prevent the cover member 90 from getting into sliding contact with the optical disk 4.

Figure 43:
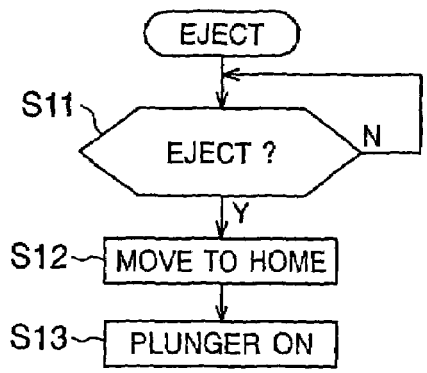
FIG. 43 shows a sequence of operations made in pulsed driving of the optical pickup unit at disk ejection in the recording and/or playback device.

The recorder/player 1 operates when the eject button 213a for ejection of the optical disk 4 is pressed, as will be described below with reference to FIG. 43:

In step S11, the control circuit 215 judges whether the eject button 213a has been pressed by the user. When the result of judgment is affirmative, the control circuit 215 goes to step S12. When the control circuit 215 has detected that the user has pressed the eject button 213a, it will apply the step motor 141 with a negative pulsed voltage to move the optical pickup 103 to the beginning (HOME) of the lead-in area.

Note that for movement of the optical pickup 103 to the beginning (HOME) of the lead-in area, a negative pulsed voltage equivalent to the maximum number of steps (C) may be applied to the step motor 141 to move the optical pickup 103 to its innermost-circumferential position (IN) and then a positive pulsed voltage, equivalent to the number of steps (B) required for movement of the optical pickup 103 from the innermost-circumferential position (IN) of the optical pickup 103 to the beginning (HOME) of the lead-in area, be applied to the step motor 141 to move the optical pickup 103 to the beginning (HOME) of the lead-in area.

When the optical pickup 103 has arrived at the beginning (HOME) of the lead-in area, the control circuit 215 goes to step S13 where it will supply the on-core coil 44 with to cancel the magnetic force of the magnet which magnetically attracts the plunger 45 in order to disengage the engagement mechanism for the disk tray 5 and engagement projection 11 of the device body 7 from each other. Thus, the disk tray 5 having the optical disk 4 placed thereon is ejected to outside the device body 7 under the force of the coil spring 28.

More specifically, to eject the disk tray 5 from inside the device body 7, the control circuit 215 having received a command signal from the user's control unit 213 provided on the disk tray 5 supplies a current to cancel the magnetic force of the magnet built in the on-core coil 44. Therefore, the pivoting piece 42 is pivoted under the force of the torsion coil spring 59 in the direction of arrow E in FIG. 19. The pivoting-range limiting projection 55 is pivoted in the direction of arrow E and thus the engagement piece 41 is pivoted in the direction opposite to the direction of arrow D, so that the engagement portion 48 will be retracted from one the moving orbit of the engagement projection 11. Thus, the engagement projection 11 is disconnected from the engagement portion 48, and thus the disk tray 5 is disengaged from the lower half 9 of the device body 7.

At this time, the ejection member 30 is applied with a reaction equal to the force of the coil spring 28 from the rear wall 9a to press the coil spring 28 back to the front end 5a by the flange 30a. Since the end thereof at the side of the front end 5a is retained by the wall 29a of the coil compartment 29, the coil spring 28 will expand while forcing the compartment wall 29a out toward the front end 5a. Thus, the disk tray 5 is forced out toward the open end of the device body 7 and the side thereof at the side of the front end 5a is ejected toward the open end of the device body 7.

Note that since the arm portion 70 is retained by the stopper 80 also when pivoting of the pivoting piece 42 in the direction of arrow E has caused the pressing portion 72 of the pressing piece 46 to collide with the contact portion 57 of the pivoting piece 42 and thus pivoted the pressing portion 72 in the direction opposite to the direction of arrow G, it can be avoided that the arm portion 70 will excessively be pivoted and not be positioned on the moving orbit of the engagement projection 11. Also, the torsion coil spring 73 wound on the pressing piece 46 can be retained in an appropriate position by the retaining member 75 formed on the rear side 5c of the disk tray 5 and thus provides an optimum force to the pressing piece 46. Therefore, even when having been pressed by the engagement projection 11 and pivoting piece 42 and pivoted in the direction of arrow G or in the direction opposite to the direction of arrow G, the pressing piece 46 is returned to the initial position where the arm portion 70 intersects the moving orbit of the engagement projection 11.

Note here that when the optical disk 4 is ejected, a vibration will possibly cause it to rattle. The displacement of the optical disk 4, due to the rattling, is larger at the outer circumference. On this account, the recorder/player 1 is designed according to the present invention such that the optical pickup 103 is positioned at the inner circumference of the optical disk 4 where the rattling-caused displacement is small, to thereby prevent the optical disk 4 and the objective lens 108 of the optical pickup 103 or the like from getting into touch with each other to scratch each other.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims. For example, the present invention is also applicable to a recorder/player designed for use with an optical disk such as CD (compact disk), CD-ROM, CD-R/RW, DVD-ROM or DVD-RAM.

Also, the host apparatus in which the recorder/player according to the present invention is to be installed may be a portable recorder/player such as a notebook personal computer and PDA (portable digital assistant), a stationary recorder/player such as a desk-top personal computer and server, an in-vehicle recorder/player or the like.

Also note that the dimensions referred to herein concerning the recorder/player according to the present invention are just examples and the present invention may be constructed with any other appropriate dimensions.

What is claimed is:

1. A recording and/or playback apparatus comprising:
    a base;
    a disk rotation driving mechanism which supports an optical disk and rotates the optical disk;
    an optical pickup which focuses a light beam emitted from a light source by an objective lens onto a recording surface of the optical disk and detects a return light from the optical disk;
    a guide means having a first guide shaft which supports the one end of the optical pickup and a second guide shaft which supports the other end of the optical pickup, the first and second guide shafts being disposed on the base in parallel to each other radially of the optical disk;

an optical pickup driving means guided by the first and second guide shafts to move the optical pickup radially of the optical disk; and a skew adjusting means including an elastic member which provides a force to the first and second guide shafts in a direction generally perpendicular to the main side of the optical disk and an adjusting screw which is in contact with the first and second guide shafts from the opposite side of the elastic member, and which adjust a skew by adjusting the inclination of the first and second guide shafts by the adjusting screw.

2. The apparatus as set forth in claim 1, wherein the elastic member is a conical helical spring.

3. The apparatus as set forth in claim 1, wherein the elastic member is a hollow cylinder of silicon rubber.

4. The apparatus as set forth in claim 1, wherein the elastic member is electrically conductive.

5. The apparatus as set forth in claim 1, wherein the skew adjusting member is provided at each of the opposite ends of the first and second guide shafts.

6. The apparatus as set forth in claim 1, wherein the elastic member is fixed in a skew-adjusted state with an adhesive.

7. The apparatus as set forth in claim 1, wherein the skew adjusting mechanism comprises an adhesive-injection hole formed in the upper side of the base chassis.

8. A recording and/or playback apparatus comprising:
a base;
a disk rotation driving mechanism which supports an optical disk and rotates the optical disk;
an optical pickup which focuses a light beam emitted from a light source by an objective lens onto a recording surface of the optical disk and detects a return light from the optical disk;
a guide means having a first guide shaft which supports the one end of the optical pickup and a second guide shaft which supports the other end of the optical pickup, the first and second guide shafts being disposed on the base in parallel to each other radially of the optical disk;
an optical pickup driving means guided by the first and second guide shafts to move the optical pickup radially of the optical disk; and
a skew adjusting means including an elastic member which provides a force to the first and second guide shafts in a direction generally perpendicular to the main side of the optical disk and an adjusting screw which is in contact with the first and second guide shafts from the opposite side of the elastic member, and which adjust a skew by adjusting the inclination of the first and second guide shafts by the adjusting screw, the adjusting screw being electroconductive or being plated to be electroconductive and having a ground potential.

9. A step motor, comprising:
a lead screw engaged in a pickup chassis and having engaged thereon a feeding member which feeds the pickup chassis radially of a disk-shaped recording medium;
a magnet rotated along with the lead screw;
a magnetic coil which acts on the magnet to rotate the lead screw; and
a housing which houses the magnet and magnetic coil,
wherein the housing has an opening formed in each of the upper and lower sides thereof and between a concavity in a disk tray having the pickup chassis installed therein and a bottom plate which supports the bottom of the disk tray.

10. A recording and/or playback apparatus, comprising:
a pickup moving mechanism using a step motor, comprising
a lead screw engaged in a pickup chassis and having engaged thereon a feeding member which feeds the pickup chassis radially of a disk-shaped recording medium;
a magnet rotated along with the lead screw;
a magnetic coil which acts on the magnet to rotate the lead screw; and
a housing which houses the magnet and magnetic coil,
wherein the housing has an opening formed in each of the upper and lower sides thereof and between a concavity in a disk tray having the pickup chassis installed therein and a bottom plate which supports the bottom of the disk tray.

* * * * *